United States Patent [19]
Tibbles et al.

[11] Patent Number: 5,514,047
[45] Date of Patent: May 7, 1996

[54] CONTINUOUSLY VARIABLE TRANSMISSION

[75] Inventors: Thomas T. Tibbles, Livonia; Pramod K. Jain, Farmington Hills, both of Mich.

[73] Assignee: Ford Motor Company, Dearborn, Mich.

[21] Appl. No.: 28,019

[22] Filed: Mar. 8, 1993

[51] Int. Cl.$^6$ .................................................. B60K 41/12
[52] U.S. Cl. ............................................................. 477/46
[58] Field of Search ................... 477/49, 48, 46

[56] References Cited

U.S. PATENT DOCUMENTS

| | | |
|---|---|---|
| H398 | 1/1988 | Lemieux . |
| 4,116,080 | 9/1978 | Berons . |
| 4,515,040 | 5/1985 | Takeuchi et al. . |
| 4,543,077 | 9/1985 | Yamamuro et al. . |
| 4,546,673 | 10/1985 | Shigematsu et al. . |
| 4,583,423 | 4/1986 | Hahne . |
| 4,653,004 | 3/1987 | Osanai et al. . |
| 4,658,360 | 4/1987 | Osanai et al. . |
| 4,663,990 | 5/1987 | Itoh et al. . |
| 4,683,779 | 8/1987 | Osanai et al. . |
| 4,736,301 | 4/1988 | Osanai ........................................ 477/48 |
| 4,823,267 | 4/1989 | Kumura ................................. 364/424.1 |
| 4,829,433 | 5/1989 | Nakano et al. ....................... 364/424.1 |
| 4,829,435 | 5/1989 | Isono . |
| 4,876,920 | 10/1989 | Eichenberger . |
| 5,020,392 | 6/1991 | Morimoto ................................. 477/49 |
| 5,029,087 | 7/1991 | Cowan et al. . |
| 5,131,297 | 7/1992 | Yamashita et al. .......................... 477/49 |
| 5,150,297 | 9/1992 | Daubermier et al. . |

FOREIGN PATENT DOCUMENTS 2145785 4/1985 United Kingdom ....................... 477/49

*Primary Examiner*—Timothy S. Thorpe
*Attorney, Agent, or Firm*—Frank G. McKenzie; Roger L. May

[57] ABSTRACT

A continuously variable belt and sheave drive mechanism for use with an internal combustion engine in an automotive vehicle driveline including a simplified valve system that responds to control commands from a microprocessor that receives input data from engine, turbine and output shaft speed sensors, an engine throttle position sensor and a sheave position sensor as well as other driveline variables so that the operating characteristics of the transmission are matched to the speed torque characteristics of the engine to produce improved driveline efficiency and performance while permitting the engine speed to be related functionally to the throttle position as well as vehicle speed and permitting engine speed to increase when rapid acceleration is desired while minimizing changes in engine speed for small throttle position variations.

8 Claims, 31 Drawing Sheets

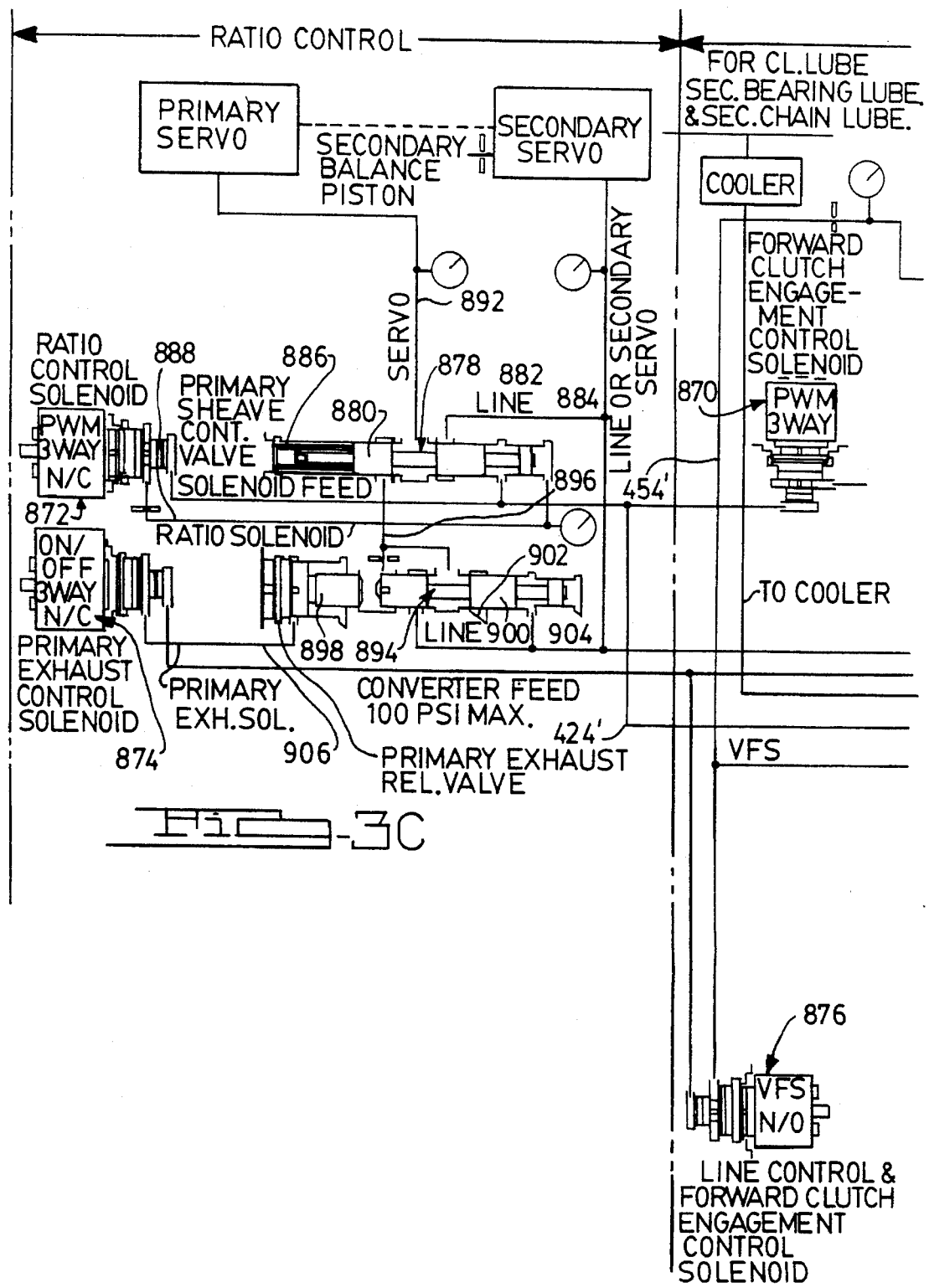

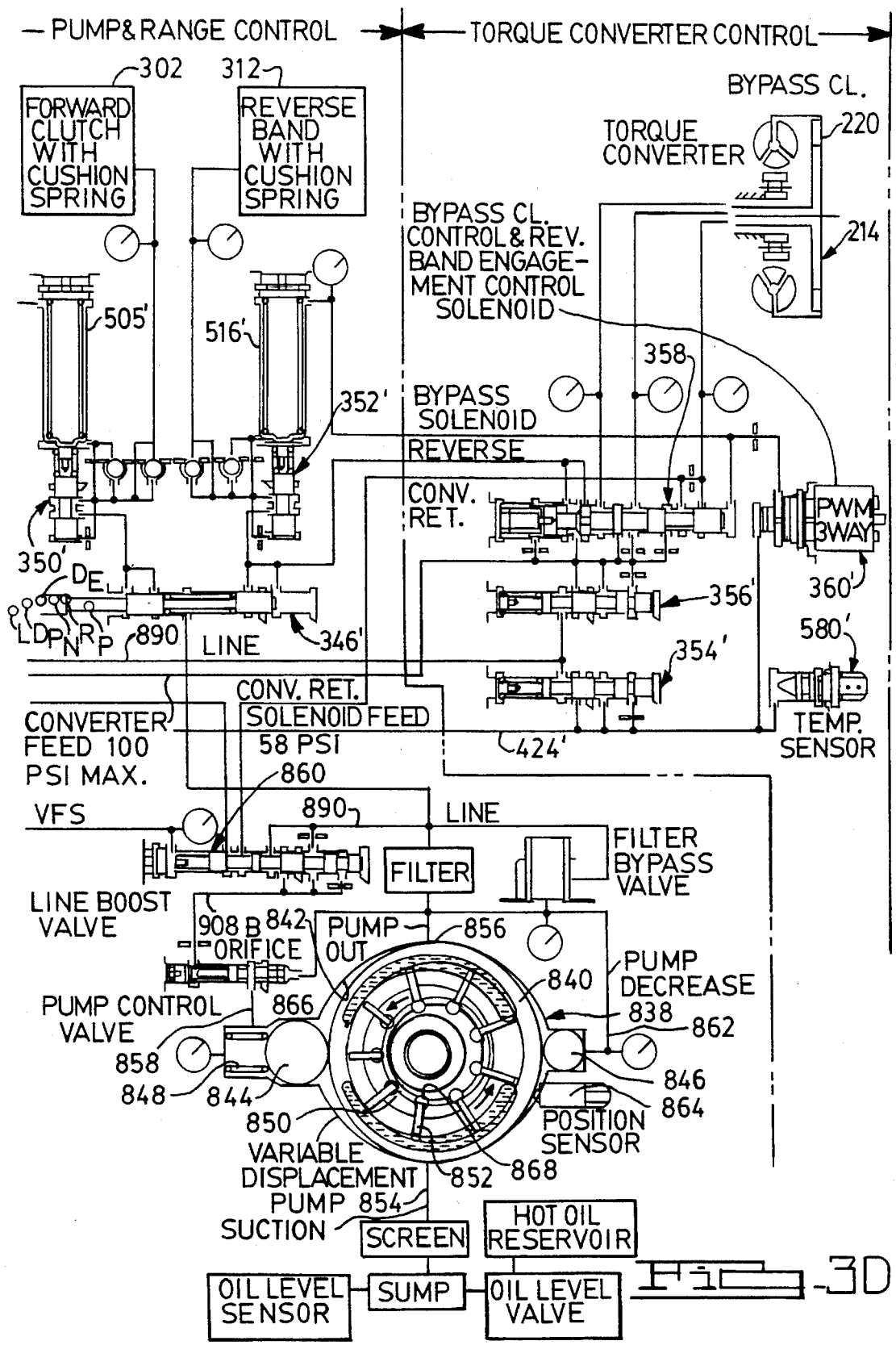

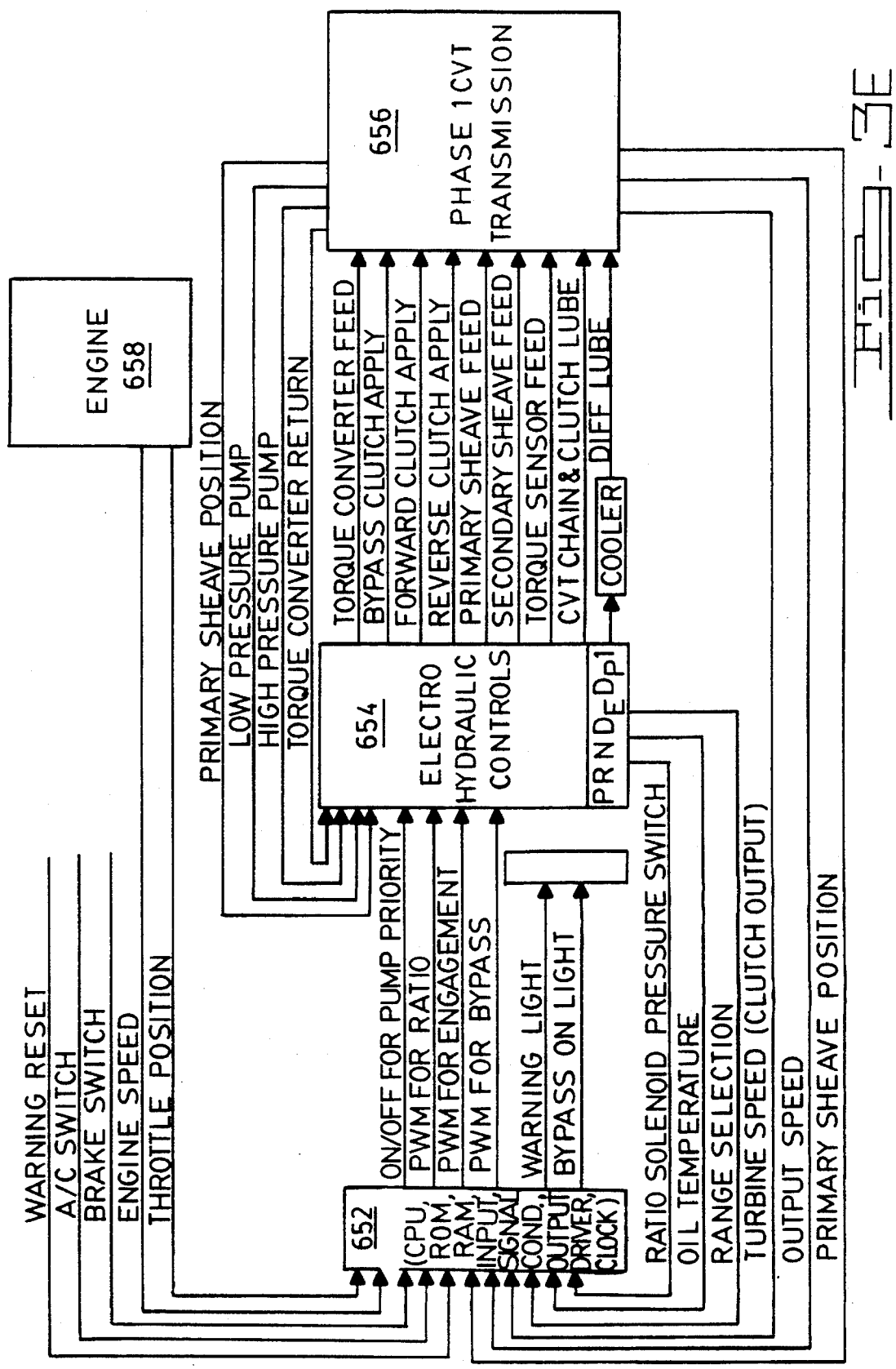

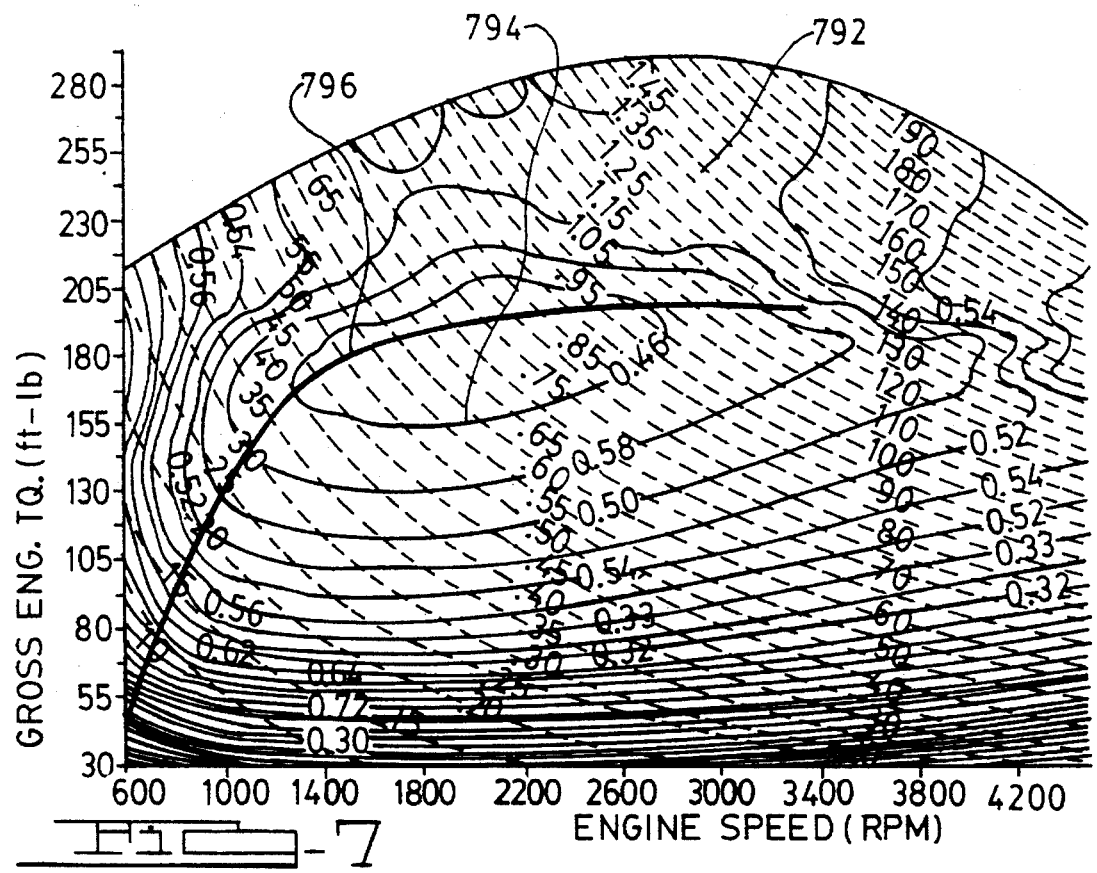

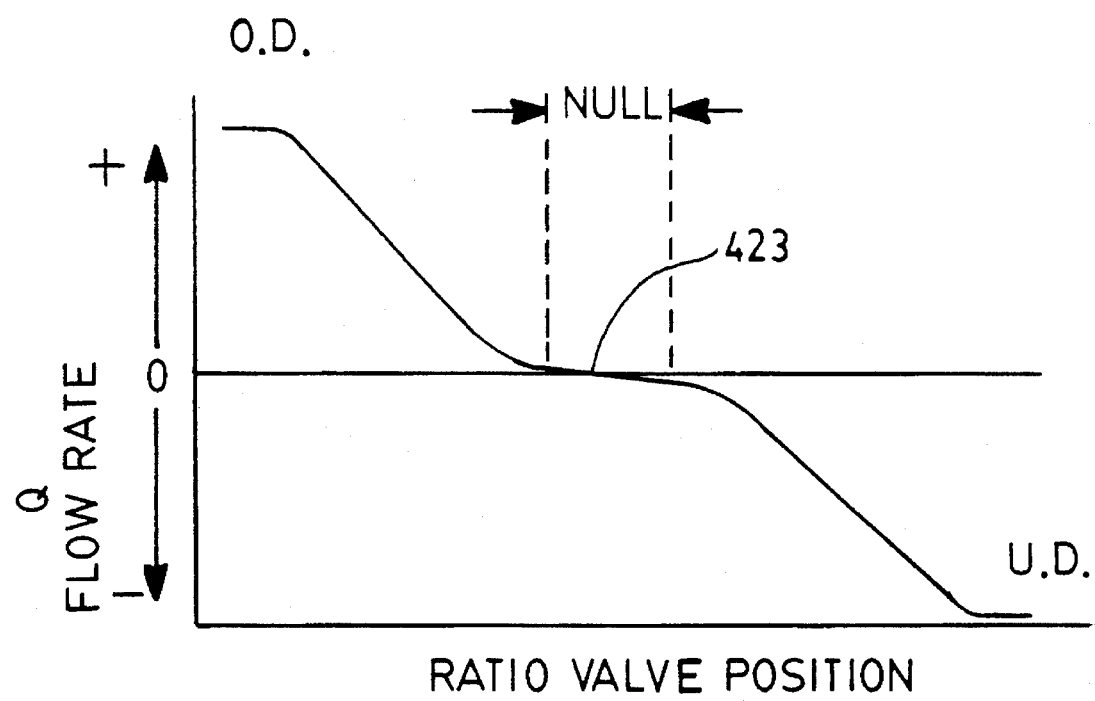
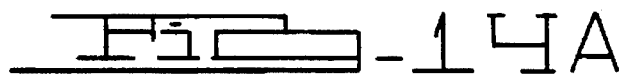

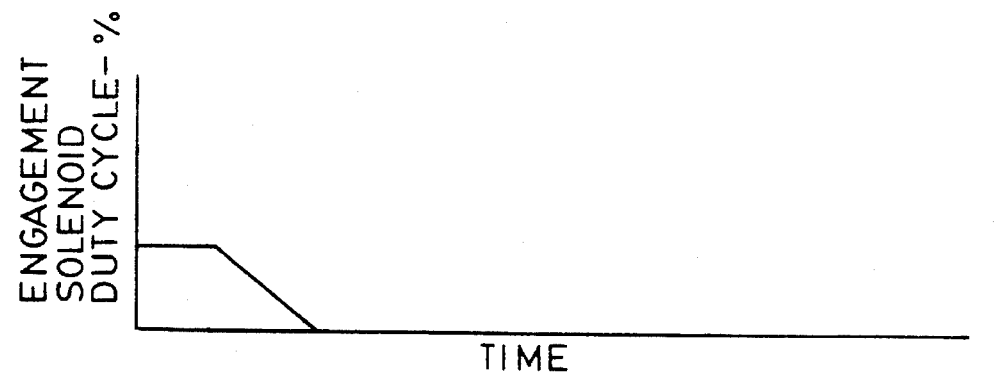
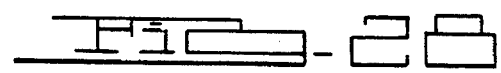
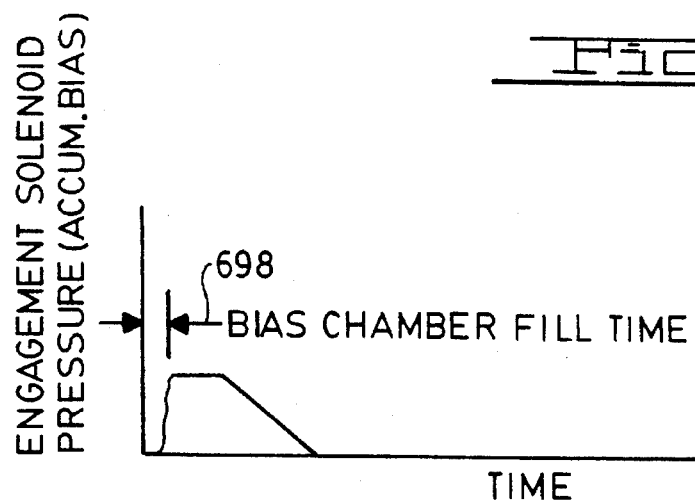
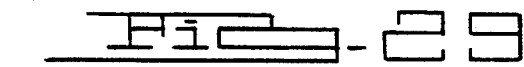
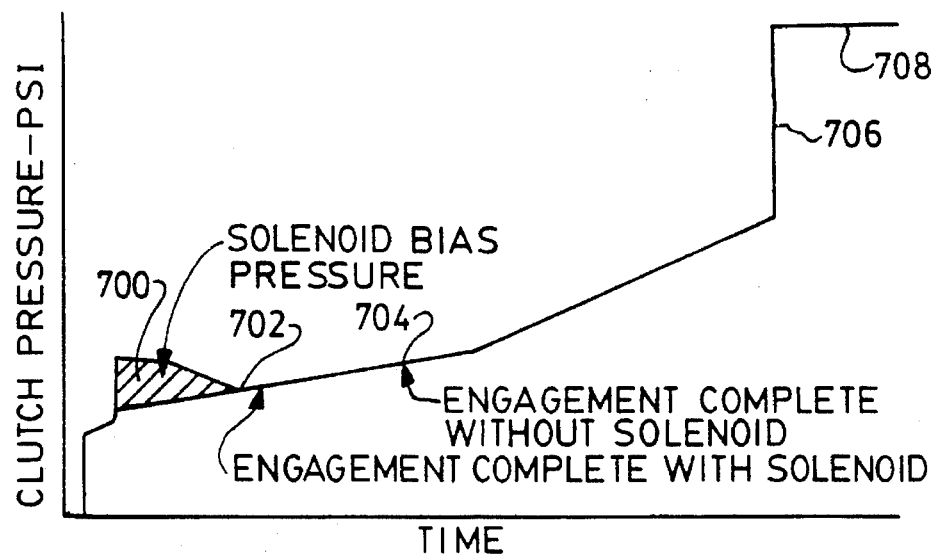
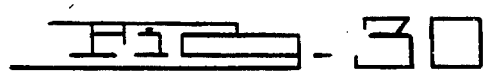

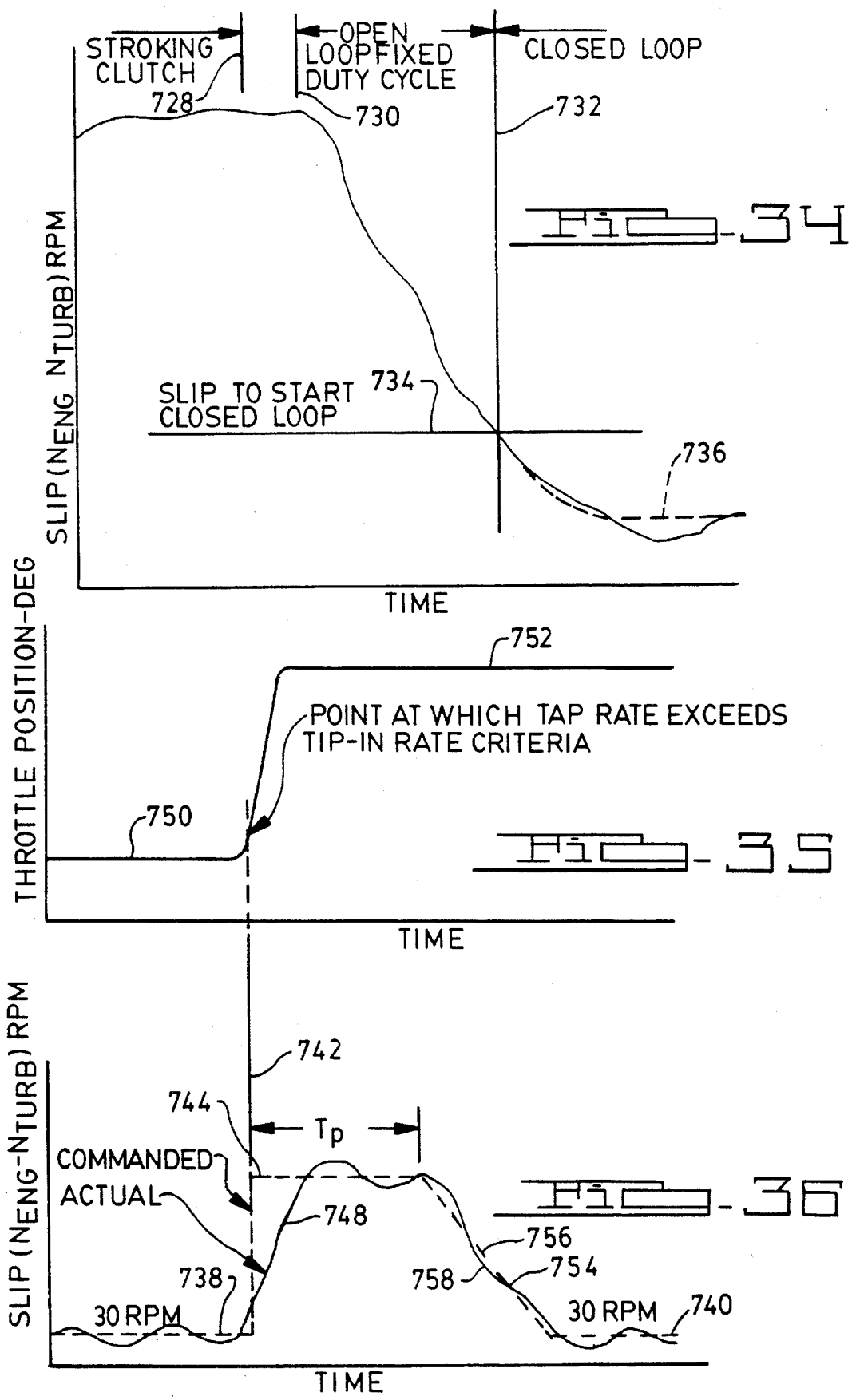

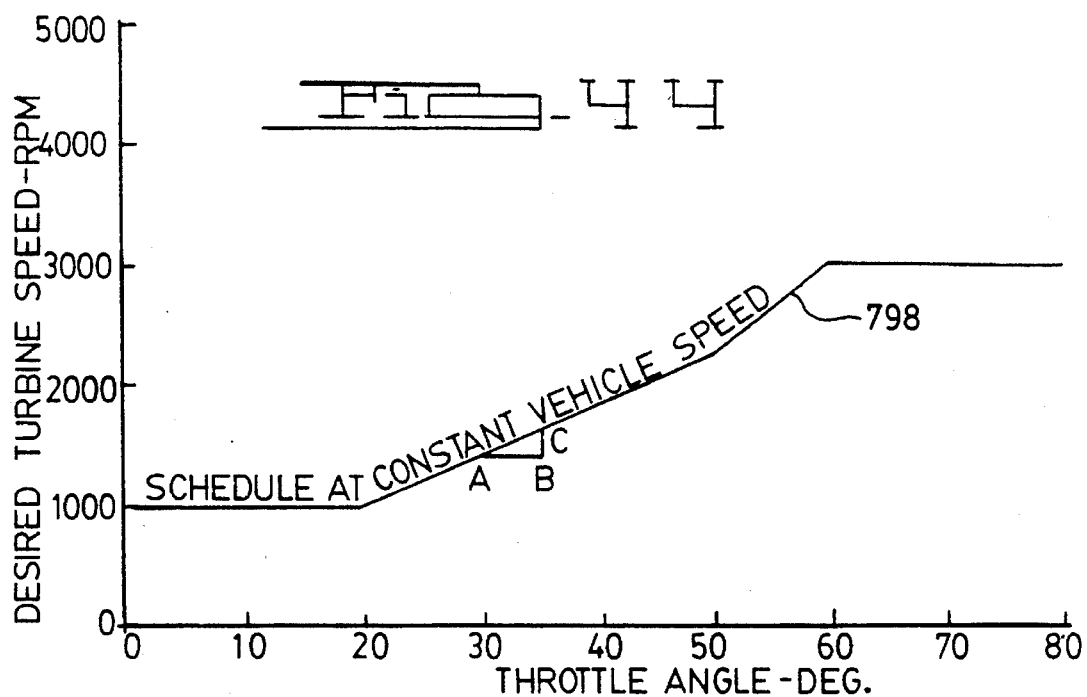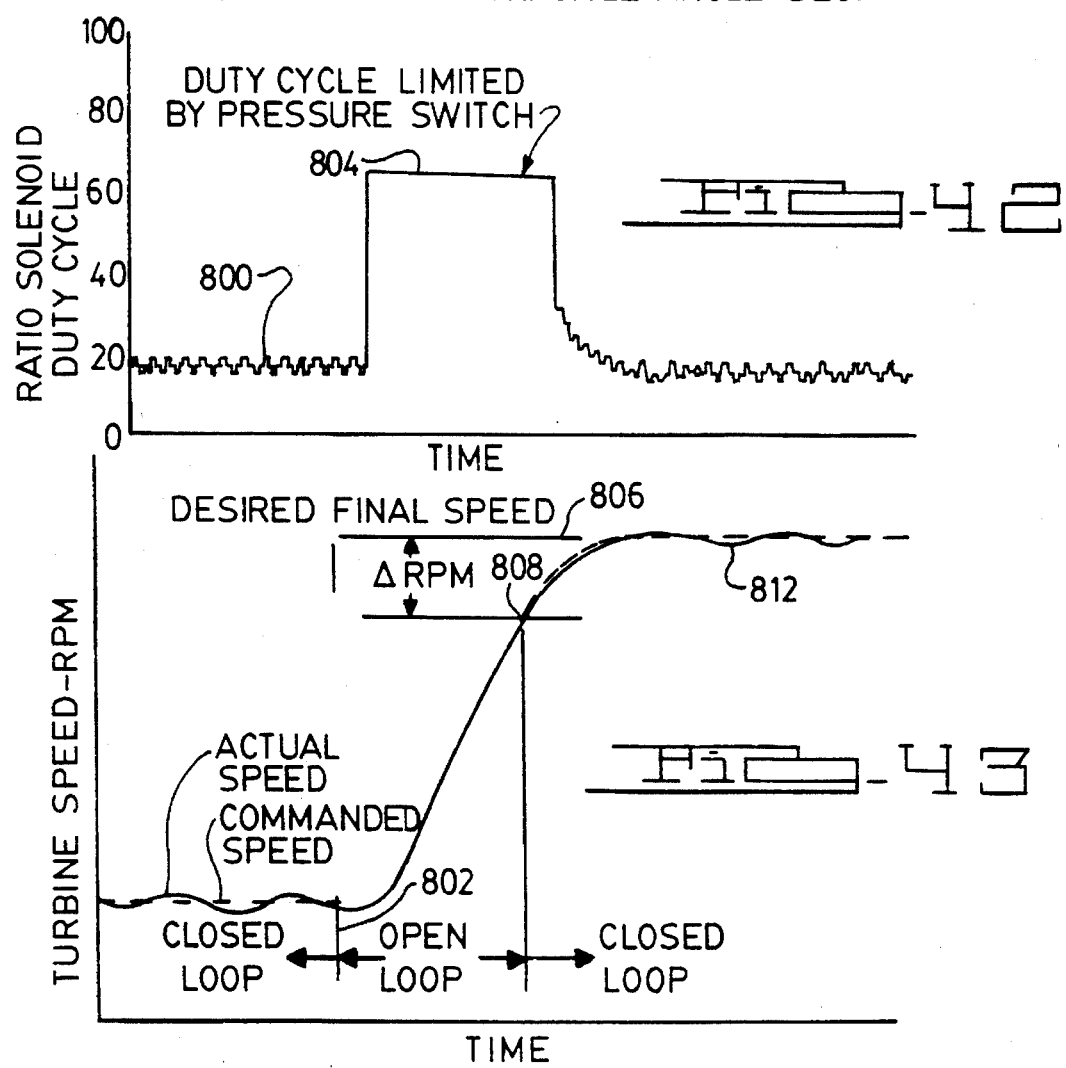

CONTINUOUSLY VARIABLE TRANSMISSION

TECHNICAL FIELD

The invention is an infinitely variable transmission for automotive vehicles with internal combustion engines, including a transmission control system that satisfies varying speed and torque requirements of the vehicle driveline.

BACKGROUND OF THE INVENTION

Our invention relates to improvements in a continuously variable belt and sheave drive for automotive vehicles such as the infinitely variable drives disclosed in patent publication H398 by Lemieux and Fisher, Eichenberger U.S. Pat. No. 4,876,920 and Hahne U.S. Pat. No. 4,583,423. Each of these patents is assigned to the assignee of our invention.

It is known in the automatic transmission art to provide a torque delivery driveline for a vehicle having an internal combustion engine wherein a wide range of ratios can be obtained to permit the vehicle engine to operate at its most efficient speed consistent with its speed torque characteristics. With a conventional driveline using multiple ratio gearing the engine is allowed to operate at each of several speeds depending upon the gearing ratio that is selected. With such geared transmissions, the vehicle operator controls intake combustion air delivery by controlling the engine throttle opening. Each gearing ratio then is characterized by a variety of engine speed and throttle opening combinations as vehicle operator attempts to match the driveline performance with varying driving demands.

The engine in such known drivelines is capable of achieving its optimum horsepower output throughout only a limited range of speeds. Thus, the fuel consumption rate will differ if the operating demands require an engine speed that is less than or more than its optimum speed. Energy efficiency is sacrificed to achieve improved performance.

It is known practice to provide an infinitely variable transmission in a driveline in combination with an internal combustion engine so that torque can be delivered to the traction wheels with a continuously variable ratio. Such infinitely variable transmissions typically include a control system for establishing an actual engine speed that is consistent with a so-called target speed at which the engine will operate with its most efficient specific fuel consumption. Improved fuel efficiency then can be achieved throughout the entire range of vehicle speeds made available by the infinitely variable driveline.

It is known that for each engine net power output point, there will exist a throttle position at which the specific brake fuel consumption for the engine will be a minimum. There are numerous prior art teachings that recognize this characteristic of matching an infinitely variable transmission with an internal combustion engine to take advantage of the capability of a continuously variable transmission to improve the driveline efficiency. This eliminates the limitations that are characteristic of a transmission having multiple fixed ratios. Examples of such prior art teachings are found in U.S. Pat. Nos. 4,546,673 and 4,683,779.

Operation of such a driveline with a controller that will command a minimum brake specific fuel consumption over a broad speed range will result in a noticeable difference in drivability, compared to drivelines with multiple, fixed ratios, the vehicle operator as the driveline responds to changes in operator demands for performance. For example, the engine speed will not increase upon advancement of the engine throttle until the control system for the driveline makes adjustments that are consistent with the previously described optimum relationship between engine throttle position and engine power. A simple demand for more torque will not necessarily result in a change in engine speed that is consistent with an increasing vehicle speed.

Prior art mechanisms also lack an adequate teaching of means for achieving a proper clamping force on the sheaves to prevent slippage of the belt during rapid changes in the torque demanded by the vehicle operator.

BRIEF DESCRIPTION OF THE INVENTION

The present invention comprises a simplified infinitely variable transmission in which the overall ratio that is achievable by adjustment of the sheaves for a drive belt is supplemented by a gear system having a forward range and a reverse range. The effective pitch radius of the drive belt with respect to the sheaves is controlled by positioning the sheaves by means of an electro-hydraulic controller that has a source of pressure and a variable control pressure valve system which provides the correct sheave position and clamping force throughout the entire speed range achievable with the variable ratio belt drive.

The engine and the sheave assembly control system are matched so that the optimum driveline efficiency is achieved while preserving the performance features of a conventional driveline with multiple, fixed ratios and while preserving acceptable driveline driveability characteristics.

BRIEF DESCRIPTION OF THE DRAWINGS

FIGS. 3A, 3B and 3C, taken together, show a schematic valve diagram of the overall valve arrangement for controlling the infinitely variable transmission of FIG. 1;

FIG. 3D shows, taken together, show a schematic valve diagram of the overall valve arrangement for controlling the infinitely variable transmission of FIG. 2;

FIG. 3E is a schematic representation of the control system comprising an overview of the electro-hydraulic controls, the electronic microprocessor, the transmission and the engine;

FIG. 7 is a plot of engine speed and gross engine torque for a typical internal combustion engine wherein horsepower lines are superimposed and wherein the values for brake specific fuel consumption measured in pounds per horsepower hour are plotted;

FIG. 8 is a plot of engine speed versus gross engine torque wherein constant throttle opening lines are superimposed and wherein the brake specific fuel consumption lines are indicated;

FIG. 14A is a plot of the fluid flow to and from the primary sheave servo during ratio changes;

FIGS. 28, 29 and 30 are plots showing the effect of the solenoid on the clutch engagement characteristics, including duty cycle versus time, engagement solenoid pressure versus time, and clutch pressure versus time;

FIG. 34 is a plot of the slip for the converter for the transmission of FIG. 1 versus time;

FIGS. 35 and 36 show the so-called tip-in slip control characteristics for the bypass clutch indicating the slip condition for tip-in throttle conditions;

FIGS. 42 and 43 show the turbine speed error trajectory for the transmission of FIG. 1; and FIG. 44 is a plot of the turbine speed torque demand sensitivity, specifically a plot of the throttle angle versus desired turbine speed.

PARTICULAR DESCRIPTION OF THE INVENTION

Figure 1:
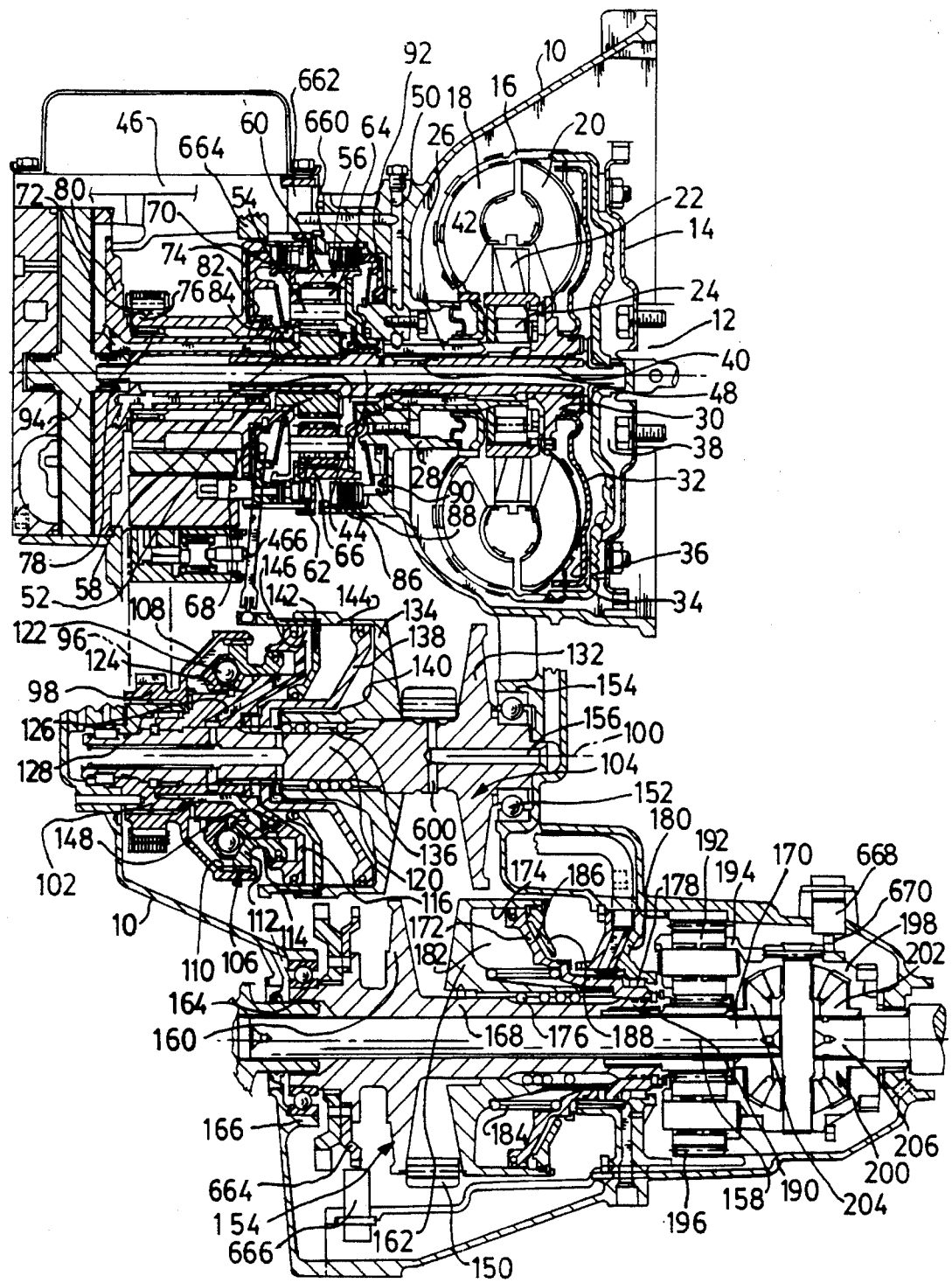
FIG. 1 shows in cross-sectional form a transmission with infinitely variable sheaves and a drive belt capable of embodying the improvements of the present invention.

The CVT Assembly:

In FIG. 1, a transmission housing 10 is adapted to be bolted or otherwise secured to the engine housing of an internal combustion engine. Numeral 12 designates the end of the engine crankshaft. It is connected by drive plate 14 to impeller housing 16.

Impeller blades of a torque converter impeller 18 are carried by the impeller housing 16. They define toroidal fluid flow passages that cooperate with bladed turbine 20 to define a toroidal fluid flow circuit in known fashion.

A bladed stator 22 is arranged between the flow entrance section of the impeller 18 and the flow exit section of the turbine 20. It is mounted on an overrunning brake 24 having an inner race that is splined to stationary sleeve shaft 26. Shaft 25 is secured to a shaft support wall 28 of the transmission housing 10.

The torque converter includes a turbine hub 30 on which clutch piston plate 32 is mounted for axial movement. The outer periphery of the clutch disc plate 32 carries a friction ring 34 that is adapted to engage a friction surface 36 formed on the interior of the impeller housing at a radial outward location. The clutch plate 32 cooperates with the impeller housing to define a bypass clutch control chamber 38. Annular pressure feed passage 40 is defined by turbine sleeve shaft 42 and pump driveshaft 44. The annular feed passage communicates with a control valve system located in a control valve body 46 at the upper side of the transmission housing 10. Communication between the passage 40 and the control valve body is established by radial ports 48 and communicating passage shown in part at 50. These are formed in the support wall 28 and in stationary sleeve shaft 26.

Turbine shaft 42 is splined at 52 to carrier 54 of a compound planetary gear unit 56, which acts as a forward and reverse gear drive with a direct forward drive ratio and a torque multiplying reverse drive ratio. Gear unit 56 includes sun gear 58, a ring gear 60, a first set of planetary pinions 62, and a second set of planetary pinions 64. The sets of planetary pinions 62 and 64 are journalled on carrier 54. The set of pinions 62 mesh with ring gear 66 and the set of pinions 64 mesh with sun gear 68. The pinions of one set mesh with the pinions of the other set.

Forward drive clutch 70 comprises a multiple disc clutch assembly having friction discs splined to clutch member 72, which forms a part of the carrier 54. Clutch 70 includes also friction discs carried by clutch cylinder 74 which is connected drivably to or is part of a drive sprocket 76 journalled on sleeve shaft portion 78 of end support wall 80 for the transmission housing. Cylinder member 74 defines an annular cylinder that receives annular piston 82, which is engageable with the friction discs of the clutch 70.

When the clutch 70 is applied, sun gear 58 is connected through the clutch to the ring gear 60. Thus, torque delivered to the carrier from the turbine shaft will be delivered with a 1:1 drive ratio to the sprocket 76 through the drive spline 84.

A reverse drive friction disc brake 86 has a first set of friction discs connected drivably to ring gear 66. A second set of friction discs is splined directly to housing portion 88 of the transmission housing 10. The support wall 50 of the housing 10 defines an annular cylinder 90. An annular cylinder received in cylinder 90 is adapted to engage the friction discs of the clutch 86, thereby locking the ring gear 60 to the housing when the brake is applied. The driving motion of the turbine shaft 48 will be reversed when the brake 86 is applied, thereby driving the sun gear 68 and the drive sprocket 76 in a reverse direction.

A variable displacement pump (not shown in FIG. 1) located in a pump housing generally shown in schematic form at 94 is connected drivably to the pump driveshaft 44. The variable displacement pump will be described with reference to the circuit diagram of FIGS. 3A and 3B and to the schematic view of FIG. 9.

Sprocket 76 is connected drivably by means of drive chain 96 to driven sprocket 98 located on a second axis 100 arranged in parallel disposition with respect to the first axis, which corresponds to the axis of crankshaft 12.

Sprocket 98 is journalled on stationary support shaft 102. Support shaft 102 is secured to the lower portion of the housing 10. Primary sheave assembly 104 is drivably connected to the sprocket 98 by a drive coupling indicated generally by reference numeral 106. This coupling defines a torque sensor as it acts to deliver torque from the sprocket 98 to the primary sheave assembly.

A coupling drive ring 108 is connected to or is formed integrally with sprocket 98. It includes an internally splined portion 110 which registers with an externally splined portion of annular piston 112. An annular cylinder 114 is formed in fixed servo piston member 116, which is splined at 118 to primary driveshaft 120. The fixed piston member 116 is journalled within the fixed sleeve shaft 102 which also supports the sprocket 98.

Annular piston 112 is received in the annular cylinder 114. It is splined at its periphery, as mentioned earlier, to the coupling member 108. It is also provided with a plurality of pockets that receive torque sensor balls 122. A torque sensor ring 124, which is splined to fixed piston member 116, is provided with pockets that receive balls 122. The pockets in the member 124 and in the annular piston have ramped surfaces that engage the balls. Thus, when torque is applied to the member 108 by the sprocket 98, the balls will tend to ramp up their respective ramp surfaces, thereby tending to separate the member 124 from the annular piston 112. As torque is delivered from the member 124 to the sheave driveshaft 120, the magnitude of the separating forces created by the balls and their respective ramps is proportional to the magnitude of the torque delivered to the primary sheave assembly by the sprocket 98.

Torque sensor supply pressure from a sheave minimum pressure regulator valve, to be described subsequently, is delivered to the annular cylinder 114 through passage 126 which communicates with an annular pressure feed passage 128 formed in the shaft 120. An exhaust port of variable size, shown at 130, is controlled by the piston 112. When the piston moves in a right hand direction, the opening of the exhaust port 130 decreases. That corresponds to an increased torque delivered by the sprocket 98. Back pressure in the passage 126 will be developed as the orifice size of the exhaust port 130 decreases. That increase in back pressure is used, as will be explained subsequently, as a torque indicator for determining the clutch pressure and the sheave pressure.

A sheave disc 132 is carried by the shaft 130. A companion sheave disc is slidably disposed on the shaft 120 as shown at 134. The sheave disc 134 is movable axially relative to the sheave disc 132. Disc 134 is coupled to the shaft 130 by a ball spline mechanism 136 which comprises a series of balls that register with internal and external grooves formed on the disc 134 and on the shaft 120, respectively. Sheave disc 134 cooperates with fixed annular piston 138, which is received in annular cylinder 140. Another annular piston 142 is secured to clutch disc cylinder 144. It cooperates with cylinder member 116 to define a pressure working chamber 146. Pressure is distributed to the working chamber 146 through passage 148 formed on the member 116.

A drive chain 150 is clamped between juxtaposed conical surfaces of the sheave disc portions 132 and 134. It frictionally engages the cone surfaces of the sheave discs in known fashion. Pressure admitted to the working chambers of the sheave assembly 104 causes axial adjustment of the sheave discs 132 and 134, one with respect to the other, thereby causing the working pitch radius of the drive chain to change as the sheave disc 134 moves axially relative to the shaft 120 on the ball spline connection shown at 136.

The right hand end of the shaft 120 is journalled by bearing 152 in a bearing support 154 which forms a part of the transmission housing 10. The chain is lubricated by distributing lubrication oil to the chain through a passage 156 formed in the shaft 120.

The drive chain 150 is trained over a driven sheave assembly 154 disposed on a third axis 158 which is arranged in parallel disposition with respect to the axis 156 for the primary sheave assembly.

The driven or secondary sheave assembly 154 comprises a pair of conical sheave discs 160 and 162 which have cone surfaces that frictionally engages the chain 150. Sheave disc 160 is formed with a hub that is journalled by bearing 164 supported by the housing as shown at 166. The sheave disc 160 is formed with a sleeve shaft 168 that surrounds torque output axle shaft 170. It is connected drivably to the hub of fixed piston 172 received in annular cylinder 174 are formed in the axially movable sheave disc 162. A ball spline connection 176 drivably connects the sleeve 168 to the movable sheave disc 162 allowing the movable sheave disc to move axially relative to the fixed sheave disc 160 while delivering torque. The hub of the axially fixed piston 172 is journalled by bearing 178 in bearing support wall 180 secured to the transmission housing.

The sheave disc 160 and the axially fixed piston 172 define a working chamber 182 which can be pressurized by fluid distributed to the sheave assembly through internal passage structure formed in the housing. A compression spring 184 normally urges the axially movable sheave disc 162 toward the fixed sheave disc 160.

Centrifugal pressure that develops in the working chamber 182 as the driven sheave is rotated is counteracted by centrifugal pressure in chamber 186. It is defined in part by annular disc 188 carried by the cylinder 174, which is axially fixed relative to the axially movable sheave disc 162.

The sleeve 168, which forms a part of the driven sheave assembly, is splined to the hub of final drive sun gear 190. This meshes with pinions 192 carried by planetary carrier 194. Ring gear 196 is fixed to the transmission housing and meshes with the pinions 192. Torque delivered to the sun gear 190 then is multiplied by the final drive planetary gear unit as planetary carrier torque is delivered to the carrier 198 of final drive differential gear unit 200.

The differential gear unit 200 includes a pair of side gears 202 and 204, the shaft 170 being driven by the side gear 204 and a companion axle shaft 206 being driven by the side gear 202. Each axle shaft 170 and 206 is connected to a vehicle traction wheel through a half shaft and universal joint mechanism (not shown).

As the piston and cylinder for the primary sheave assembly 104 adjust the spacing between the primary sheave discs, the overall ratio in the driveline changes as the effective pitch radius for the primary sheave increases. A corresponding decrease in pitch radius occurs at the secondary sheave assembly 154. The clamping load on the drive chain is determined by the chain loading servo shown in part at 172 and 174. The effective working area of the primary sheave assembly is double the effective area of the clamp loading sheave assembly 154 because of the double fixed piston arrangement of the primary sheave assembly. Thus, the actuator for the primary sheave assembly is used for ratio control and the actuator for the secondary sheave assembly is used for chain clamping control.

Figure 2:
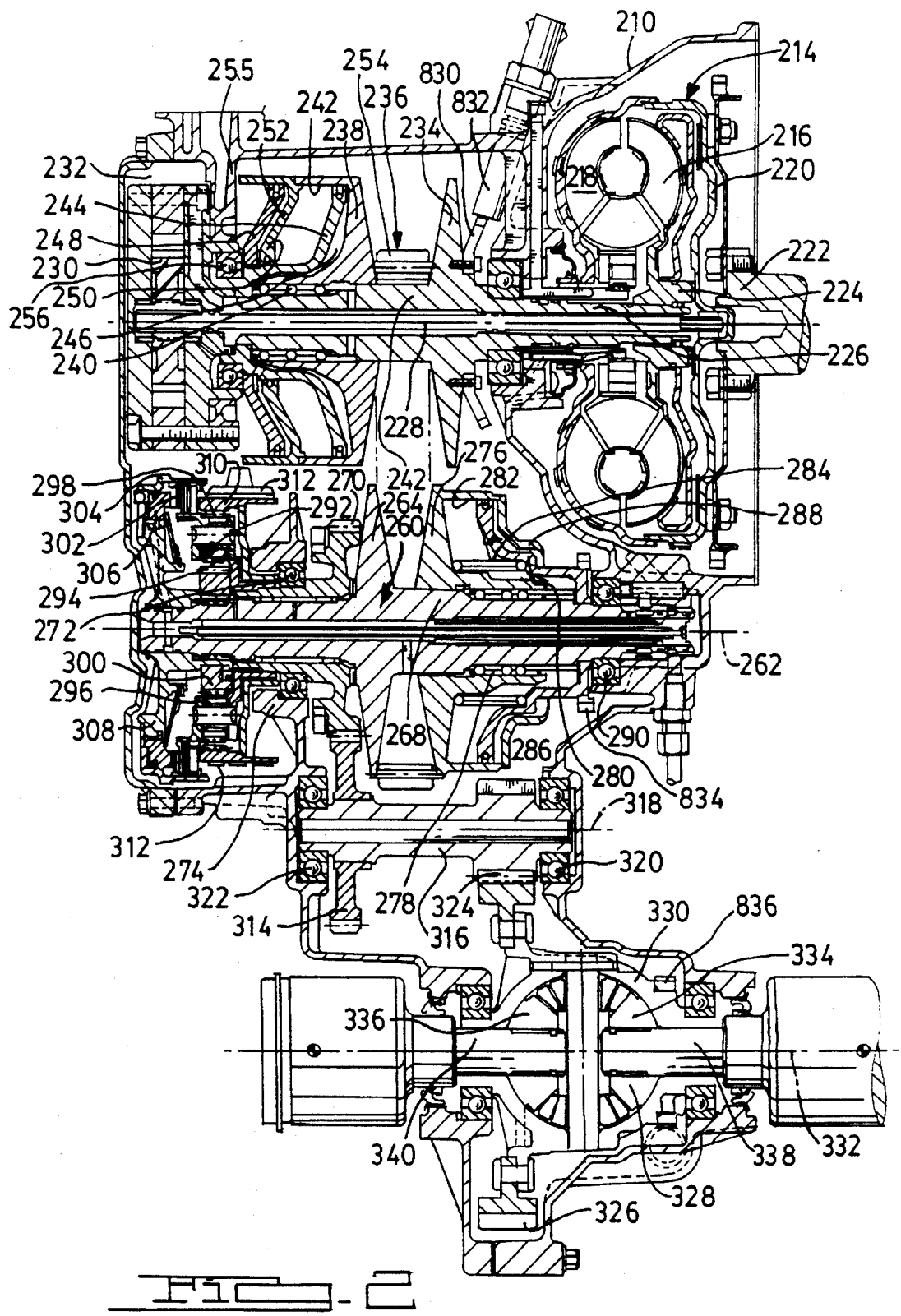
FIG. 2 is a view similar to the view of FIG. 1 although it shows an alternate embodiment of the transmission mechanism.

In FIG. 2, we have shown an alternate belt drive having four axes rather than three axes as in the FIG. 1 embodiment. In the FIG. 2 embodiment, the forward and reverse gear is located on the secondary sheave axis. The primary sheave axis is common to the torque converter axis. The third axis is the axis of an auxiliary torque multiplication gear unit which has additional ratio. The fourth axis is the axis of the torque output shafts that are driven by the gear differential. The arrangement of FIG. 2 has packaging advantages relative to the arrangement of FIG. 1.

In FIG. 2, numeral 210 designates the transmission housing. Numeral 214 identifies generally the hydrokinetic torque converter that corresponds to the hydrokinetic torque converter described with reference to FIG. 1. It includes a bladed turbine 216 and a bladed impeller 218, the latter being comprised of an impeller housing 220 which is connected to the crankshaft 222 of an internal combustion engine. Turbine 216 has a hub 224 which is splined to a turbine sleeve shaft 226 surrounding the positive displacement pump driveshaft 228. Positive displacement pump 230 is drivably connected to the shaft 228. It is located in a pump housing 232 located at the left side of the transmission housing 210 as viewed in FIG. 2.

Driven sleeve shaft 226 forms a part of or is connected directly to sheave disc portion 234 of a primary sheave assembly 236. The companion sheave disc portion 238 is connected by a ball spline coupling 240 to the hub 241 of the sheave portion 234. Sheave portion 238 has an annular cylinder 242. An axially fixed piston 244 is positioned in the cylinder 242 and cooperates with the disc portion 238 to define a working pressure chamber 246. Another fixed piston portion 248 cooperates with a wall 250 carried by the disc portion 238 to define a second pressure chamber 252.

When the pressure chambers 252 and 246 are pressurized, the disc portion 238 is adjusted axially on the ball spline 240. This tends to decrease the spacing between juxtaposed conical surfaces on the disc portions 238 and 234. Drive chain 254 located between the conical surfaces of the sheave disc portions will be adjusted upon movement of the disc portion 238, thereby changing the effective pitch radius of the chain.

The piston 248 and the piston 244 are journalled by bearing 256 on bearing support 258 which forms a part of the housing 210.

The secondary sheave assembly 260 is located on a second axis 262. It includes a first sheave disc 264, which is axially fixed. It is provided with a shaft 268, which is splined to the hub of a torque transfer gear 270. The hub of gear 270 is journalled by bearing 272 in bearing support wall 274, which forms a part of the housing 210. An adjustable sheave disc portion 276 is drivably connected to shaft 268 by a ball spline connection 278 which accommodates axial movement of the disc portion 276 relative to the shaft 268 while preventing relative rotation therebetween.

A fixed piston 280 is splined at its hub to the shaft 268. It is received in annular cylinder 282 and cooperates with a cylinder to define pressure chamber 284. A compression spring 286 located between the disc portion 276 and the piston 280 provides a minimum preload for the secondary sheave assembly 260. An end wall 288 provides an annular chamber that receives lubrication fluid and establishes a centrifugal force and opposes the centrifugal force developed in the pressure chamber 284. The right hand end of shaft 286 is journalled by bearing 290 in a bearing opening formed in the housing 210.

A forward-and-reverse gear unit is shown at 292. It includes a carrier 294 which is splined to the hub of gear 270 which. The hub, in turn, is splined to the shaft 268. A first set of planet pinions 294 and a second set of planet pinions 296 are journalled on the carrier 294. Pinions 295 engage ring gear 298 and pinions 296 engage sun gear 300. The pinions of the first set 294 engage the pinions of the second set 296.

A friction disc clutch 302 comprises clutch discs carried by clutch cylinder 304 which is splined at its hub to the shaft 268. Clutch 302 comprises a companion clutch disc carried by the carrier and an annular piston 306 situated in an annular cylinder 308 formed in the clutch member 304. Ring gear 298 forms a part of a brake drum 310 surrounded by brake band 312, which can be applied and released by a fluid pressure operated servo (not shown).

When the brake 312 is applied, sun gear 298 acts as a reaction member. Torque delivered to the shaft 268 by the secondary sheave assembly drives the carrier of the planetary gear unit 292. With the ring gear acting as a reaction member, sun gear 300 is driven in a reverse direction thus driving torque transfer gear 270 in a reverse direction.

When the brake 312 is released and the clutch 302 is applied, the elements of the gear unit 292 rotate together with a 1:1 ratio and the gear 270 is driven in a forward driving direction.

Torque transfer gear 270 meshes with intermediate gear 314 which is splined to countershaft 316. Countershaft 316 is located on a third axis 318 and is straddle-mounted by bearings 320 and 322 positioned in bearing openings formed in the housing 210.

Countershaft 316 forms a part of reduced pitch diameter countershaft gear 324, which engages ring gear 326 on differential gear unit 328. A differential carrier 330 supports the ring gear 326 and is journalled on a fourth axis 332.

Drive pinions carried by the carrier 330 engage differential side gears 334 and 336 which, in turn, are drivably connected to torque output axle drive shafts 338 and 340, respectively.

Figure 3A:
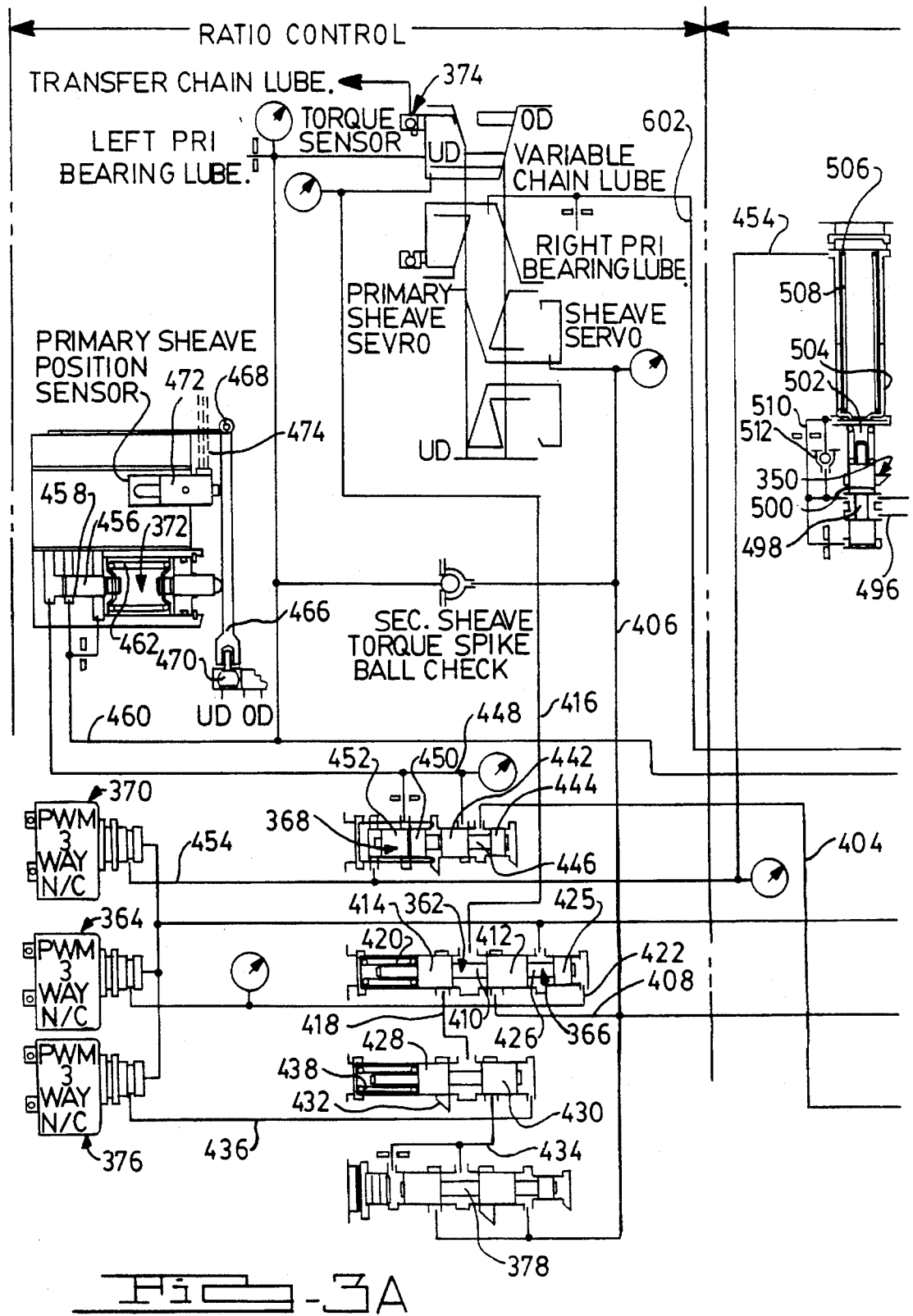
Figure 3B:
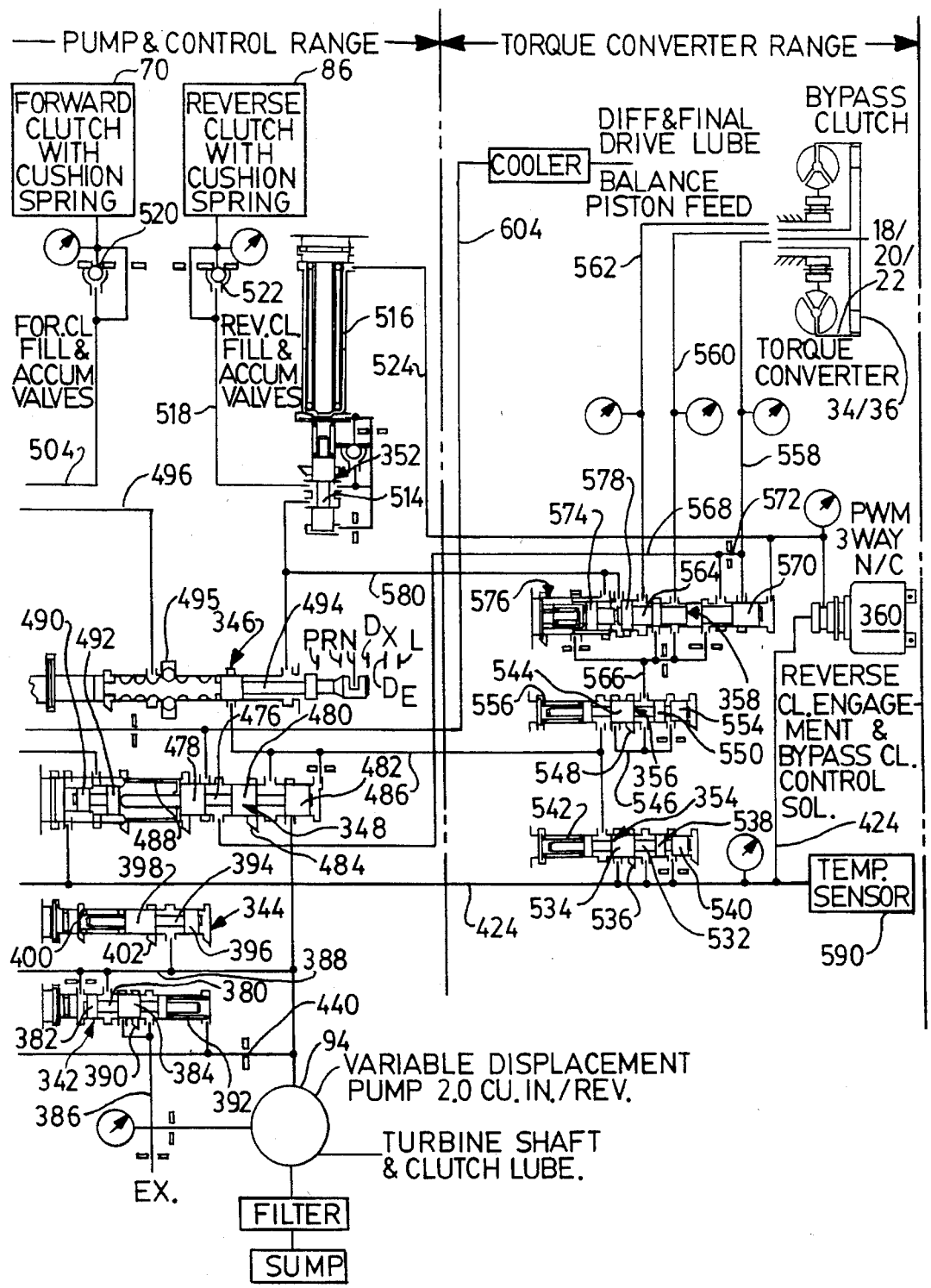

Electro-hydraulic Controls of FIGS. 3A and 3B

Electro-hydraulic controls for controlling transmission ratio, the pump and clutches and the torque converter are shown in the schematic valve diagram of FIGS. 3A and 3B taken together. The valve system of FIGS. 3A and 3B functions to control the pump displacement, the forward and reverse clutches, the torque converter and bypass clutch, and the primary and secondary sheave assemblies. It also provides for control of lubrication fluid delivered to the transmission elements.

The valve system comprises fifteen valves in addition to five ball check valves and four solenoids. The pump control and a pump limit valve are located in the pump assembly apart from the range control valve and the torque converter controls. The torque sensor regulator valve is located on the primary sheave assembly shaft. The balance of the valves are located in the valve body 46, seen in FIG. 1, located at the top of the transmission housing. The valve diagram of FIGS. 3A and 3B corresponds to the embodiment that is shown in FIG. 1.

The control system of FIGS. 3A and 3B provides for a minimum pressure on the primary sheave during start-up conditions. The torque sensor shown in FIG. 3A and the sheave minimum pressure regulator provide pump displacement control. Three of the solenoids are pulse-width modulated solenoids. They are used to control, respectively, the bypass clutch slip, the ratio control and the pump pressure. An on/off solenoid valve is used to switch the primary sheave minimum pressure from a true exhaust to a preset percentages of line pressure.

The valve system of FIGS. 3A and 3B will permit vehicle operation in the event of an electronic malfunction which would interrupt the normal operation of the solenoid valves. In that event, the chain ratio will default to full overdrive and the bypass clutch will remain off. The forward clutch and the reverse brake engagements are controlled by accumulators and the minimum pressure on the primary sheave servo is set to approximately ½ of the pump pressure. This is sufficient to prevent chain slip under such emergency conditions.

The pump control valve is shown at 342 and the pump pressure limit valve is shown at 344. The pump control valve sets the pump pressure by controlling pump displacement for pump 94. The pressure limit valve limits the pump pressure and the pressure for the sheave assemblies.

A manual valve 346 controls the exhaust for the forward-and-reverse drive clutch and brake circuits in park and neutral. It provides also a feed for the forward drive clutch circuit in drive range and low range operation. It also provides a feed for the reverse brake circuit when it is shifted to the R position.

A clutch pressure regulator valve 348 sets the clutch feed pressure and controls the cooler flow and the variable chain lubrication flow.

A forward clutch fill and accumulator valve 350 controls the forward clutch engagement. It responds to sheave pressure booster pulse-width modulated solenoid pressure. Reverse clutch fill and accumulator valve 352 controls the reverse clutch engagement. It is controlled by the bypass control pulse-width modulated solenoid.

A solenoid regulator valve 354 provides a feed under regulated pressure to the solenoid valves. A converter regulator valve 356 provides a feed for the converter and regulates the converter pressure. A bypass clutch control valve 358 provides for converter feed and for regulating the converter bypass clutch differential pressure. The bypass clutch is controlled in turn by the pulse-width modulated bypass clutch control solenoid shown at 360.

A primary sheave control valve 362 controls the chain ratio by regulating the flow to and from the primary sheave assembly. It is controlled in turn by the ratio control pulse-width modulated solenoid 364.

The primary exhaust regulator valve 366 provides a regulated exhaust pressure for the primary sheave assembly that is proportional to the pump pressure. A sheave pressure booster 368 boosts the pump pressure above the sheave minimum pressure required to avoid slip. It is controlled by the sheave pressure booster pulse-width modulated solenoid 370.

The sheave minimum pressure regulator 372 maintains a minimum pressure in the primary sheave assembly and in the secondary sheave assembly. The torque sensor pressure regulator 374 provides a torque signal that is proportional to input torque on the driving sheave assembly.

An on/off solenoid valve 376 controls the primary exhaust control valve 366. Primary exhaust regulator 378 provides a regulated exhaust pressure for the primary sheave servo that is proportional to the pump pressure.

The pump control valve 342 is a regulator valve having a valve spool 380 with regulating valve lands 382 and 384. Pump discharge pressure in line 386 communicates with valve 342 and the degree of communication between line 386 and regulator line pressure passage 388 is controlled by land 384. Land 384 also controls the degree of communication between the passage 386 and exhaust port 390. Valve spring 392 urges the valve element 380 in a left hand direction. Feedback pressure from line 388 is distributed to the left hand side of the land 382.

The line 388 communicates with the pump pressure limit valve, which comprises a valve spool 394 having spaced lands 396 and 398. Valve spool 394 is urged in a right hand direction by valve spring 400.

Land 398 restricts the degree of communication between passage 388 and exhaust port 402. Thus, the valve 344 restricts the pump output pressure to a predetermined value, which may be approximately 85 psi.

The pump control valve 342 adjusts the pump displacement control pressure in the pump 94 to vary the pump displacement. The pressure in the control chamber for the pump and the flow are adjusted to maintain a 20 psi differential pressure between the boosted minimum sheave pressure and the pump outlet pressure, the boosted sheave minimum pressure being the pressure in line 404 which extends to the sheave pressure booster valve 368 and which communicates with the discharge side of the pump 94.

Regulated line pressure on the output side of the pump control valve 342 communicates directly with the secondary sheave servo through line 406. The primary sheave control valve 362 also communicates with the outlet side of the pump 94 through line 408. Primary sheave control valve 362 includes a valve land 410 having flow control lands 412 and 414. Land 412 controls communication between passage 408 and passage 416 which extends to the primary sheave working chamber. Land 414 controls communication between passage 416 and passage 418, which extends to the primary exhaust control valve 366. Valve spring 420 urges the valve spool 410 in a right hand direction. Pressure in the ratio control solenoid pressure passage 422 acts on the right hand end of a third land 424 on the valve spool 410. Pressure in passage 422 is controlled by the pulse-width modulated three-way solenoid valve 364, which is a normally closed valve. When the valve 364 is energized, communication is established between the solenoid feed pressure passage 424 and passage 422. Pressure in passage 422 thus is a function of the duty cycle for the solenoid valve 364. Solenoid feed pressure acts also on the differential area of lands 412 and 425, which establishes a force that opposes the force of the spring 420.

When the valve 362 assumes the position shown in FIG. 3A, the pressure in passage 416 and in the working chamber of the primary sheave servo is trapped and the torque ratio established by the chain and sheaves will remain unchanged. This is a so-called steady state or null condition. Flow of fluid to and from the primary servo is shown in FIG. 14A where servo fluid flow is plotted against valve position. The null condition is shown at 423. If the value of the signal in passage 422 should decrease, communication will be established between passage 408 and passage 416, and communication between passage 416 and exhaust passage 418 will be prevented. This will tend to increase the pressure in the primary sheave servo, thus tending to move the drive chain toward its overdrive position as the sheave discs are moved closer together. On the other hand, if the signal in passage 422 should increase, communication between passage 408 and 416 will be prevented as communication between passage 418 and passage 416 is established. This will tend to exhaust pressure from the primary sheave servo and the servo disc will separate thereby allowing the chain to assume an underdrive position.

Passage 418 leads to primary exhaust control valve 366. It comprises a valve spool 426 having spaced lands 428 and 430. Land 428 controls communication between line 418 and exhaust port 432. Land 430 controls communication between passage 418 and passage 434 which leads to the primary exhaust regulator valve. The primary exhaust control valve can be shifted by a primary exhaust control solenoid pressure in passage 436, which leads to valve 376. That valve is an on/off three-way solenoid valve that normally is closed. Valve 376 and previously described valves 364 and 370 are supplied with solenoid feed pressure from passage 424. When pressure in passage 436 is present, the valve spool 426 will be shifted to the left against the force of valve spring 438.

The boosted minimum sheave pressure in passage 404 is distributed to the sheave pressure booster valve 368. Passage 404 communicates with the discharge side of the pump 94 across a control orifice 440.

Passage 404 communicates with the valve 368 between lands 442 and 444 on booster valve spool 446. Lands 442 and 444 have a differential area. Thus, the pressure in passage 404 biases the valve spool 446 in a left hand direction. The minimum sheave pressure developed in minimum sheave pressure passage 448 is fed back to the differential area of lands 450 and 452. The sheave pressure booster valve 368 is under the control of the output signal of valve 370. That pressure signal is distributed through passage 454 to the left side of land 452. An increase in the signal in passage 454 will result in a decrease in the degree of communication between passage 404 and passage 448 extending to the sheave minimum pressure regulator valve 372.

The sheave minimum pressure regulator valve 372 comprises a valve element 456 received in valve bore 458. Passage 448 communicates with the valve bore at the left side of the valve element 456. The valve land on the valve element 456 controls the degree of communication between passage 448 and torque sensor passage 460. Valve spring 462 acts on valve element 456 and urges it in a left hand direction as seen in FIG. 3A.

Valve spring 462 also acts on a lever 466 having a fixed pivot 468. The operating end 470 of the lever 466 is connected mechanically to the movable sheave disc 134 of the primary sheave assembly 104. Thus, the degree of communication between the minimum sheave pressure passage 448 and the torque sensor feed passage 460 depends upon the spring force of the spring 462 which, in turn, depends upon the drive ratio of the sheave assemblies.

A primary sheave position sensor 472 has a movable core that mechanically engages the lever 466 so that the reactance of field windings for the sensor 472 will change depending upon the position of the sheave discs of the primary sheave assembly. The output of the position sensor 472 in signal output leads 474 thus is a motion-to-voltage output transducer signal. Thus, sheave minimum pressure regulator and the sheave pressure booster valve cooperate to produce the boosted minimum reference pressure in passage 404. The torque sensor and the sheave minimum pressure regulator provide adequate pump pressure for the purpose of clamping the secondary sheave. Adjustments in the secondary sheave pressure are made by the pump control valve as pressure in passage 404 communicates with the spring chamber for the valve 342. An increase in the pressure in passage 404 will result in an increase in the pressure in passage 386 which decreases the displacement of the pump 94.

The clutch regulator valve 348 comprises a valve spool 476 which has spaced lands 478, 480 and 482. Lands 480 and 482 control the degree of communication between passage 388 and exhaust port 484 and the degree of communication between clutch pressure passage 486 and passage 388. The valve 348 regulates the pressure in passage 388 to produce a regulated clutch pressure in passage 486. The regulated pressure acts on the right hand end of the land 482, which produces a regulated pressure force that oppose the force of valve spring 488. Regulated solenoid feed pressure in passage 424 is distributed to the left side of booster land 490 and torque sensor pressure in passage 460 acts on the differential area of land 490 and land 492 of the booster for the clutch regulator valve assembly 348. The clutch pressure then increases upon an increase in the torque sensor pressure.

The manual valve 346 comprises a movable valve element 494 having spaced valve lands that distribute clutch pressure from passage 486 to either the forward clutch or the reverse clutch depending upon whether the valve spool 494 is adjusted to the reverse position R shown in FIG. 3B or one of the drive range positions Dx, De or L. A ball detent mechanism 494 defines each of the operative positions of the manual valve element 494. When the manual valve 346 is positioned as shown, pressure is distributed from clutch pressure passage 486 to passage 496, which leads to the forward clutch fill and accumulator valve assembly 350. Valve 350 comprises a valve spool 498 with spaced lands that are received in valve chamber 500. Valve spool 498 is urged in a downward direction, as viewed in FIG. 3B, by valve spring 502. The lands on valve spool 498 establish communication between clutch pressure passage 496 and forward clutch feed passage 504. When the valve element is positioned as shown at the beginning of forward clutch engagement, pressure in passage 496 acts on the lower end of the valve spool 498. The same pressure acts on accumulator piston 505 which is urged in a downward direction as viewed in FIG. 3B by accumulator spring 506.

Piston 505 is situated in accumulator valve chamber 508. As pressure is distributed from passage 498 through control orifice 510 to the accumulator piston, pressure gradually builds up in passage 505, thus providing a cushioned engagement for the forward clutch. The piston 505 strokes against the force of valve spring 506 during clutch pressure build-up. During the clutch engagement period, the pressure in the clutch acts against the force of spring 506 as well as the pressure force in passage 454 on the output side of the pressure booster and forward clutch engagement solenoid valve 370. Quick release of the forward clutch occurs when the manual valve is moved to the reverse position as orifice 510 is bypassed by one-way check valve 512.

The reverse clutch engagement is controlled by the reverse clutch fill and accumulator valve assembly 352. This valve operates in a manner similar to the operation of the valve 350. It includes a valve spool 514 corresponding to the valve spool 498 for the forward clutch. Valve assembly 352 also includes an accumulator piston 516 which operates in a manner similar to the accumulator piston 504 for the forward clutch.

In the case of each of the clutch control valves 350 and 352, the valve and the accumulator are parallel to the clutch. The accumulator and clutch valve arrangement allows the valve to fill with no restriction. Each accumulator is fed through an orifice and exhausted through a ball check valve. Further, each passage 505 and 518, which are clutch feed passages, contains a one-way check valve element, as shown at 520 and 522, respectively. These valve elements protect against clutch tie-up under rapid range selecting conditions. As in the case of the forward clutch, which receives back pressure from a pulse-width modulated solenoid valve, the reverse clutch receives back pressure from the reverse clutch engagement and bypass clutch control solenoid valve 360 through passage 524.

Figure 16:
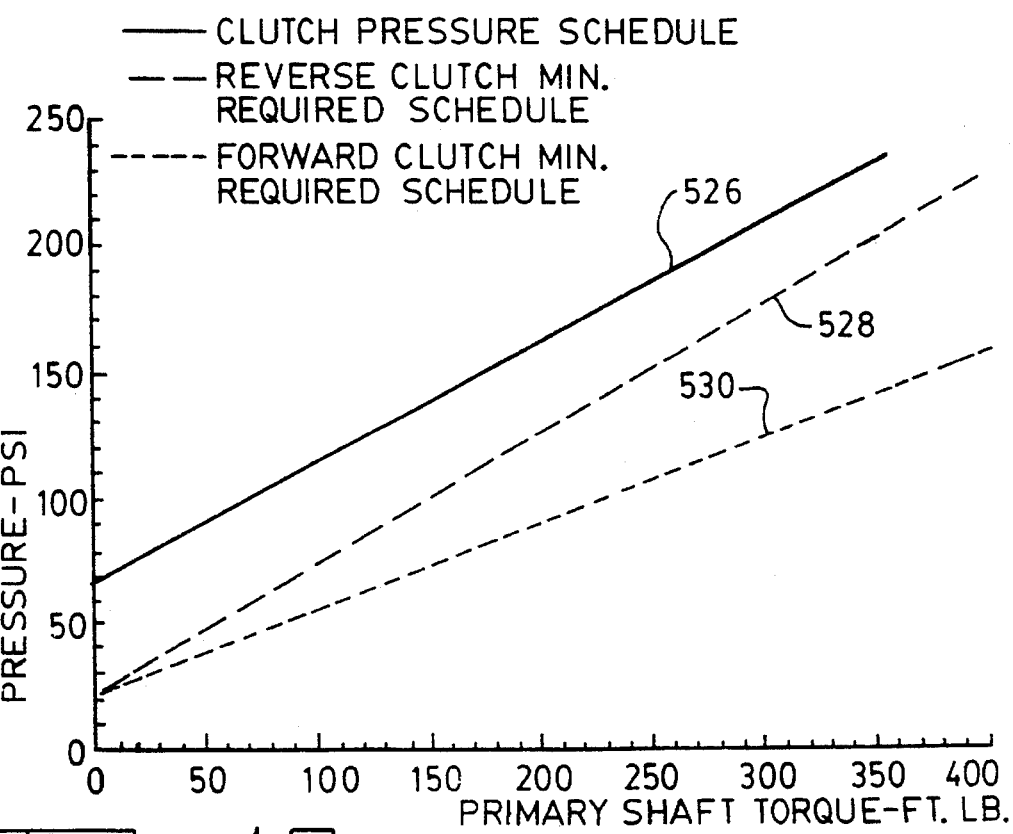
FIG. 16 shows the clutch pressure schedules for the forward clutch and the reverse clutch of the transmission of FIG. 1.

The various stages of clutch pressure build-up for the forward and reverse clutches with the respective accumulators is illustrated in FIG. 16 where primary shaft torque is plotted against clutch pressure. Line 526 in FIG. 16 represents the clutch pressure schedule. It shows the increasing clutch pressure requirement as primary shaft torque increases. The minimum reverse clutch torque that is required in order to avoid clutch slipping is shown at 528, and the corresponding minimum clutch pressure required for the forward clutch is shown at 530. The separate accumulators for each of the forward and reverse clutches are controlled by a separate pulse-width modulated valve, so the pressure requirements for each clutch can be particularly tailored for forward driving operation or reverse driving operation.

The torque converter controls include the solenoid regulator valve 354, which supplies a regulated solenoid pressure in passage 424 as described previously. This valve is a regulator valve with a valve spool 532 which has a valve land 534 that controls communication between solenoid feed pressure passage 424 and clutch pressure passage 486. It also controls the degree of communication between passage 424 and exhaust port 536. Feedback pressure in passage 424 is distributed to the differential area of lands 538 and 540. The force developed by the pressure on the differential area of lands 538 and 540 acts against spring 542, thus establishing a regulator action. Passage 424 feeds reverse clutch engagement and bypass clutch solenoid control valve 360 as well as the pulse-width modulated valves 370 and 364 and the on/off valve 376.

The clutch pressure in passage 486 is distributed to the converter regulator valve 356 which acts in a manner similar to the action of valve 354. Valve 356 includes land 544 which controls the degree of communication between passage 486 and passage 546. It also controls the degree of communication between passage 546 and exhaust port 548.

Feedback pressure in passage 546 is distributed to the differential area of lands 550 and 554. The force developed by the pressure acting on the differential area of lands 550 and 554 opposes the force of valve spring 556.

Output pressure from the converter regulator valve is distributed to the multiple land bypass clutch control valve 358. This valve controls flow into and flow from the torque converter circuit as well as flow to the bypass clutch control chamber and flow from the bypass clutch control chamber. Flow from the converter passes through passage 558. Flow to the converter passes through passage 560. The flow of bypass clutch actuating fluid passes to the bypass clutch control chamber through passage 562.

Valve 358 includes a valve spool 564 which establishes communication between the bypass clutch feed passage 562 and converter regulator valve outlet pressure passage 566. When the valve spool is shifted in a right-hand direction, fluid is fed directly from passage 566 to the bypass clutch, thus unlocking the bypass clutch, and the converter acts as an open converter. Fluid passes directly to the converter circuit through the bypass clutch chamber and also through converter feed passage 560. The converter fluid flow from the converter passes through the passage 568.

When the bypass clutch is locked, land 570 blocks direct communication between passage 558 and converter outlet passage 568, although flow between these passages is permitted by flow restricting orifice 572.

The right side of land 570 receives output pressure from the reverse clutch engagement and bypass clutch control solenoid 360, which is present in passage 524 as explained previously.

The converter regulator valve 356 controls the upper limit for the converter charge pressure to about 100 psi. The solenoid regulator valve establishes an upper limit of about 58 psi in passage 424. The output of the converter regulator valve acts on a differential valve land area for bypass clutch control valve land 574. It produces a force that supplements the force of clutch regulator valve spring 576.

Valve element 564 includes also a valve land 578 which is pressurized by reverse clutch pressure in passage 580, thus assuring that the bypass clutch is released during reverse drive. A temperature sensor 580 is located in the solenoid feed line 424 for the purpose of developing a signal that may be used by the microprocessor.

Figure 17:
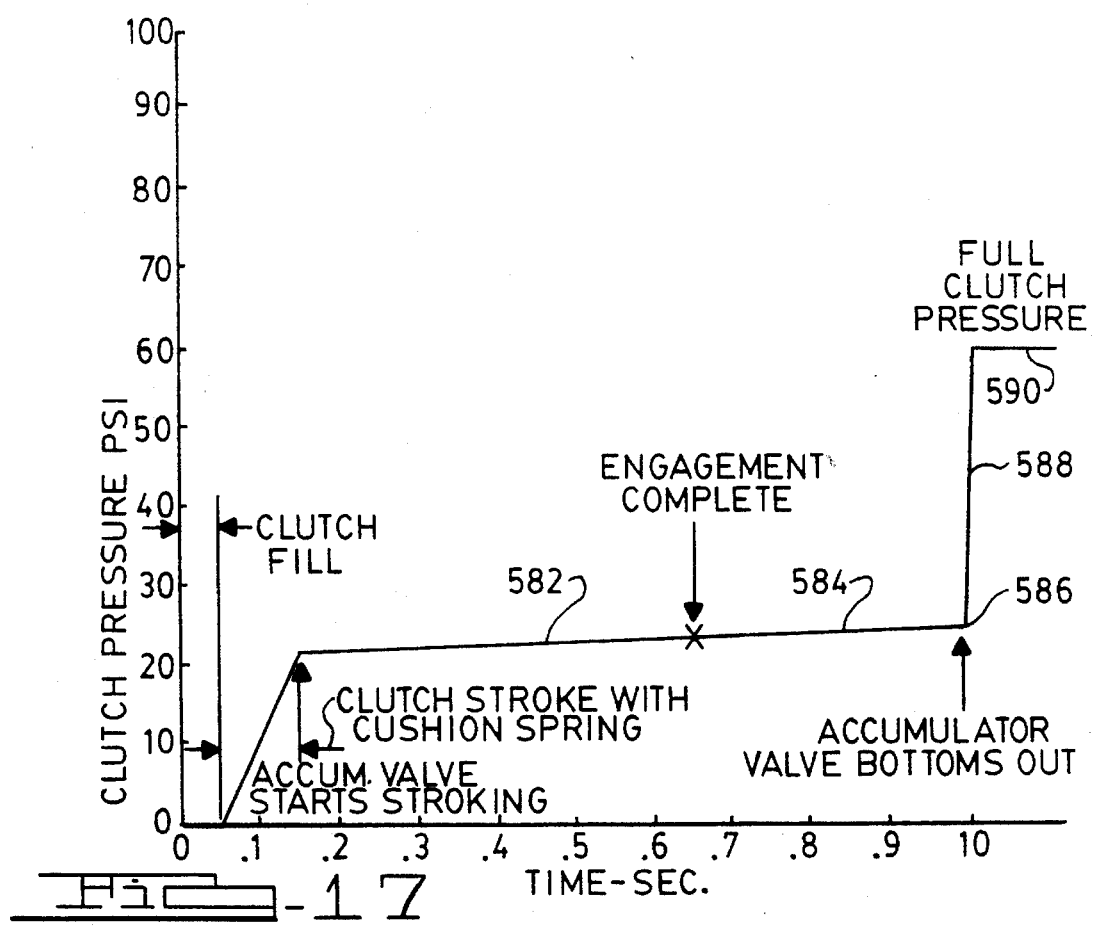
FIG. 17 shows the accumulator characteristics for the valve system of FIGS. 3A and 3B wherein the clutch pressure is plotted against accumulator stroking time.

FIG. 17 shows a clutch pressure plot in which clutch pressure is plotted against time. The forward clutch fill and accumulator valve 350 or the reverse clutch fill and accumulator valve 352 produces the pressure build-up characteristics shown in FIG. 17 where clutch pressure is plotted on the ordinate. The plot of FIG. 17 shows the clutch engagement starting at about 0.05 seconds following the initiation of the clutch engagement routine. During the time interval from 0 seconds to 0.05 seconds the clutch apply circuit is filling. The accumulator valve then begins to stroke until it reaches a value of about 20 psi. After an expiration of about 0.15 seconds, the clutch begins to stroke toward the engagement condition as indicated by the flat line 582. Stroking continues until engagement is complete at point 584. The accumulator valve still is stroking at this time, and the stroking continues until the 1.0-second time point is reached at 586. After the accumulator bottoms out as it is stroked against the force of the accumulator spring, clutch pressure rises rapidly as shown at 588 until full clutch pressure is achieved at 590.

Figure 18:
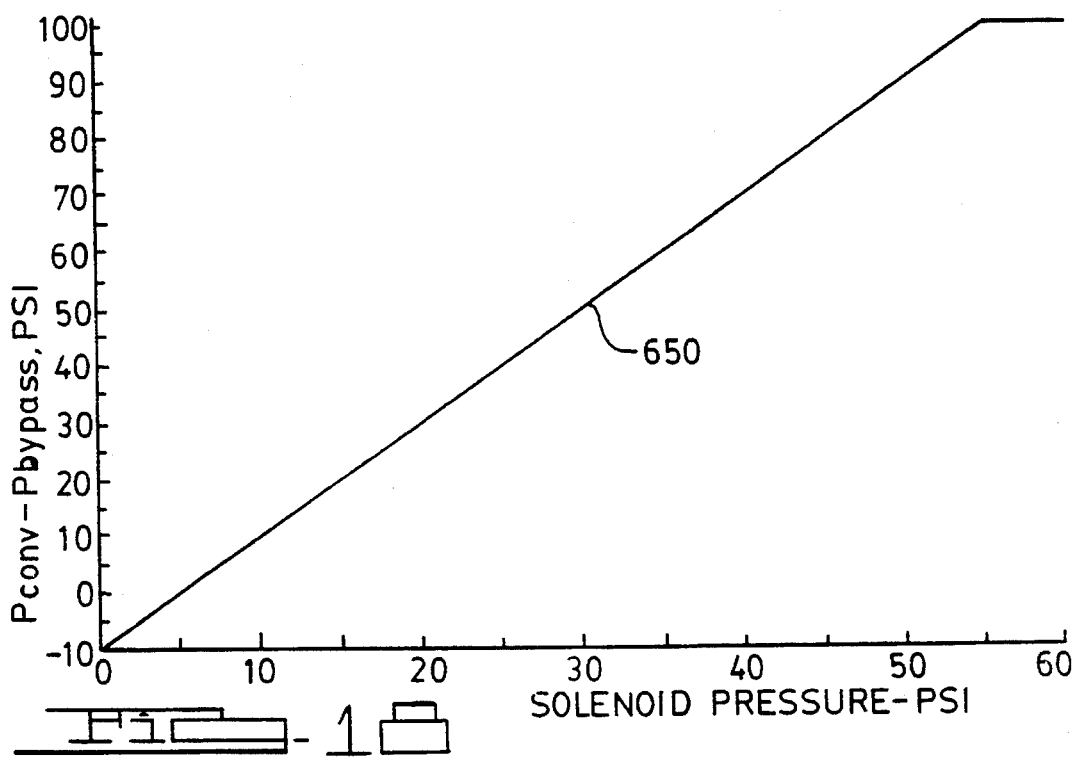
FIG. 18 is a plot of the bypass clutch control valve characteristics, specifically the relationship between solenoid pressure and bypass clutch pressure.

FIG. 18 shows the bypass clutch control valve characteristics for the solenoid valve 360. Solenoid pressure shown on the abscissa of FIG. 18 controls the differential pressure across the bypass clutch relative to the converter charge pressure, as indicated by the straight line relationship of FIG. 18. The solenoid feed regulator 356 is set so that the feed pressure is established at about 58 psi.

During the ratio control for the circuit of FIGS. 3A and 3B, the flow for the pump is distributed directly to the secondary servo, as mentioned previously. The pump flow that is diverted to the primary shift control valve controls the primary shift flow both to and from the primary servo. Since the primary servo has nearly twice the servo apply area as the secondary servo, the secondary servo is used to control chain clamping forces, and the primary servo is used to control ratio.

The overlapping of lands 414 and 412 of the primary shift control valve will provide for a constant sheave ratio since flow to each servo and exhaust fluid from each servo is prevented, thus providing a hydraulic lock as a constant ratio is maintained. If the pulse-width modulated solenoid valve 364 is triggered to cause the valve 410 to shift in a left-hand direction, passage 416 is exhausted. If the valve element 410 is shifted in the other direction, primary shift pressure is delivered from passage 408 to passage 416. This corresponds to a downshifting to underdrive in the valve and sheave assembly. The operating state in which the primary sheave is exhausted corresponds to an upshifting to overdrive.

The primary exhaust control valve will regulate the pressure in passage 418 to maintain a pressure of about one-half of the pump pressure. Thus, depending upon whether the on/off valve 376 is actuated, the primary exhaust control valve will determine whether the exhaust port for the primary shift control valve communicates with true exhaust or to a regulated exhaust. Thus, the primary sheave servo will always remain pressurized, even when the chain is in its full underdrive position.

Figure 19:
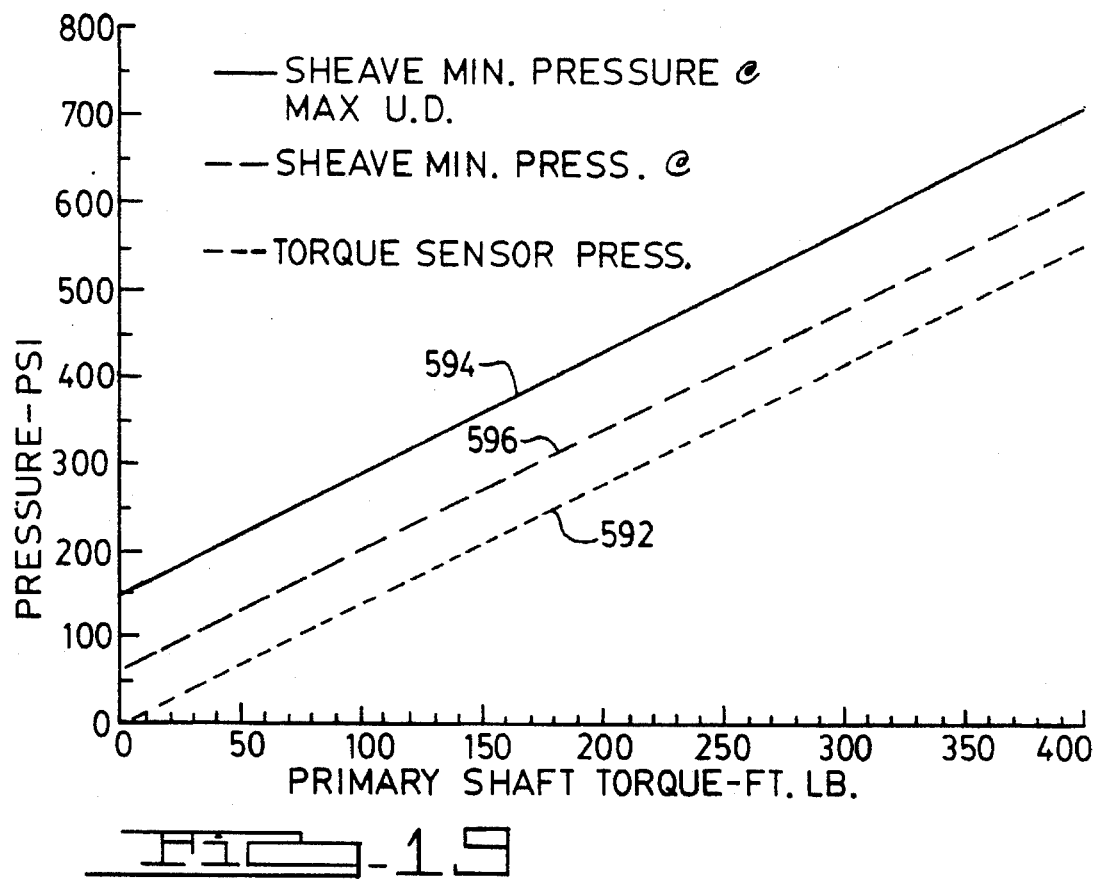
FIG. 19 is a plot of the sheave minimum pressure schedule for the primary sheave of the transmission of FIG. 1.

As previously explained, the torque sensor, the sheave minimum regulator pressure valve and the sheave pressure booster valve provide a reference pressure for establishing the pump outlet pressure. The minimum pressure for the sheave minimum pressure regulator is a function of the primary shaft torque and the chain ratio. This characteristic is shown in FIG. 19 where sheave minimum pressure is plotted on the ordinate and the primary shaft torque is plotted on the abscissa. The output pressure of the torque sensor is shown with the linear functional relationship designated by numeral 592. Reference numeral 594 shows a minimum pressure when the primary sheave is moved to its maximum underdrive position. When the primary sheave is in its one-to-one ratio and its overdrive position, the sheave minimum pressure schedule is lower as indicated by line 596 in FIG. 19.

The torque sensor functions to convert the torque on the primary sheave shaft to a pressure with a gain of 1.4 psi per lbs.-ft. The exhaust from the torque sensor, which functions as a constantly open orifice blow-off valve, is directed to the lube circuit for the fixed transfer chain 96 and the torque sensor splines, the lubrication circuit being defined in part by passage 148. The sheave minimum pressure regulator augments the effect of torque sensor pressure as the sheave ratio changes. This is accomplished by the pivoting arm 466 which follows the motion of the primary sheave piston. The arm 466 provides the input signal for the sheave minimum pressure valve. The linear potentiometer as shown at 472 provides the microprocessor with an indication of the primary sheave position.

Figure 20:
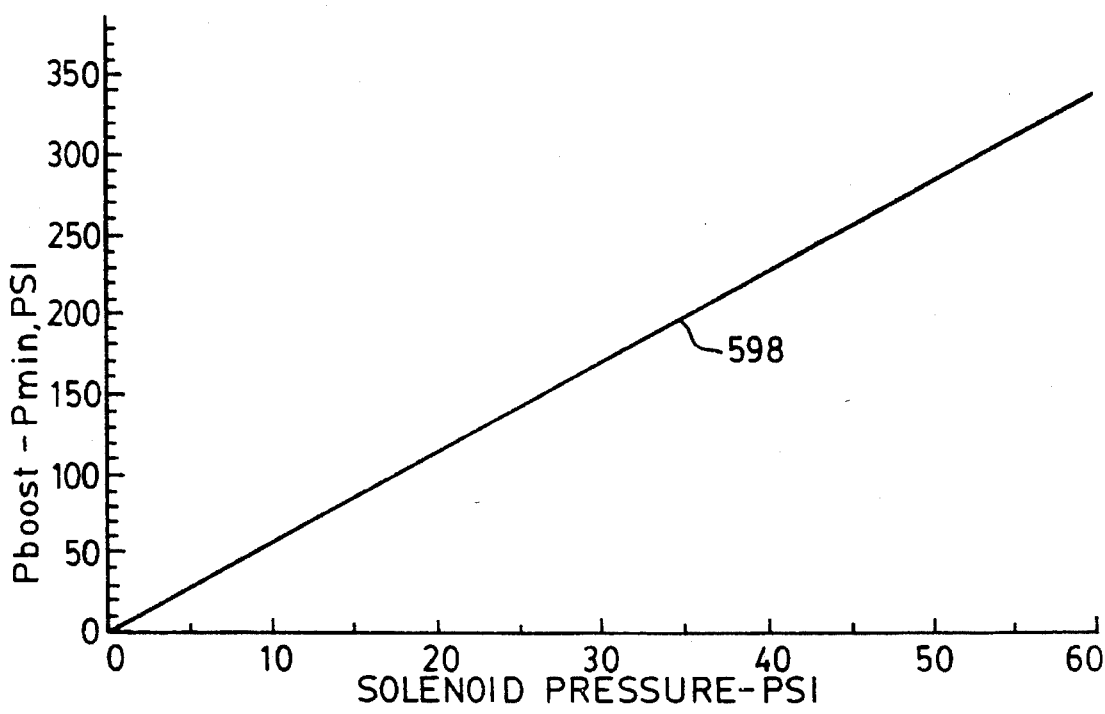
FIG. 20 is a plot of the sheave pressure booster valve characteristics, specifically the relationship between solenoid pressure and boost pressure.

The sheave pressure booster valve provides a boost in the pump pressure by adding pressure to the required minimum sheave pressure. The magnitude of that added pressure depends upon the output signal of the pulse width modulated solenoid valve 370. The relationship of solenoid pressure to the boost pressure is established by the sheave pressure booster valve is plotted in FIG. 20. For each value of solenoid pressure established by solenoid valve 370 there is a resulting pressure equal to the boost pressure minus a minimum sheave pressure. That differential pressure is plotted on the ordinate. The relationship between the solenoid pressure and the effective boosted minimum sheave pressure is a linear relationship as indicated in FIG. 20 at 598.

The lube oil that is exhausted from the torque sensor lubricates the fixed ratio torque transfer chain, as mentioned previously. Since the torque sensor rotates with the primary sheave, the exhaust from the torque sensor will spray oil onto the chain. A portion of the sprayed oil will find its way to the ball spline 176 on the axis of the shaft 158.

The lube oil for the ball spline connection 138 is tapped from the feed for the torque sensor. Further, a small portion of that oil is allowed to leak and lubricate the shaft support bearing 152. The balance of the oil that is leaked is transferred to radial opening 600, shown in FIG. 1, which allows lubricating oil to be distributed to the variable ratio chain 150 as well as to each of the sheave assemblies.

The turbine shaft, the forward and reverse friction clutch plates and the various thrust bearings are lubricated by pump leakage that is directed through the space surrounding the pump shaft 44 and through the turbine shaft to lubrication holes in the turbine shaft.

In FIGS. 3A and 3B, the lube circuit for the variable ratio chain, designated by reference numeral 602, is connected to the clutch regulator valve. Distribution of lube to the passage 602 is controlled by valve land 478.

An oil cooler is supplied with fluid through passage 604, which also communicates with the clutch regulator valve and with the lube passage 602. The return flow from the cooler supplies the final drive and differential assembly with lubrication fluid. The bushings and bearings associated with the final drive and differential on the third axis 158 are lubricated with this return flow. Some of that oil is diverted to fill the annular space 186 so that a centrifugal pressure balance will be established to counteract the centrifugal pressure build-up in working chamber 182 of the secondary sheave assembly.

Figure 9:
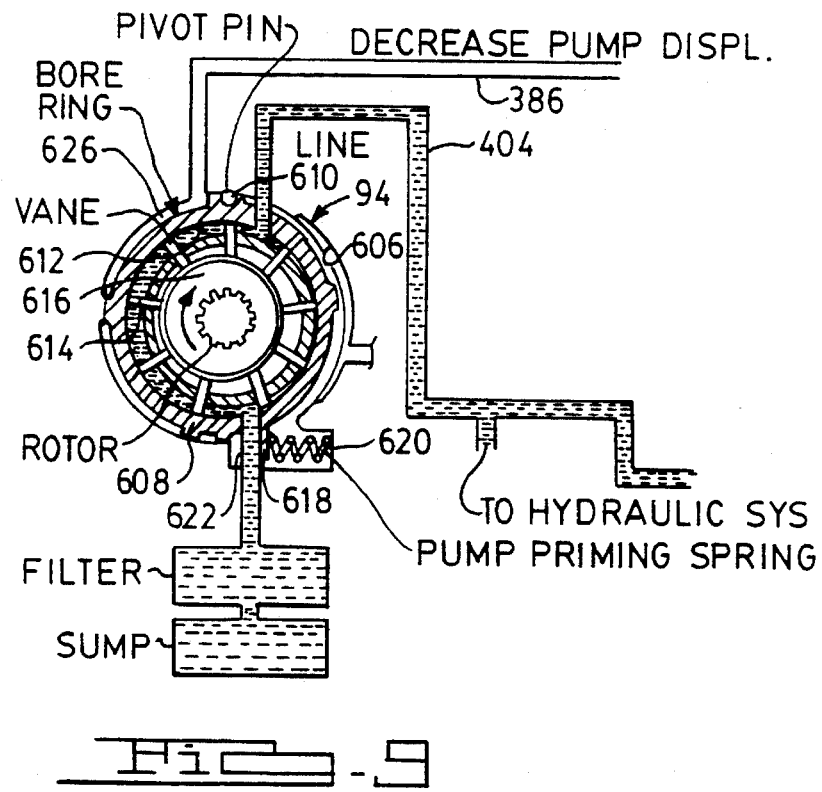
FIG. 9 is a diagram of the oil pump indicated schematically in FIG. 3B.

The pump 94 of FIGS. 3A and 3B is shown in more detail in FIG. 9. It includes a pump housing having a pump bore 606. A pump bore ring 608 is pivoted on pivot pin 610 in the bore 606. The ring 608 is provided with an inner surface 612 that is slidably engaged by pump vanes 614 carried by pump rotor 616. The vanes are situated for sliding movement in vane slots formed in the rotor 616.

The bore ring has a radially extending shoulder 618 that is engaged by pump primer spring 620. The force of spring 620 tends to adjust the bore ring in a counterclockwise direction, as viewed in FIG. 9, about the pivot pin 610. When the rotor is rotated, the vanes will carry fluid from intake port 622 to outlet port 624, which communicates with line pressure passage 404. Fluid delivered to the pump fills the spaces between adjacent vanes and transfers the fluid through a pumping arc. The eccentricity of the rotor with respect to the wall 612 causes the pressure to increase until it has discharged at port 624. The volume of the spacing between adjacent vanes is varied as the bore ring 608 is adjusted. The force of spring 620 and the force of hydraulic fluid pressure in pressure cavity 626 in the bore 606 are in opposition. An increase in the pressure in chamber 626 will cause a decrease in the eccentricity and hence a decrease in the displacement of the pump.

Pressure is delivered to the pressure cavity 626 through passage 386 described with reference to FIGS. 3A and 3B.

Figure 14:
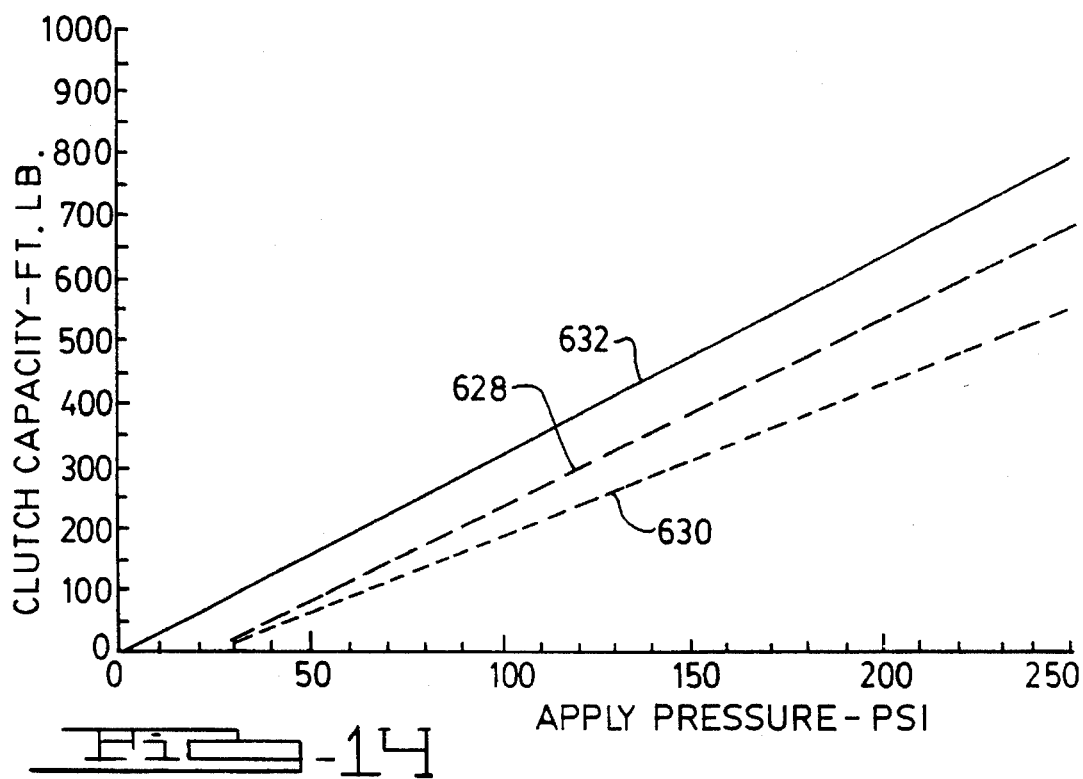
FIG. 14 is a plot showing the relationship between clutch apply pressure and clutch capacity for a preferred embodiment.

FIG. 14 shows the clutch capacity characteristics for the bypass clutch, the reverse clutch and the forward clutch. Each clutch capacity is related linearly to the apply pressure, the latter being plotted on the abscissa. The clutch capacities for the bypass clutch, the reverse clutch and the forward clutch are shown on the ordinate. As the apply pressure is increased, the capacity is increased linearly in accordance with the characteristic shown at 628 in the case of the reverse clutch, at 630 in the case of the forward clutch, and at 632 in the case of the bypass clutch.

Figure 10:
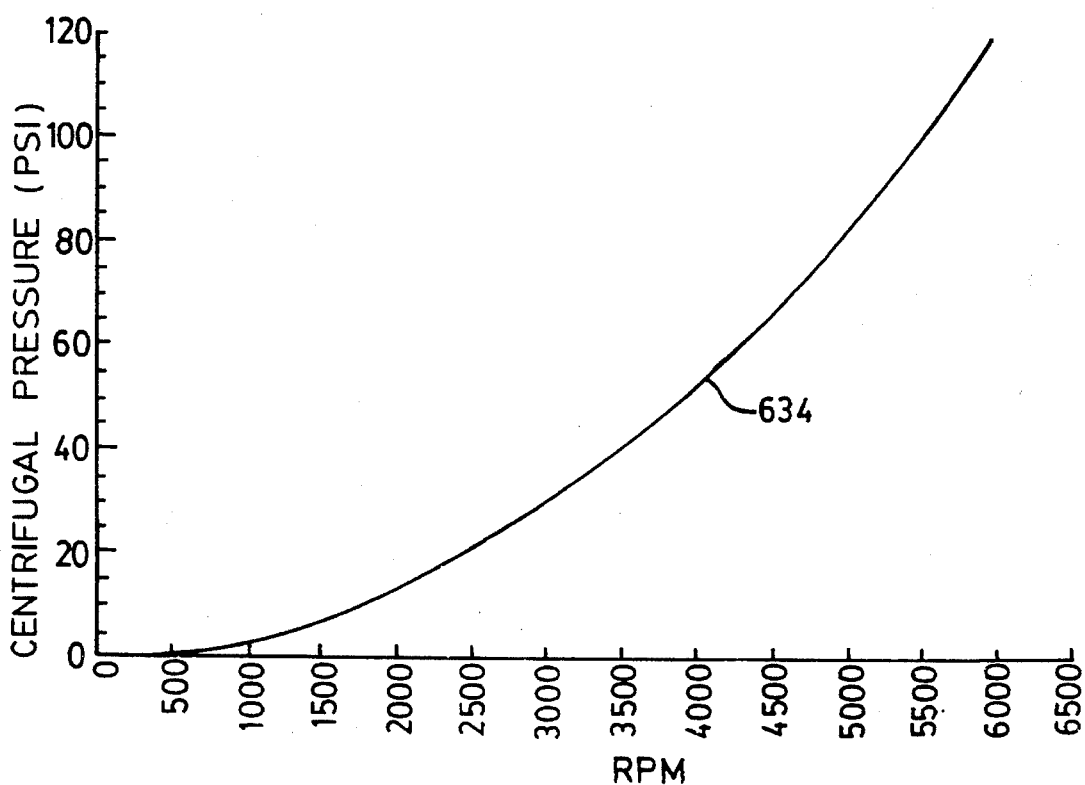
FIG. 10 is a plot showing the centrifugal pressure and speed relationship for the forward clutch indicated in FIG. 1.

FIG. 10 shows the relationship between the turbine shaft speed and the centrifugal pressure in the forward clutch. The centrifugal pressure is plotted on the ordinate and the speed is plotted on the abscissa. As seen in FIG. 10, the relationship between pressure and speed, as expected, is a second order curve 634. This centrifugal pressure, at any given clutch speed, should be taken into account in calculating the clutch capacity characteristics that are described with reference to FIG. 14.

Figure 11:
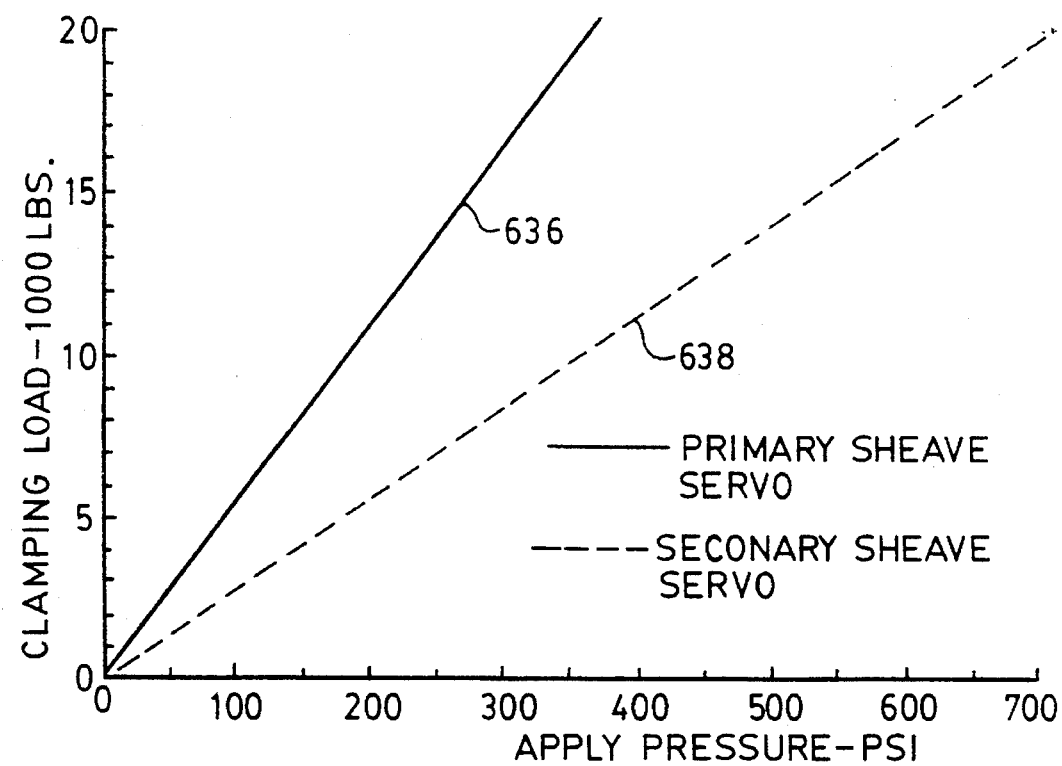
FIG. 11 is a plot showing the relationship between clamping load and servo pressure for the servos indicated in FIG. 1.

FIG. 11 shows the servo clamping characteristics. The clamping load on the servos is in direct relationship with apply pressure. In FIG. 11, the clamping loads are plotted on the ordinate and apply pressure is plotted on the abscissa. The relationships for the primary sheave and the secondary sheave are linear. The primary sheave pressure clamping load relationship is shown at 636, and the secondary sheave clamping load apply pressure relationship is shown at 638.

Figure 12:
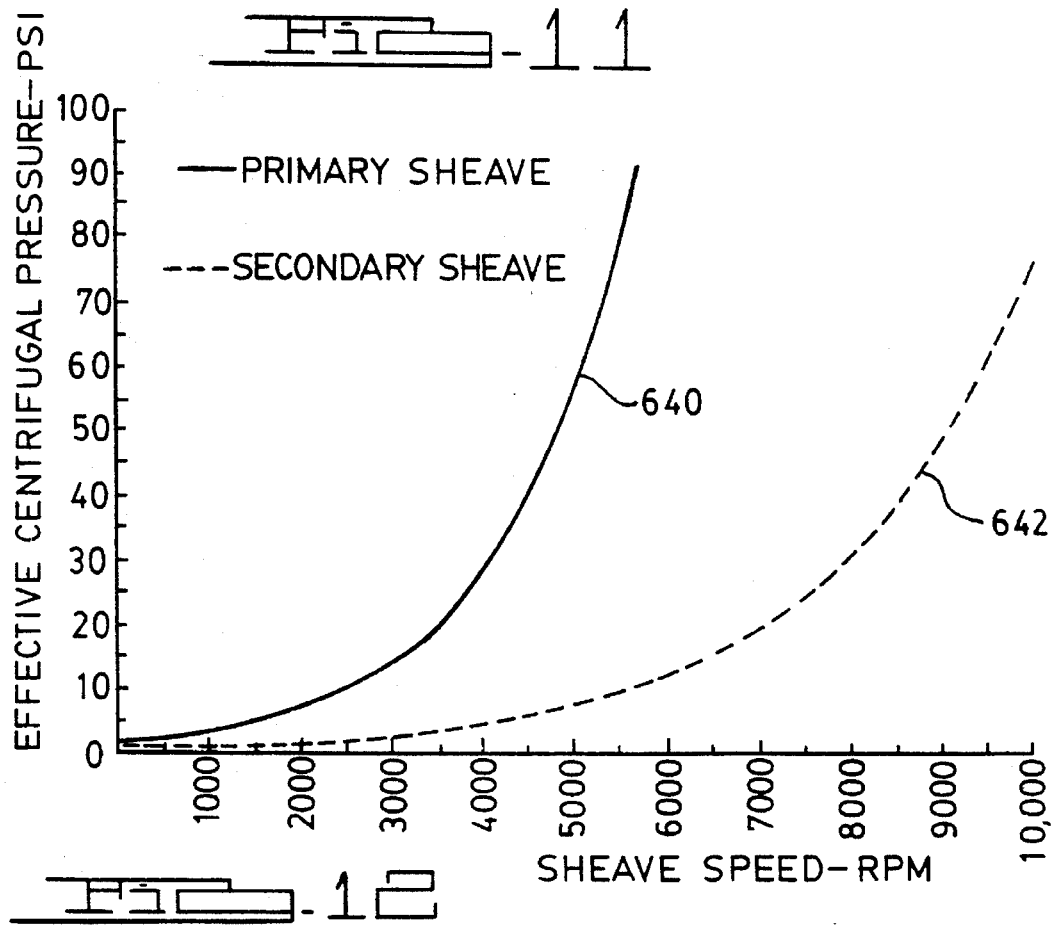
FIG. 12 is a plot showing the centrifugal pressure versus sheave speed relationship for the sheave servos indicated in FIG. 1.

FIG. 12 shows the relationship between primary sheave speed and the effective centrifugal pressure in the primary sheave. This is a second order relationship, as shown at 640. The corresponding second order relationship between effective centrifugal pressure and secondary sheave speed is shown at 642.

As previously explained, the centrifugal pressure in the centrifugal pressure chamber located between the fixed piston 138 and the movable piston 142 of the primary sheave assembly opposes the centrifugal pressure build-up in the working chambers of the primary sheave assembly. Since there is only one centrifugal pressure chamber in the primary sheave assembly to counterbalance the forces of two effective working chambers, the effective centrifugal pressure build-up for the primary sheave assembly is steeper and faster rising relative to the corresponding centrifugal pressure build-up for the secondary sheave assembly. As previously explained, the centrifugal pressure build-up in the working chamber 182 for the secondary sheave assembly is opposed by the centrifugal pressure build-up in the centrifugal pressure chamber or space 186 of the secondary sheave assembly.

Figure 13:
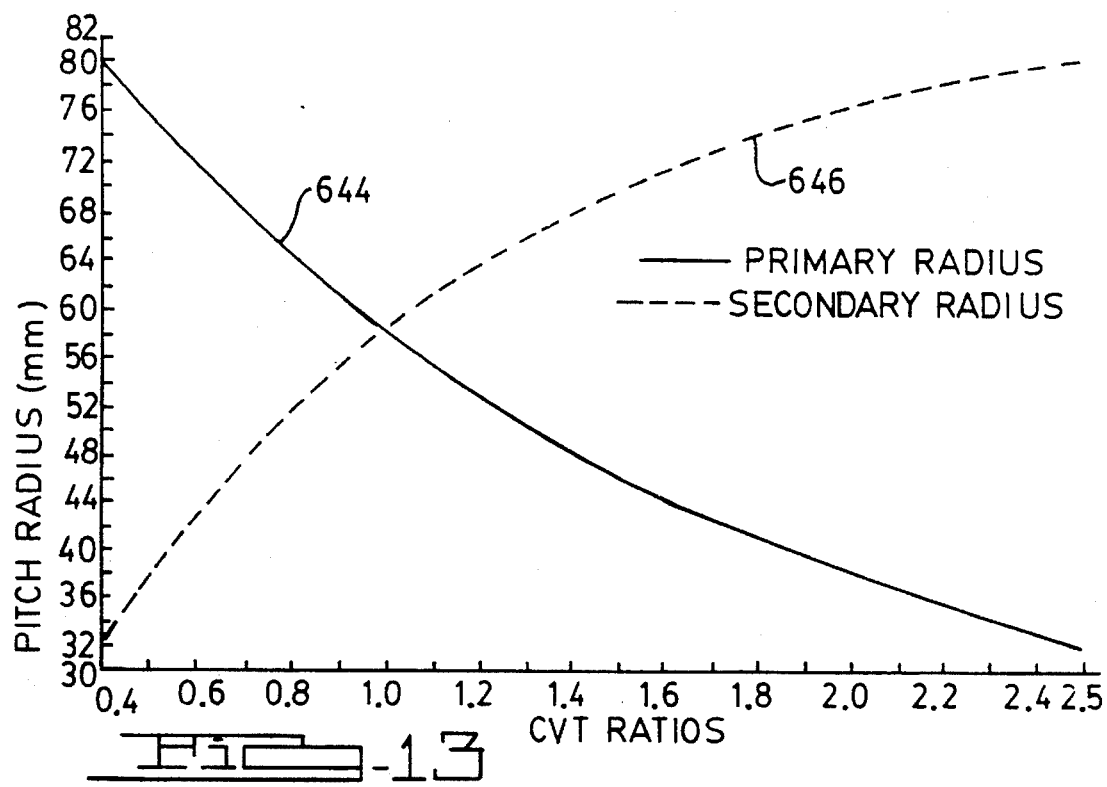
FIG. 13 is a plot of the pitch radius versus CVT ratio for the servos of FIG. 1.

As also explained previously, the pitch radii for the primary sheave assembly and the secondary sheave assembly change as the overall ratio varies, a decrease in the effective pitch radius for the primary sheave assembly being accompanied by a corresponding increase in the pitch radius for the secondary sheave assembly and vice versa. In FIG. 13, we have shown the relationship between sheave drive ratio and the pitch radius for the primary sheave assembly by curve 644. Curve 646 shows the corresponding relationship between ratio and pitch radius for the secondary sheave assembly. Curve 646 as a mirror image of curve 644. An effective ratio of 1:1 is achieved when the pitch radii are equal. This occurs at a pitch radius of about 58 millimeters, as indicated in FIG. 13, for a preferred embodiment of the invention.

Figure 15:
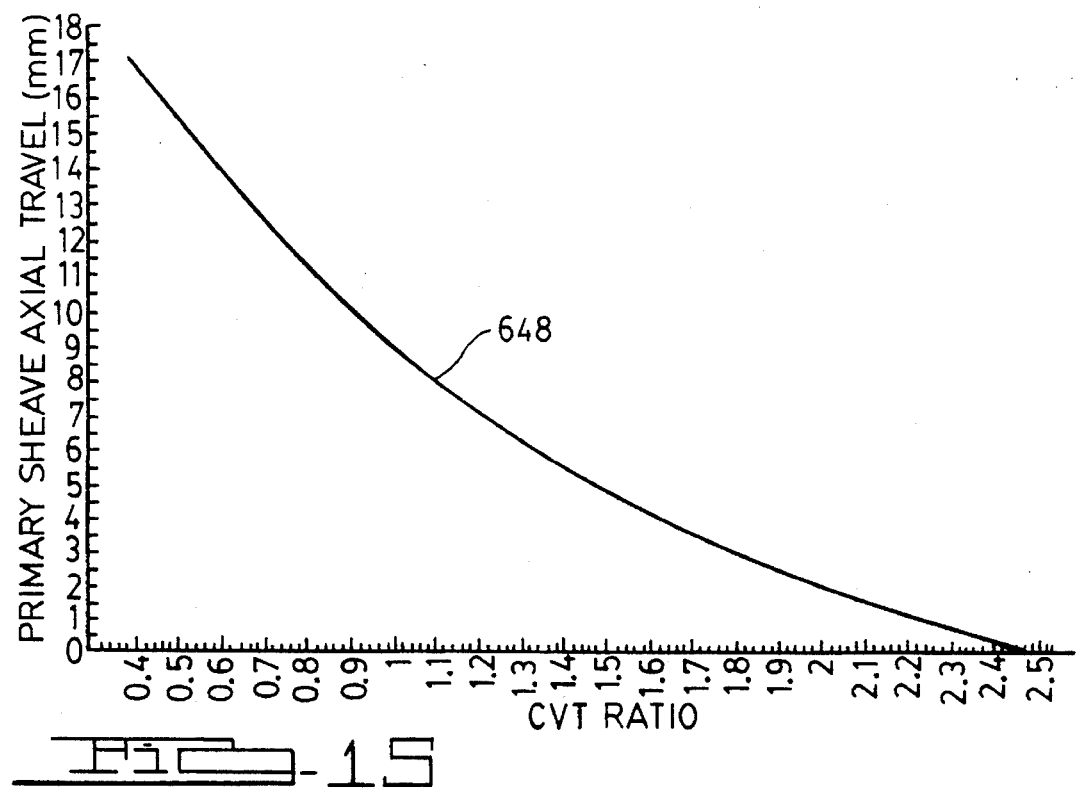
FIG. 15 is a plot showing the primary sheave position versus CVT ratio relationship for the transmission of FIG. 1.

The relationship between primary sheave axial travel and sheave ratio is illustrated in FIG. 15. The information plotted in FIG. 13 can be used to compute the relationship shown in FIG. 15 since travel of the primary sheave piston will either increase or decrease the effective pitch radius of the primary sheave assembly. That travel corresponds to either a decrease or an increase in the pitch radius of the secondary sheave assembly.

The relationship between primary sheave axial travel and sheave ratio in a preferred embodiment will result in a ratio of about 4:1 when the spacing between the disc portion of the primary sheave assembly is 17 millimeters. As the spacing decreases, the functional relationship will change, as shown at 648, until a high speed ratio of 2.5:1 is reached.

As mentioned earlier, the pulse width modulated valve 360 controls the bypass clutch control valve. The pressure signal developed by the solenoid valve 360 acts on the bypass clutch control valve to produce a bypass clutch engagement pressure. This pressure is opposed by the converter pressure. Thus, the bypass clutch engagement pressure is the difference between converter pressure and bypass clutch pressure. That pressure differential across the bypass clutch is plotted in FIG. 18 on the ordinate. The abscissa in FIG. 18 is a solenoid pressure output. The bypass clutch differential pressure is linearly related to the output of the solenoid valve 360, as indicated by reference numeral 650 in FIG. 18.

FIG. 3C shows in schematic form the overall electro-hydraulic control system comprising the microprocessor, the electro-hydraulic controls, the transmission and the engine in block diagram form. The microprocessor is identified in FIG. 3C by the numeral 652. The electro-hydraulic controls described with reference to FIGS. 3A and 3B are identified in FIG. 3C by reference numeral 654. The transmission which comprises the primary and secondary sheave assemblies described with reference to FIG. 1 is identified in FIG. 3C by reference numeral 656. The engine is identified by reference numeral 658.

Electronic Control

The microprocessor 652 comprises a central processing unit, memory, custom input signal conditioning circuits, and custom output driver circuits. It also has a clock for controlling the CPU. The control strategy is stored in a single memory chip. The input signal conditioning circuit forms an interface between the CPU and the analog and digital sensor devices. The output signal conditioning circuit interfaces the digital outputs from the CPU with the external solenoid driver circuits.

The input signals for the electronic microprocessor 652 include a signal developed by a Hall effect engine speed sensor and a turbine speed Hall effect-type sensor as well as three variable reluctance speed sensors which will be described. The turbine speed sensor is comprised of a disc 660, shown in FIG. 1, carried by the compound planetary carrier. The disc is snaked through the clearance between the forward and reverse clutch cylinders as indicated in FIG. 1. The periphery of the disc rotates in proximity to pick-up device 662 supported by the transmission casing as shown in FIG. 1.

A forward clutch speed sensor is identified in FIG. 1 by reference numeral 664. It is a variable reluctance-type sensor, which includes a pick-up as shown in FIG. 1 located in the housing. Four teeth are located on the forward clutch outer cylinder 74 which pass in proximity to the pick-up 664. As the turbine rotates, the sensor reads only turbine speed when the forward clutch is engaged. In reverse, the sensor reads 1.153 times the turbine speed because of the planetary gearing. The sensor also is used to indicate primary shaft speed. The primary shaft speed is equal to the speed measured at the sensor divided by the fixed transfer chain ratio. The secondary sheave speed sensor includes a pick-up 666 indicated in FIG. 1. Four teeth are located on a disc attached to the parking gear wheel as shown at 664 in FIG. 1. This sensor is a variable reluctance-type sensor. It can be used in place of the output sensor or it can be used to hold a constant ratio.

Output speed sensor 668, as shown in FIG. 1, is mounted on the differential housing portion of the transmission housing. As in the case of the secondary shaft speed sensor, it is a variable reluctance-type sensor which picks-up electrical impulses from teeth 670 located on the differential carrier 198 shown in FIG. 1.

Figure 21:
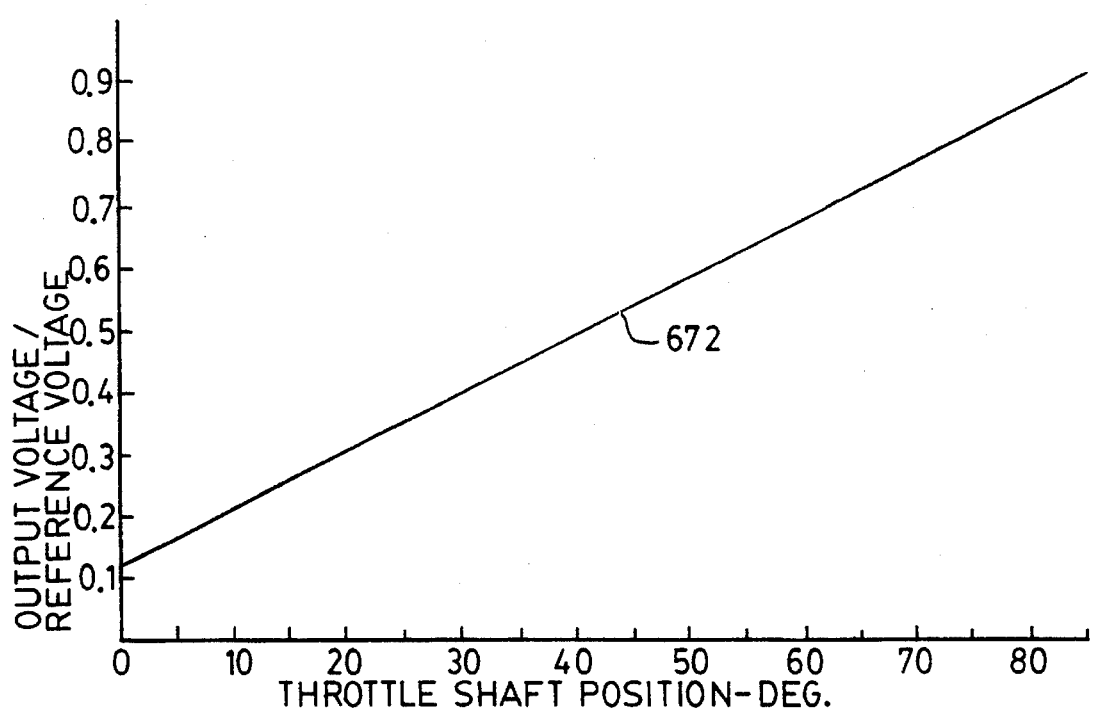
FIG. 21 is a plot of the throttle position sensor transfer function, specifically the relationship between output voltage of the throttle position sensor versus throttle shaft position.

A throttle position sensor is a variable resistance-type rotary potentiometer. The controller will apply a reference voltage to the sensor and the throttle position output signal that results depends on the throttle position since the throttle position determines the resistance of the potentiometer. The transfer function for the throttle position sensor is shown in FIG. 21, where throttle position is plotted against output voltage divided by the reference voltage supplied by the controller. The relationship between voltage and throttle position is a linear relationship, as shown by the function 672 in FIG. 21.

Figure 22:
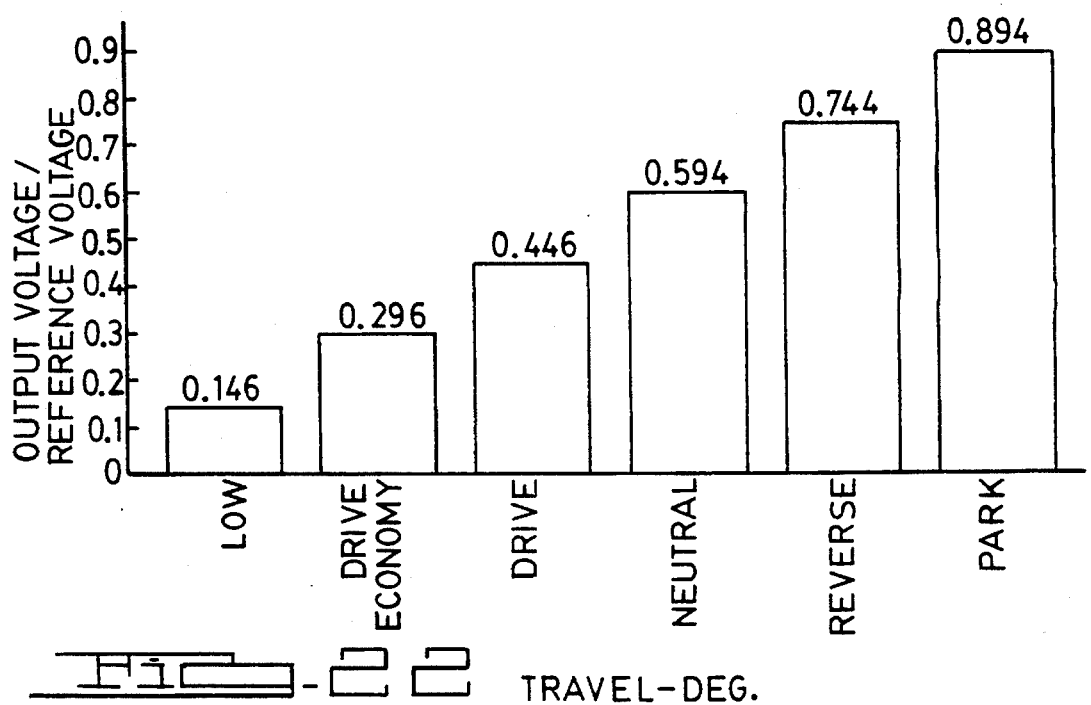
FIG. 22 is a plot of the range position sensor transfer function, specifically the voltage signals that are developed for each of the multiple range positions of the manual valve.

The range position sensor is a rotary sensor that contains a series of resistors. Each resistor is brought into operation as the range position lever is moved. This provides a changing resistance for the sensor as the lever is moved. This is indicated in FIG. 22 where the travel of the range selector lever is plotted on the abscissa and the signal output voltage divided by the reference voltage is plotted on the ordinate. As the range position lever moves from the low to the park position, the voltages progressively increase in steps as indicated in FIG. 22.

Figure 23:
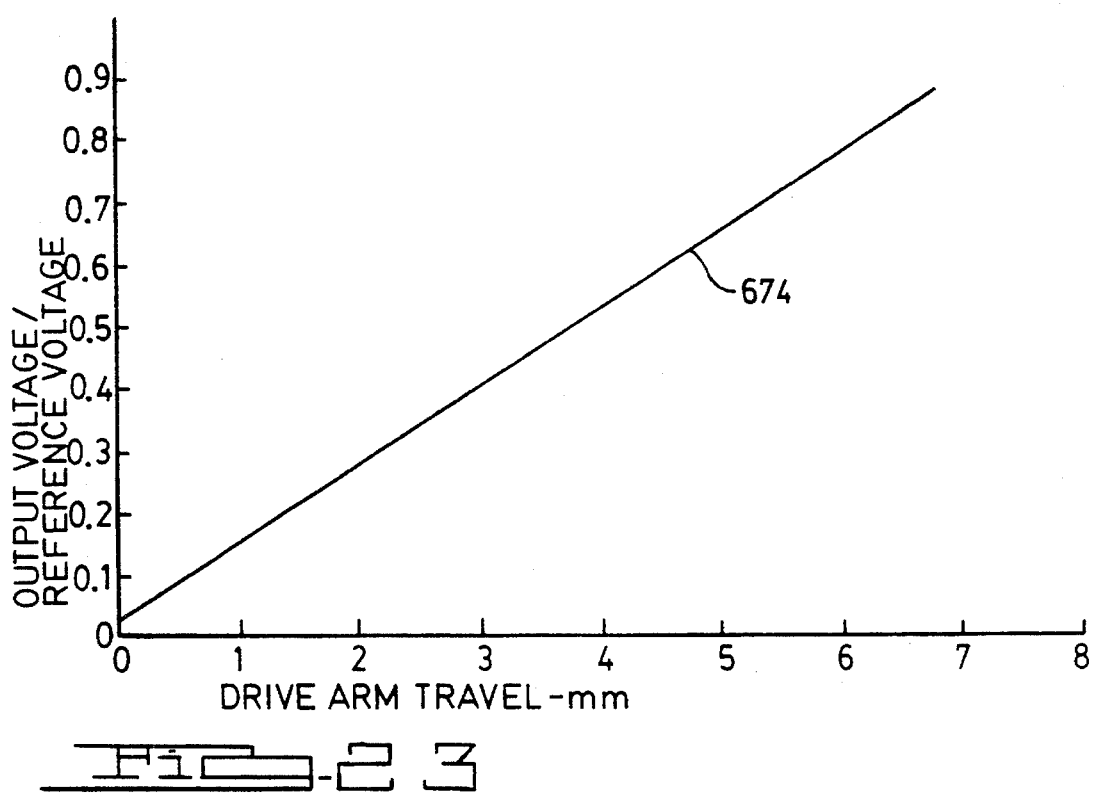
FIG. 23 is a plot of the primary sheave position sensor function, specifically the relationship between output voltage for the position sensor versus the drive arm travel.

The primary sheave position sensor is a linear potentiometer as in the case of the throttle position sensor. As indicated in FIG. 1 and FIG. 3a, lever 466 picks-up movement of the primary sheave disc 134 and loads a sheave minimum pressure regulator valve as previously explained. The transfer function for the primary sheave position sensor is shown in FIG. 23 where travel of the drive arm measured in millimeters is plotted on the abscissa and the output voltage for the sensor divided by the reference voltage is plotted on the ordinate. The relationship between these two variables is a linear function as shown at 674 in FIG. 23.

Figure 24:
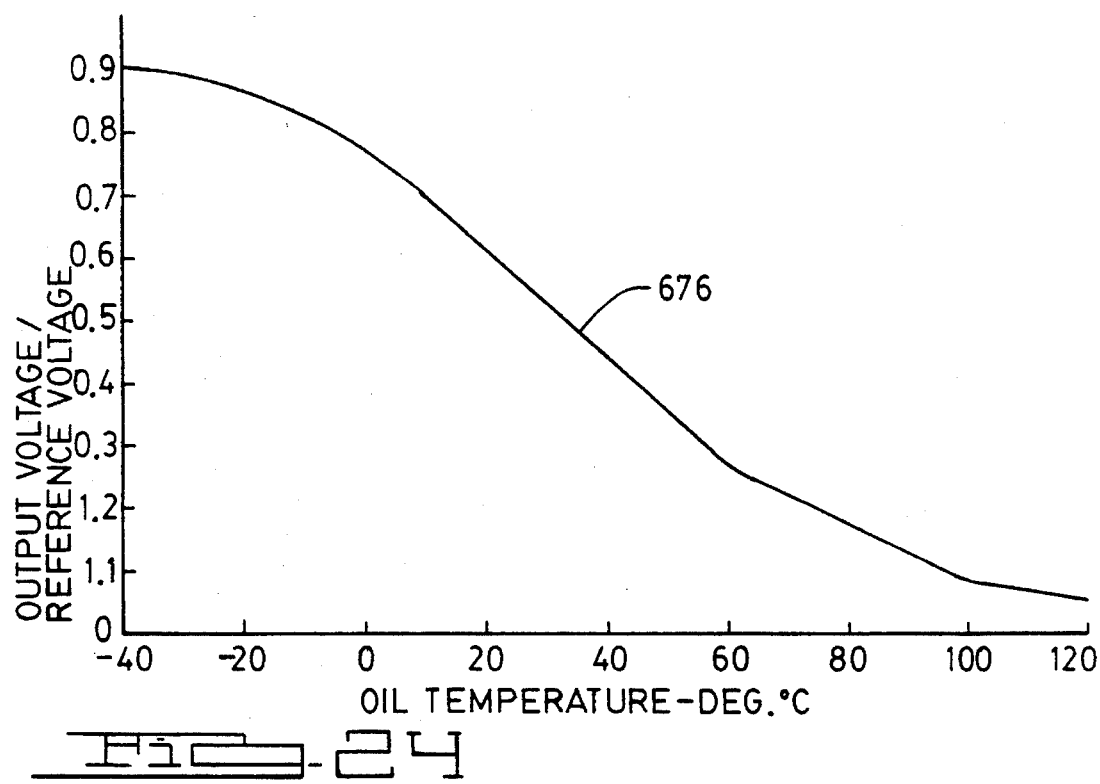
FIG. 24 is a plot showing the oil temperature sensor transfer function, specifically the relationship between oil temperature and output voltage for the temperature sensor.

The oil temperature sensor is located in the control assembly as indicated earlier. It contains a thermistor disc which operates between −40° C. and 150° C. The resistance of the thermistor varies non-linearly and inversely as temperature increases. The transfer function for the oil temperature sensor is indicated in FIG. 24 where oil temperature is plotted against output voltage for the sensor divided by the reference voltage. The inverse non-linear relationship between these two variables is indicated by the plot 676.

Figure 27:
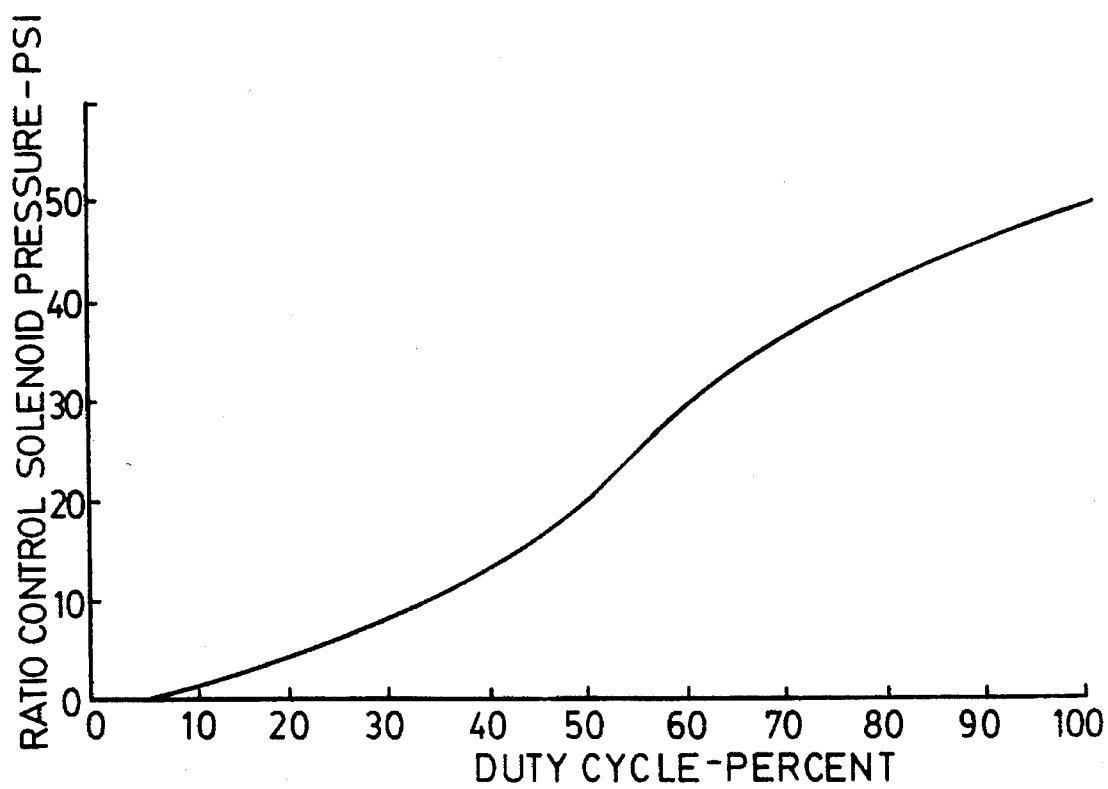
FIG. 27 is a plot of duty cycle versus ratio control solenoid pressure.

FIG. 27 is a plot that shows the relationship between the duty cycle of the ratio control solenoid valve 364 and the ratio control solenoid pressure that is distributed to the valve 362. The solenoid pressure that will establish the previously described ratio null in the embodiment shown in FIG. 7 occurs at about 47% duty cycle, which corresponds to a solenoid pressure of about 17 psi. When the duty cycle is about 47%, the primary servo is locked in its steady state condition since the exhaust path through the primary sheave control valve at that time is blocked, thus establishing a hydraulic lock for the servo cylinder.

The output signals shown in FIG. 3C are signals developed by the output signal conditioning portion of the processor 654 for the signals are delivered to the control solenoids 360, 370 and 364 and 376. These are all 3-way normally closed solenoids. Three of these solenoids have low resistance coils for pulse width modulation. These are solenoids 370, 364 and 360. Solenoid 376 has a high resistance coil for on/off use.

Figure 25:
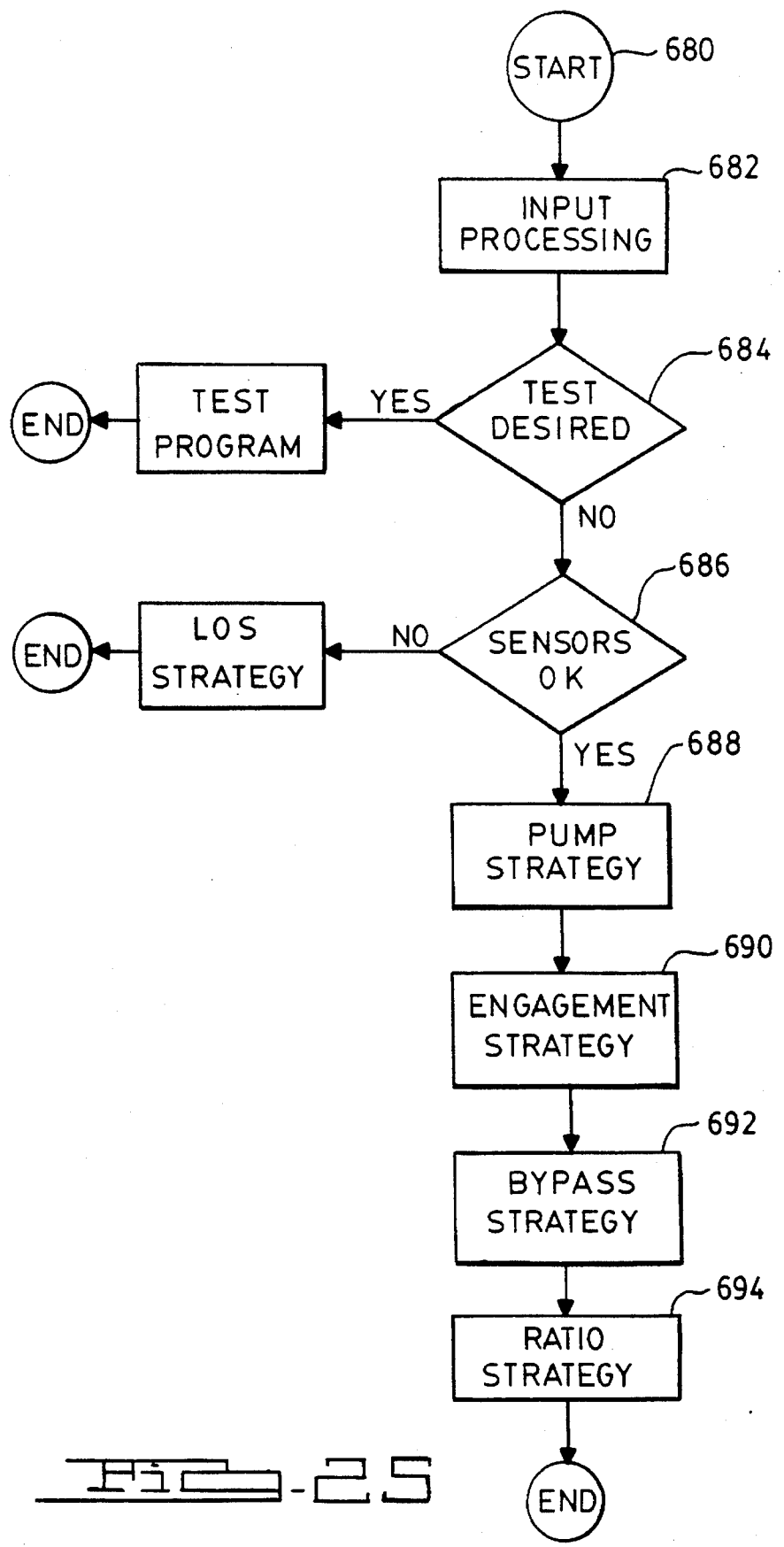
FIG. 25 is a strategy loop flow chart for the microprocessor indicated schematically in FIG. 3C.

The overall strategy loop for the microprocessor system operation is shown in FIG. 25. The strategy loop of FIG. 25 is in the form of a flow chart having distinct areas of software. The first step, after initiation of the loop at 680, is the input processing stage shown at 682. If it is desired, a test program may be carried out at step 684 before the actual control loop is begun. If no testing is desired, the sensors are checked at step 686. If the sensors are functional, the strategy proceeds to step 688 where the pump control strategy takes place. This is followed by the engagement clutch control strategy at 690. The bypass clutch control strategy is followed in the next action block 692. That is followed by the ratio control strategy at action block 694.

The ratio control strategy and the bypass clutch strategy require closed loop feedback control. This is the feedback control indicated in FIG. 40, which will be described subsequently. The closed loop bypass clutch control is a simple proportional-integral-derivative controller as indicated in schematic form in FIG. 31. This also will be described subsequently.

In each case, a PID controller compensates for signal variations. The integral term is multiplied by the software loop time and the differential term is divided by the loop time. The loop time should be relatively constant since varying loop times may lead to control system instability.

The pulse width modulated solenoid valves function in such a way that the duty cycle signals are updated at a rate equal to an integer multiple of the software loop frequency. The duty cycles are updated every loop to ensure quick system response. The loop time, however, must be long enough to allow completion of all the required algorithms.

Figure 26:
FIG. 26 is a diagrammatic illustration of the digital input filter for conditioning the input signals for the microprocessor of FIG. 3E.

The input processing portion of the processor will sample all of the analog inputs prior to fetching the appropriate algorithm from the memory (ROM). The control algorithm signals first converts from analog values to digital engineering values. Each input passes through a digital rolling average filter to minimize oscillations in the data before entering the calculation routines. Each signal has its own set of filter adjustments. A typical filter flow diagram is illustrated in FIG. 26. The signal flow equation for the filter illustrated in FIG. 26 is stated as follows:

$$\overline{Z}(K)=C1*Z(K)+C2*Z(K-1)+C3*\overline{Z}(K-1)$$

WHERE:
$\overline{Z}(K)$=PRESENT FILTERED SAMPLE
$Z(K)$=PRESENT UNFILTERED SAMPLE
$Z(K-1)$=FIRST PAST UNFILTERED SAMPLE
$\overline{Z}(K-1)$=FIRST PAST FILTERED SAMPLE
C1, C2, & C3 ARE CALIBRATION PARAMETERS WITH THE FIXED RELATIONSHIP OF C1+C2+C3=1

The electro-hydraulic controls are programmed to provide a "limp home" capability if there is an electrical power failure. In this condition, the variable ratio chain will be forced to the full overdrive position. This occurs because under such emergency conditions, the signal from the pulse width modulated valve 364 to the primary sheave control valve will close, thus allowing line pressure to be distributed directly to the primary sheave servos through the primary sheave control valve 362. The bypass clutch under these emergency conditions will be released because the signal from the pulse width modulated valve 360 to the bypass clutch control valve will cease, thereby causing the bypass clutch control valve 358 to shift to the clutch unlock position. Further, the bias pressure normally distributed through passage 454 to the forward clutch accumulator from the pulse width modulated valve will cease, and the bias pressure to the reverse clutch accumulator normally distributed from the pulse width modulated solenoid valve 360 through passage 524 will cease. Since the overdrive ratio is the default ratio, sudden and harsh deceleration is avoided if a malfunction should occur at high vehicle speeds. Acceleration from rest in full overdrive will be poor, thus letting the driver become aware that there is a driveline problem. Furthermore, the default to an open converter condition prevents engine stall when the vehicle comes to a rest.

The variable displacement pump is under the control of the pump control valve 342, and displacement controlling pressure is determined by the booster minimum sheave pressure in line 404, which is distributed to the pump control valve. The strategy for the pump control includes the step of increasing the pressure in passage 454, which increases the booster minimum sheave pressure. This is done in response to an increased output signal from the pulse width modulated solenoid valve 370. This occurs when the vehicle comes to a stop. It is desirable when stopping to complete the downshift to the full underdrive ratio before the vehicle comes to rest. Boosting of pump pressure will cause the secondary sheave to force the chain back to the maximum underdrive position quicker.

The engagement strategy for the clutches consists of an open loop control of the bias pressure and the accumulators using the pulse width modulated solenoid valve 370 and the pulse width modulated solenoid valve 360, which respectively control the forward clutch cushion or bias pressure and the reverse clutch cushion or bias pressure, as explained previously. This function is affected by temperature of the oil. For any given temperature, the behavior of the forward and reverse clutches during engagement is illustrated in FIGS. 28, 29 and 30. FIG. 28 shows a plot on the engagement solenoid duty cycle for either valve 370 or valve 360 plotted against time. The bias pressure developed by the engagement solenoid is plotted against time in FIG. 29 where the bias chamber fill time is indicated by the dimensional arrows 698.

FIG. 30 shows a clutch pressure that is developed by the forward clutch and reverse clutch fill valves. The solenoid bias pressure is indicated by the shaded area 700 in FIG. 30. Clutch pressure is plotted against time, and at time 702 the clutch is fully engaged. If the solenoid bias were not present, the clutch still would engage, but it would engage at a later time as shown at 704. At time 706, the accumulator bottoms out and the clutch pressure builds-up to its maximum value indicated at 708.

The bypass clutch engagement strategy depends on vehicle conditions. The bypass clutch can operate in an open converter mode, a scheduled slip mode wherein a steady state driving condition will result in a predetermined clutch slip. A "tip-in" slip, which occurs when the vehicle engine accelerator pedal is quickly advanced, and a back-out slip which occurs when the vehicle engine throttle is suddenly relaxed. The converter also may operate in a fully locked condition, which is a special case of the scheduled slip mode.

Figure 31:
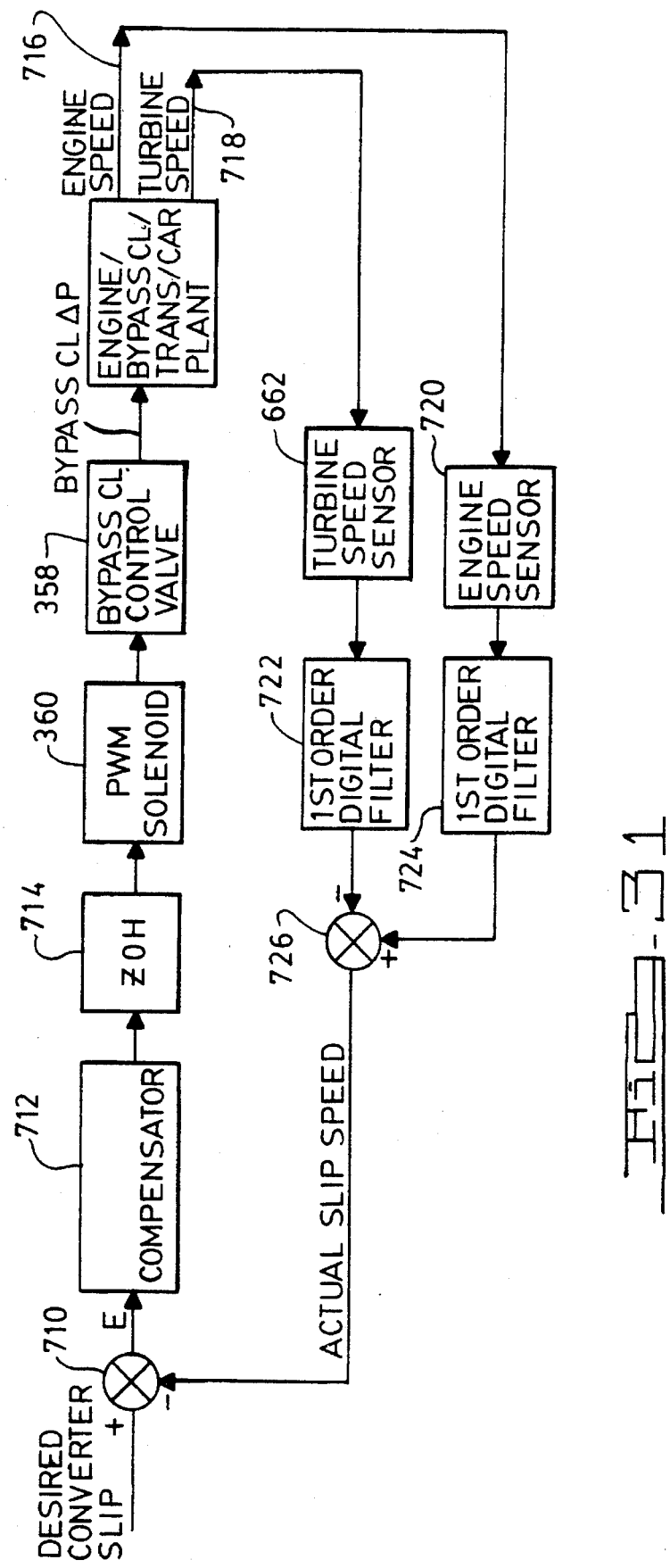
FIG. 31 is a diagram of a closed loop circuit for the bypass clutch controller.

A block diagram of the bypass clutch feedback control system is indicated in FIG. 31.

During acceleration, the bypass clutch controller will cause the converter to operate as an open converter. If the oil temperature is cold, the bypass clutch should remain off while the transmission oil warms up. Further, if the slipping conditions are such that the temperature at the bypass clutch friction surfaces exceeds a recommended value such as 300°, the bypass clutch will be caused to disengage.

Under normal operating conditions, the bypass clutch is engaged as ratio changes take place from the full underdrive position. The clutch will be released when the vehicle is stopped.

During steady state operation, the slip is calibrated to be approximately 30 RPM, which is the near lock-up condition for improved fuel economy.

In the closed loop diagram for the bypass clutch controller indicated in FIG. 31, the desired slip is compared to the actual measured slip at summing point 710. This results in an error signal that is distributed to a proportional-integral-derivative compensator of the kind well known in the control art. The PID controller is shown at 712 in FIG. 31. The compensated signal then is distributed through a zero order hold circuit 714 to the pulse width modulated solenoid valve 360, which controls the bypass clutch control valve 358 as previously described.

Engine speed and turbine speed are measured at 716 and 718, the turbine speed signal being received from the pick-up 662 described with reference to FIG. 1. The engine speed sensor is diagrammatically represented in FIG. 31 at 720. Each speed signal is distributed through a first order digital filter circuit as shown at 722 and 724, respectively. The difference is detected at summing point 726. This represents the actual slip that is seen by the comparator 710.

Figure 32:
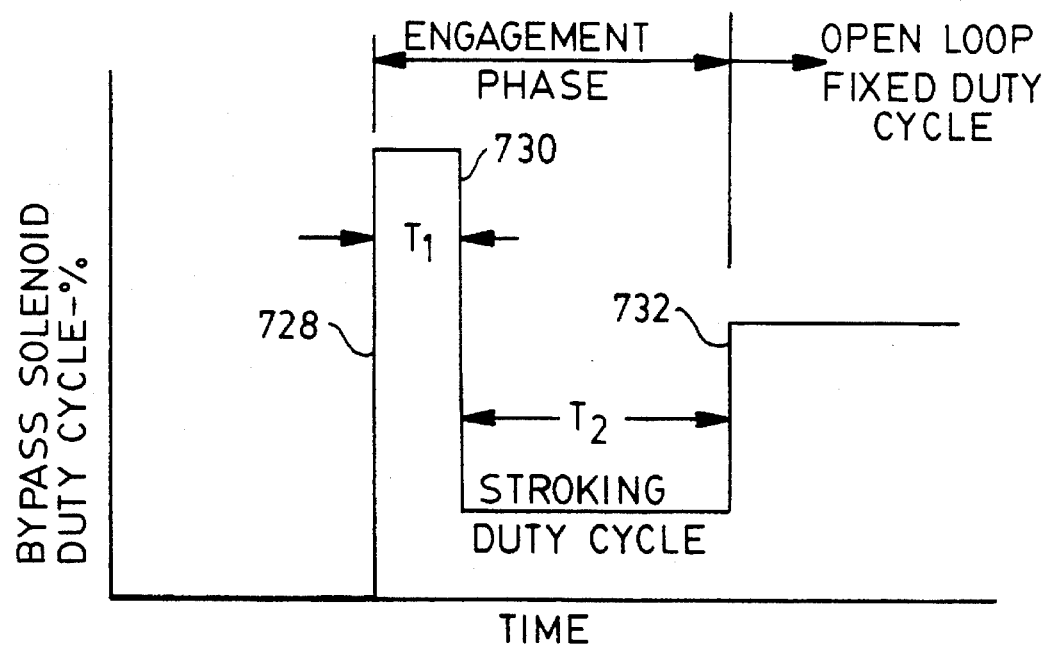
FIG. 32 is a plot of the stroking characteristics for the bypass clutch, specifically, a plot of the bypass solenoid duty cycle versus time.
Figure 33:
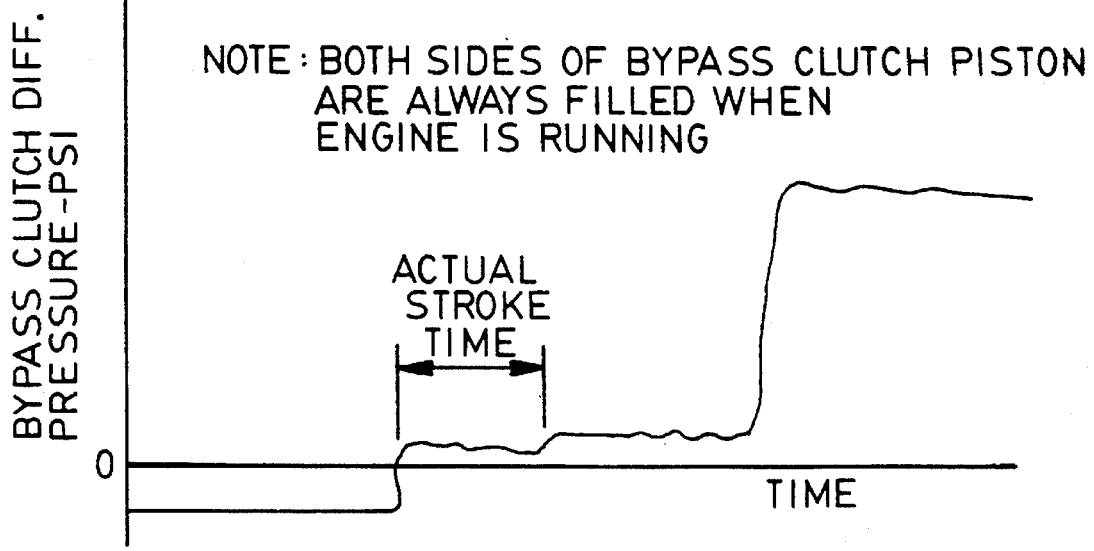
FIG. 33 is a plot of the bypass clutch differential pressure versus time as the duty cycle is varied in accordance with the plot of FIG. 32.

The procedure for stroking the bypass clutch is diagrammatically represented by FIGS. 32 and 33 where engagement time is plotted against the bypass clutch solenoid duty cycle and against clutch differential pressure. In FIG. 32, the engagement phase begins at time 728 when the bypass clutch solenoid valve duty cycle is activated. After expiration of time T1, the bypass clutch duty cycle is established to cause the bypass clutch piston to stroke. The stroking duty cycle continues from time 730 to time 732, which is represented as time T2 in FIG. 32. A stroking duty cycle is commanded during time T2 as the stroking takes place. Once the clutch is stroked at time 732, the clutch actuating pressure can be modulated to control slip across the clutch. In the initial phase of the engagement, the control is open loop as indicated in FIG. 32. As the slip approaches the desired incipient slip, which is approximately 30 RPM, as mentioned previously, the controller goes to a closed loop mode as indicated in FIG. 31.

The behavior of the clutch, as incipient slip is approached, is indicated in FIG. 34. The relationship between time and slip generally has a inverted parabolic trajectory. The slip at which the controller goes to closed loop is indicated in FIG. 34 by reference numeral 734.

When a tip-in occurs, the bypass clutch will allow slip across the bypass clutch to increase. The added slip cushions the transient event. After a stabilized steady state driveline condition is once more achieved, the clutch will return to the calibrated closed loop control slip, which is the incipient slip indicated at 736 in FIG. 34.

This tip-in slip control is illustrated in FIGS. 35 and 36 where time is plotted against throttle position in the case of FIG. 35 and against slip in RPM in the case of FIG. 36. As indicated in FIG. 36, the incipient slip shown at 738 and at 740 is interrupted when a tip-in occurs at time 742. The commanded slip, of course, immediately will change to a value indicated at 744. The actual slip, however, will lag behind, as shown at 748, until it reaches the slip indicated at 744.

FIG. 35 shows the throttle position changing from a value at 750 to a more advanced position at 752. After a steady state condition is reached with the advanced throttle setting shown at 752, the slip will be ramped down as shown at 754 until it again reaches the incipient slip value 740. During the ramp down process, the commanded slip is indicated by slope 756. The actual slip tends to follow the commanded slip, but it may fluctuate either above or below the commanded slip as shown at 758.

Figure 37:
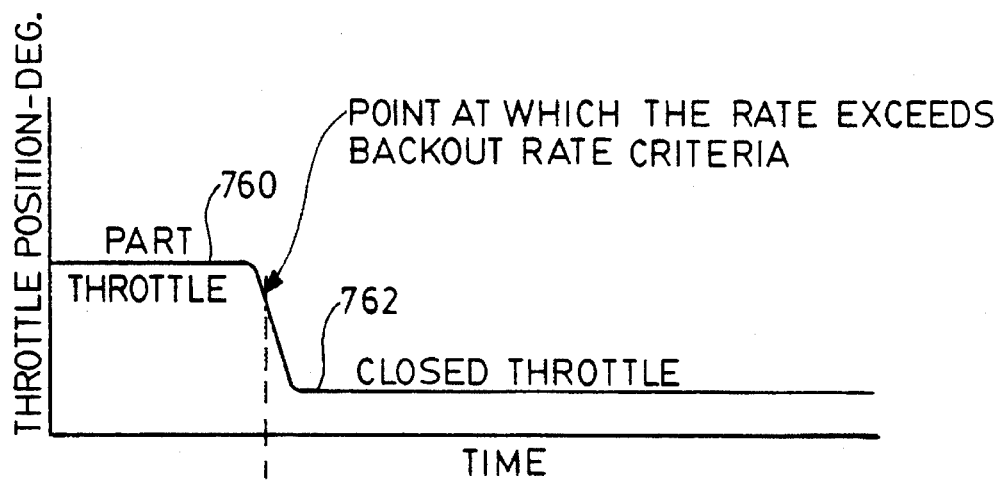
FIGS. 37, 38 and 39 show back-out slip control characteristics versus time including the throttle position, bypass clutch duty cycle and slip during the back-out clutch control event.
Figure 38:
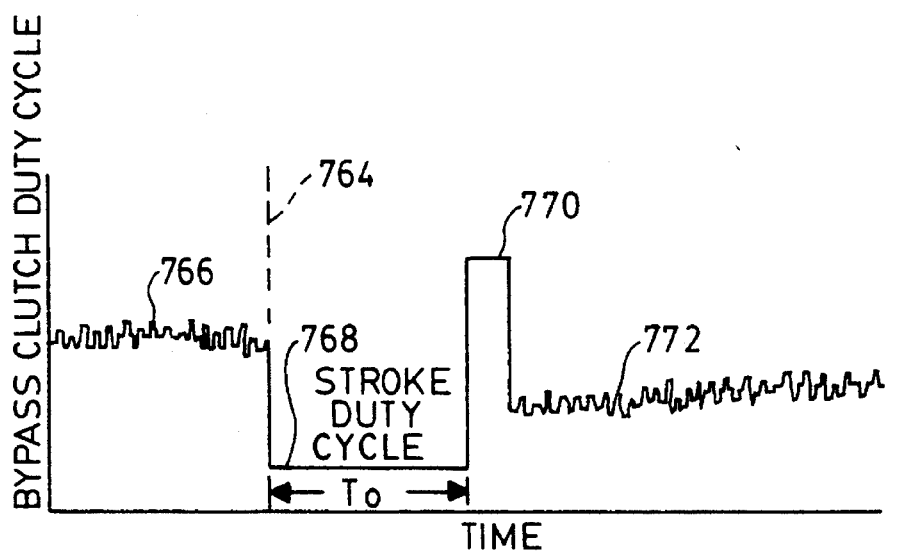
Figure 39:
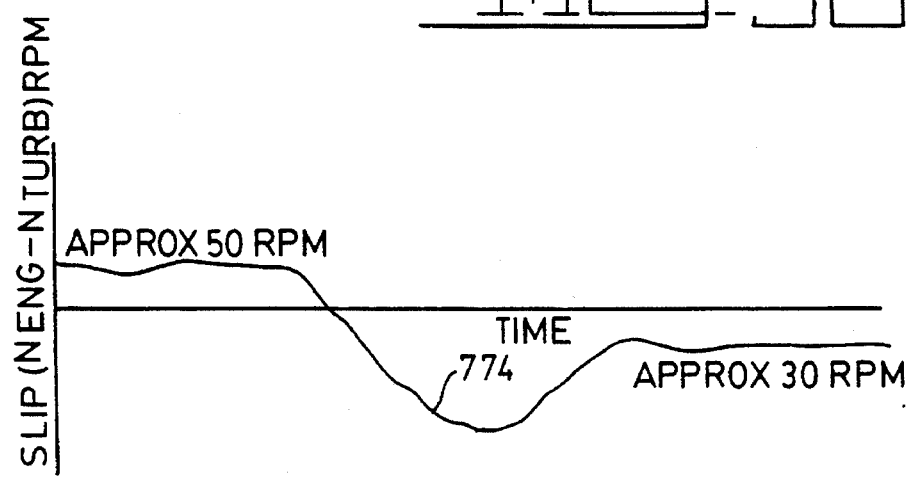

The back-out slip control strategy is illustrated by FIGS. 37, 38 and 39. During the back-out mode, when the engine throttle is relaxed quickly, a driveline "clunk" would result if the clutch were allowed to lock-up with zero slip because the controller would not be able to react to the changed torque command to prevent a 100% lock-up when the incipient slip is only 30 RPM or so during the immediately preceding steady state operating mode. Thus, the controller strategy will call for a lowering of the bypass clutch duty cycle immediately following the initiation of a back-out transient condition. After the driveline torque delivery has stabilized, the incipient slip again will be commanded.

Throttle position, as seen in FIG. 37, changes from a part throttle value at 760 to a lesser value at 762 during a back-out condition. The back-out condition begins at time 764. In FIG. 38, the bypass clutch duty cycle is plotted against time. As seen in FIG. 38, the duty cycle following normal part throttle operation changes from the value shown at 766 to the value shown at 768 as soon as a back-out condition is detected. The bypass clutch then will be allowed to stroke toward its off position during time $T_o$ indicated in FIG. 38. If the closed throttle position 762 continues, the duty cycle will be increased following the completion of the bypass clutch piston stroking after an initial peak at 770, which will initiate movement of the bypass clutch piston toward the open loop position. The duty cycle will return to a value as shown at 772, which will restore the incipient slip for the corresponding torque that accompanies the throttle position 762. That duty cycle is lower than the duty cycle shown in 766 because the throttle position is less.

The slip values throughout the lapse of time described with reference to FIGS. 37 and 38 is indicated by the curve 774 in FIG. 39.

The ratio control strategy, which is stored in ROM, actually comprises five different strategies depending upon the position of the range selector lever. In park and neutral ranges, the ratio will be maintained at the full underdrive ratio, which may be 2.50 to 1. In neutral range, the ratio will be fixed or frozen at the last value that occurred prior to a change to the neutral state. In the drive range, a normal turbine speed schedule will be followed. This will be described subsequently. In the drive economy range an economy turbine speed schedule will be used. In the low range, a hill-breaking turbine speed schedule will be used. The schedules for drive range, economy range and low range are similar, although the calibration constants are different. Each of these schedules requires a turbine speed controller, which is schematically described in block diagram form in FIG. 40.

Figure 40:
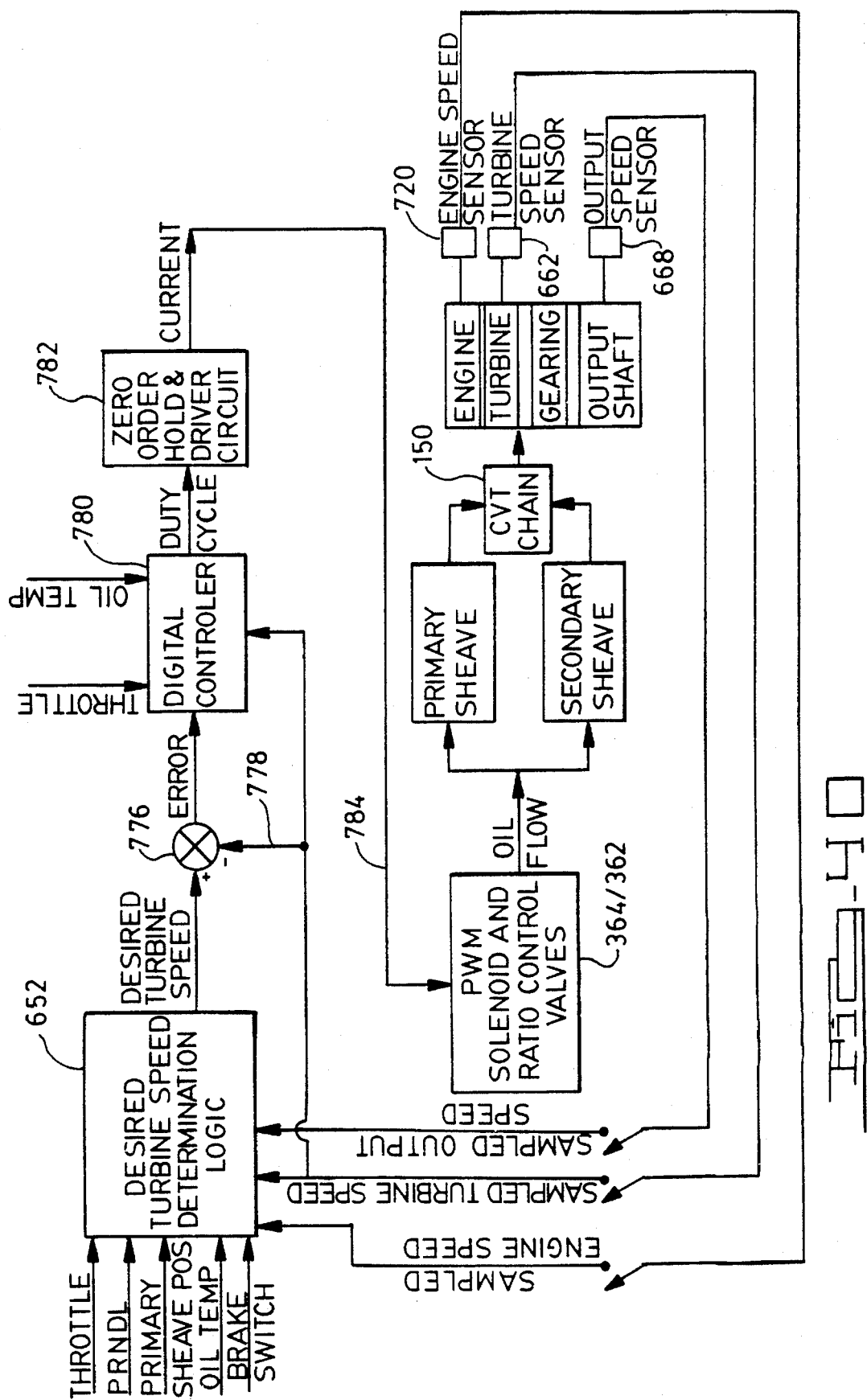
FIG. 40 is a diagram of the turbine speed controller closed loop.

The desired turbine speed determination logic in the microprocessor 652 indicated in FIG. 40 receives the throttle position signal, the drive range selection signal, the primary sheave position signal, the oil temperature signal and a brake switch signal. The CPU in the processor 652 then computes a desired turbine speed and delivers it to a summing point or comparator 776. The value for the desired turbine speed is thus compared with the actual turbine speed delivered to the comparator through the signal flow path 778 shown in FIG. 40.

The difference between the desired turbine speed and the actual turbine speed is the speed error delivered to the controller CPU processor chip 780, which forms a part of the processor 652. The processor computes a duty cycle taking into the account the throttle position and the oil temperature.

After passing through a zero order hold and driver circuit 782, a signal is delivered through signal flow path 784 to the pulse width modulated solenoid and ratio control valves 364/362. Oil is delivered to the primary sheave and the secondary sheave thereby establishing a drive ratio for the variable ratio chain 150. Signals from the engine speed sensor 720, the turbine speed sensor 662 and the output speed sensor 668 then are delivered through their respective signal flow paths to the desired turbine speed determination logic circuit 652.

Engine/Transmission Matching

For every driving condition demanded by the operator, there will be a unique power demand on the engine. There is an optimal engine speed, an optimal torque, an optimal spark advance, optimal air/fuel ratio, and optimal exhaust gas recirculation valve flow rate to minimize fuel consumption while meeting specified exhaust emission constraints. For a given engine calibration, a unique throttle angle exists at all speed and load conditions that constitute the trajectory from idle to maximum power. This is illustrated in the engine map with constant horsepower lines shown in FIG. 7 and in the engine map with constant throttle lines shown in FIG. 8.

In FIGS. 7 and 8, gross engine torque is plotted on the ordinate and engine speed is plotted on the abscissa. Constant throttle lines 786 show the relationship between engine speed and gross engine torque for each throttle setting. The brake specific fuel consumption lines are plotted on the map of FIG. 8. For each throttle setting and for each value of torque and speed, there will be a constant brake specific fuel consumption line. These lines are represented as a family, one of which is indicated by reference numeral 788. The ideal operating line, which represents the minimum brake specific fuel consumption relationship for each engine speed and engine torque condition, is shown at 790.

Figure 6:
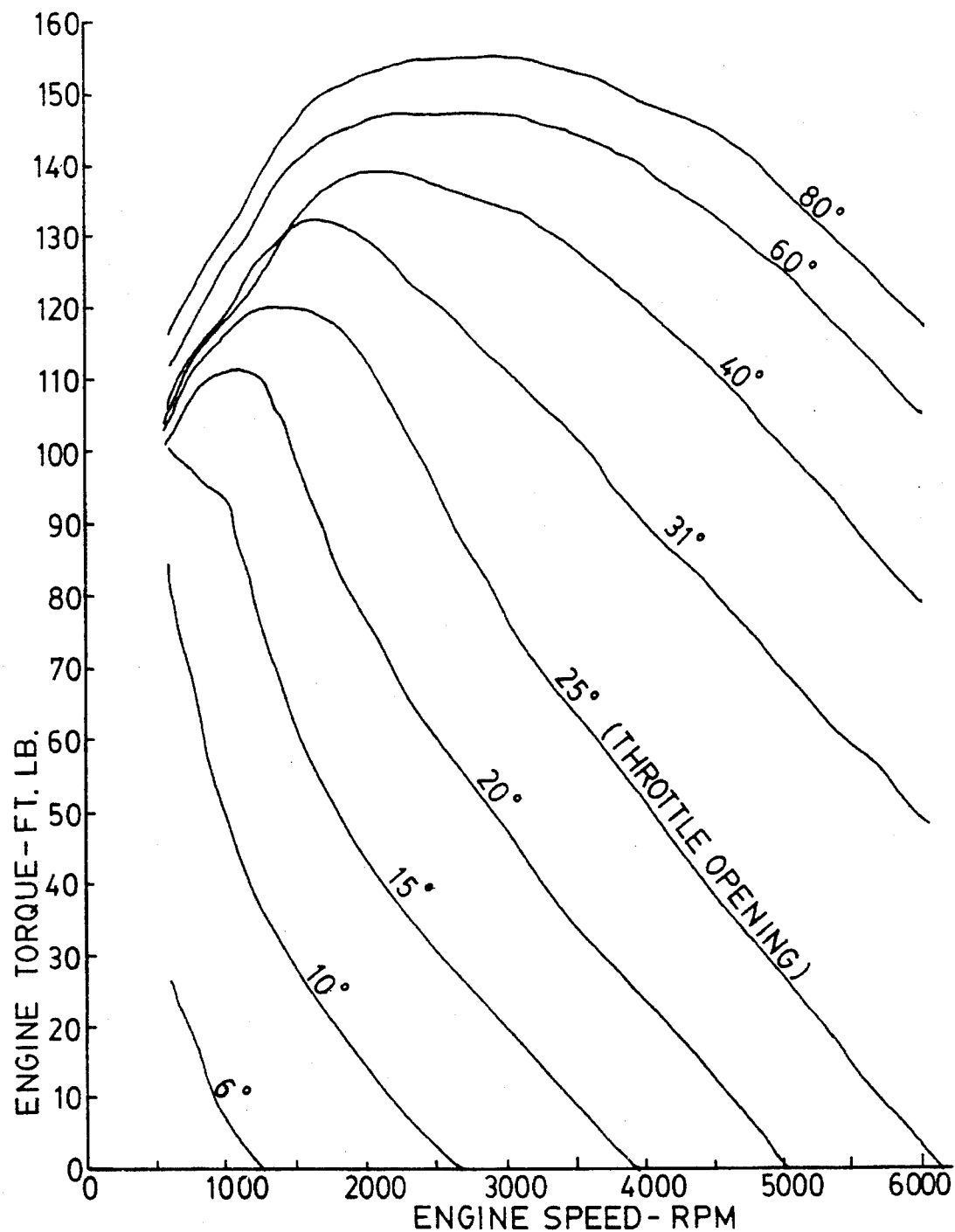
FIG. 6 shows the engine torque and engine speed relationship for a typical internal combustion engine that might be used with the transmissions of FIGS. 1 and 2.

FIG. 6 shows a typical internal combustion engine speed/ torque relationship for various throttle angles.

The engine map of FIG. 7 is similar to that of FIG. 8, although the plot of FIG. 7 is made showing constant horsepower lines 792. As in the case of FIG. 8, superimposed on the map of FIG. 7 is a family of brake specific fuel consumption lines 794. For each engine speed and torque, as in the case of FIG. 8, there will be an ideal condition represented by the minimum brake specific fuel consumption line 796.

Compromises to the ideal engine operating condition described with reference to FIGS. 7 and 8 must be made in order to meet driveability goals. A lower limit on the turbine speed must be imposed because of driveline vibration and noise problems that would occur if the engine speed should fall below a desired level for any given torque. Thus, the ideal operating line 790 in FIG. 8 and 796 in FIG. 7 must be modified as a function of road speed in order to satisfy the driver demands for engine speed as a function of road speed.

During city driving in crowded traffic, it is desirable from a driveability standpoint not to change the turbine speed for slight throttle angle changes. Therefore, a small "deadband" will be built into the controller under these conditions. For a small throttle angle change, the desired turbine speed will remain unchanged, but if a throttle angle change greater than a predetermined value takes place, then the turbine will indeed change to the desired turbine speed value discussed previously with reference to FIG. 40.

This relationship of throttle angle to desired turbine speed illustrating torque demand sensitivity is illustrated in FIG. 44. At point A in FIG. 45, a change in torque demand may be made by increasing the throttle opening. The basic throttle schedule is represented by the multiple slope line 798, which is the schedule at a constant vehicle speed. If the torque demand does not exceed the throttle setting represented by point B, the desired turbine speed will remain constant. If the torque demand exceeds point B, the desired turbine speed then is chosen from the schedule stored in memory and the desired turbine speed will be computed as explained previously. That desired turbine speed is represented by point C in FIG. 44.

If the vehicle operator, while operating on line A-B should back-out along line A-B, until point A is reached on the schedule line, then the schedule line 798 again will represent the desired turbine speed for throttle angle changes.

When the driveline is operating on the schedule illustrated in FIG. 44 and the operator should enter a back-out condition, the operating point will remain on the schedule line 798.

If there is a large error between the desired turbine speed and the actual turbine speed, the controller will enter an open loop condition and terminate the closed loop condition illustrated in FIG. 40. For small desired turbine speed errors, the closed loop operating mode of the controller will be carried out. A large turbine speed error is reduced by an S-shaped curve as illustrated in FIG. 43. The duty cycle curve that corresponds to the turbine speed functional relationship of FIG. 43 is shown in FIG. 42. During the closed loop portion of the curve of FIG. 43, the duty cycle is at a value represented by reference numeral 800 in FIG. 42. If, at time 802 shown in FIG. 43, a large error in turbine speed begins, the duty cycle immediately is increased to a high value as shown at 804 in FIG. 42. This terminates the closed loop control and begins the open loop control.

When the turbine speed approaches the desired final speed 806 in FIG. 43 and the desired turbine speed is equal to the value at 806 less a delta RPM, or a desired value shown at 808, the controller again will return to the closed loop control described previously where a new and higher turbine speed is commanded as shown at 810. The corresponding actual turbine speed levels out at a higher value as shown at 812, which corresponds to the changed torque at the changed operating condition.

When the vehicle is at rest, the primary exhaust solenoid valve 376 is turned off in order to provide a minimum pressure to the primary sheave servo. After the vehicle beings to move, the ratio change from underdrive toward overdrive will occur. This is accomplished by lowering the ratio solenoid duty cycle below the value at which the previously described null point is established. Simultaneously, the primary exhaust control solenoid will turn on so as to allow a total control of the chain ratio. The primary exhaust solenoid remains on while the vehicle is moving.

When the vehicle has come to rest and the ratio has not reached a full underdrive ratio, such as in a panic stop, it is desirable to move the sheaves to the full underdrive position for a normal driveaway. The only way that this can be accomplished with the sheaves stationary is to completely exhaust the primary sheave circuit. This is done by turning on the ratio control solenoid to 100% duty cycle and turning on the primary exhaust control valve. The pump pressure also can be increased at this time in order to make the secondary sheave servo more effective After the full underdrive position is sensed, the primary sheave control valve will be returned to its null position. The primary exhaust solenoid will be turned off and the pump pressure can be returned to its normal value.

In order to avoid chain slippage, if the driver should advance the throttle suddenly while the primary sheave is exhausted and the vehicle is at rest, the ratio control solenoid duty cycle is immediately reduced to the null point value and the exhaust solenoid is turned off.

Figure 41:
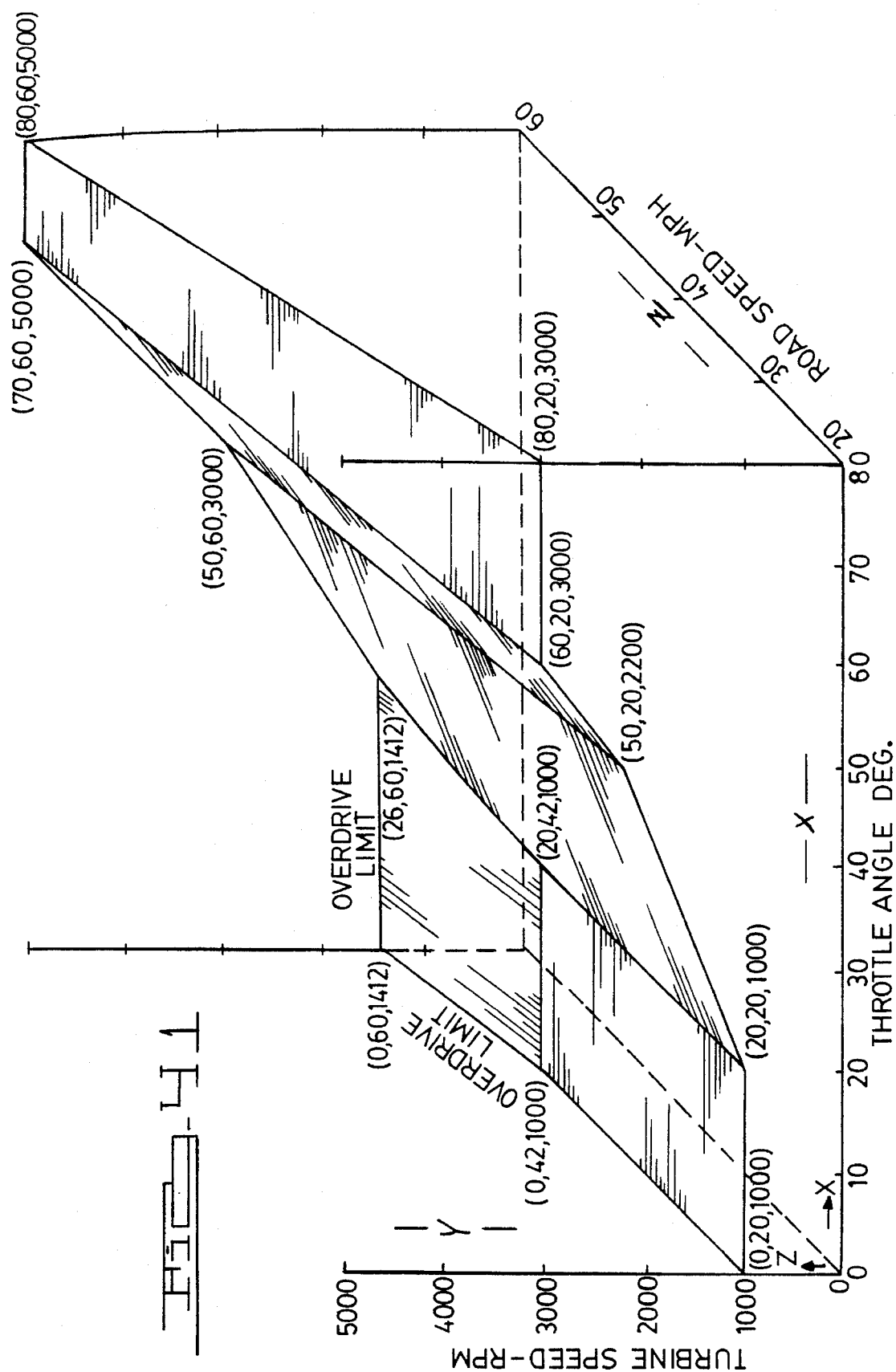
FIG. 41 is a plot in three dimensions showing a typical turbine speed schedule, stored in memory (ROM), for various throttle positions and road speeds.

FIG. 41 shows a typical turbine speed schedule that has been compromised from the ideal engine operating line. It is a three-dimensional plot wherein road speed is plotted on the Z axis, throttle angle is plotted on the X axis, and turbine speed is plotted on the Y axis. It is seen from FIG. 41 that road speed will be taken into account as the controller seeks the optimum turbine speed for any given throttle angle. Typical throttle, angle turbine speed and road speed values are indicated for typical operating points on the three-dimensional plot of FIG. 41. The X-Y-Z coordinates have values for each of the characteristics points chosen for illustration purposes in FIG. 41.

Figure 3F:
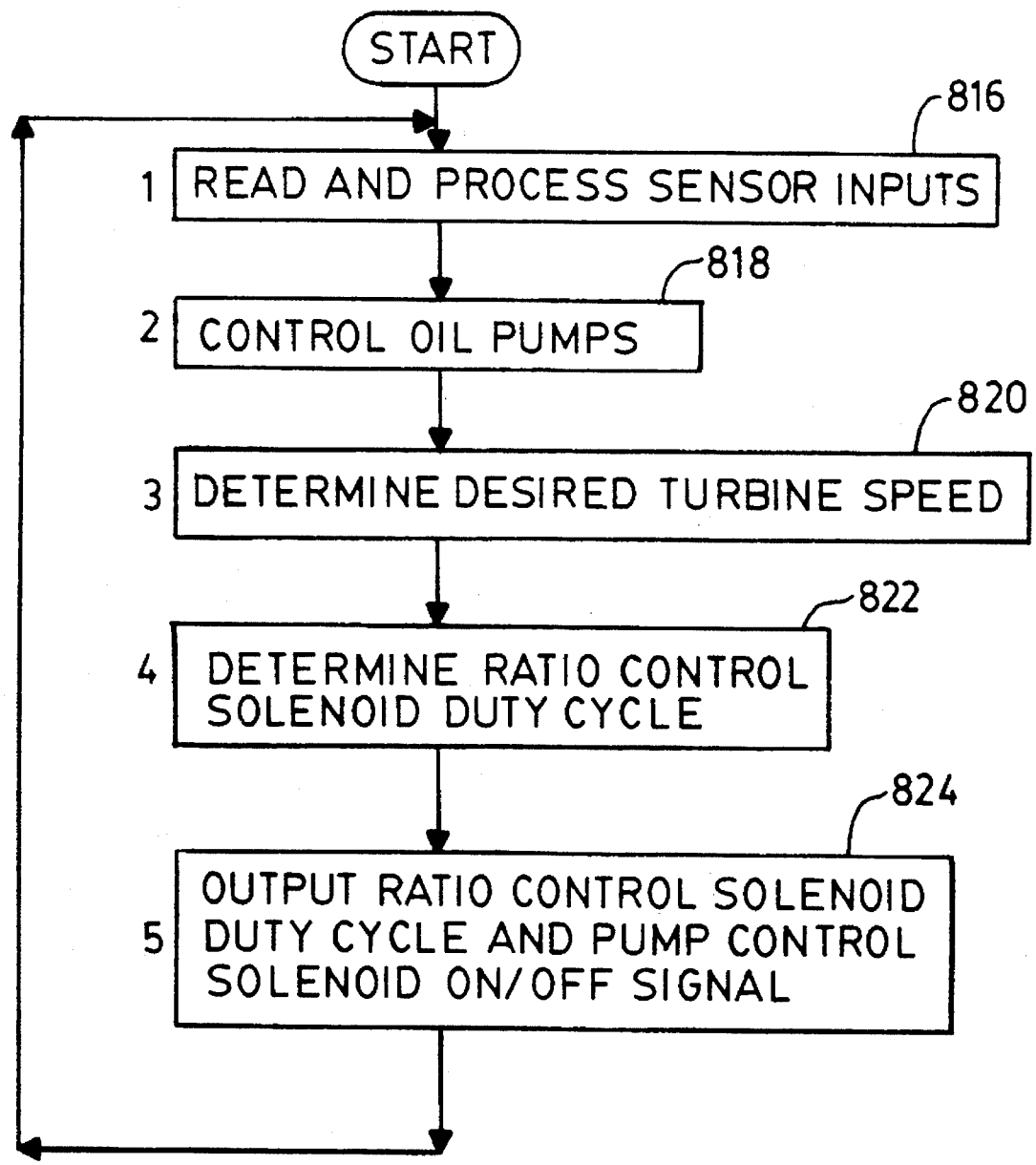
FIG. 3F is a flow diagram for the algorithm that is used for controlling ratio.
Figure 4:
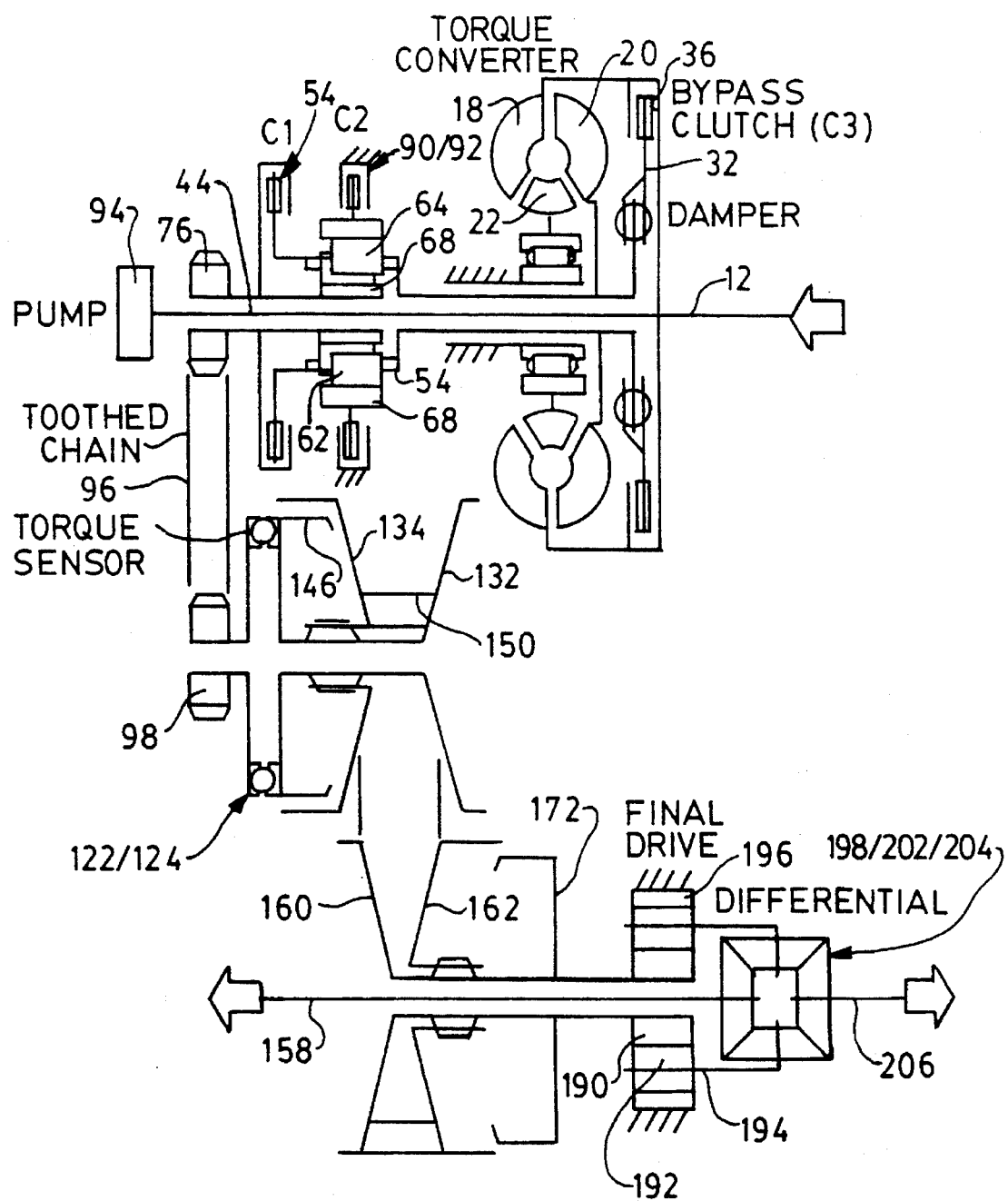
FIG. 4 is a schematic representation of the transmission shown in detail in FIG. 1.
Figure 5:
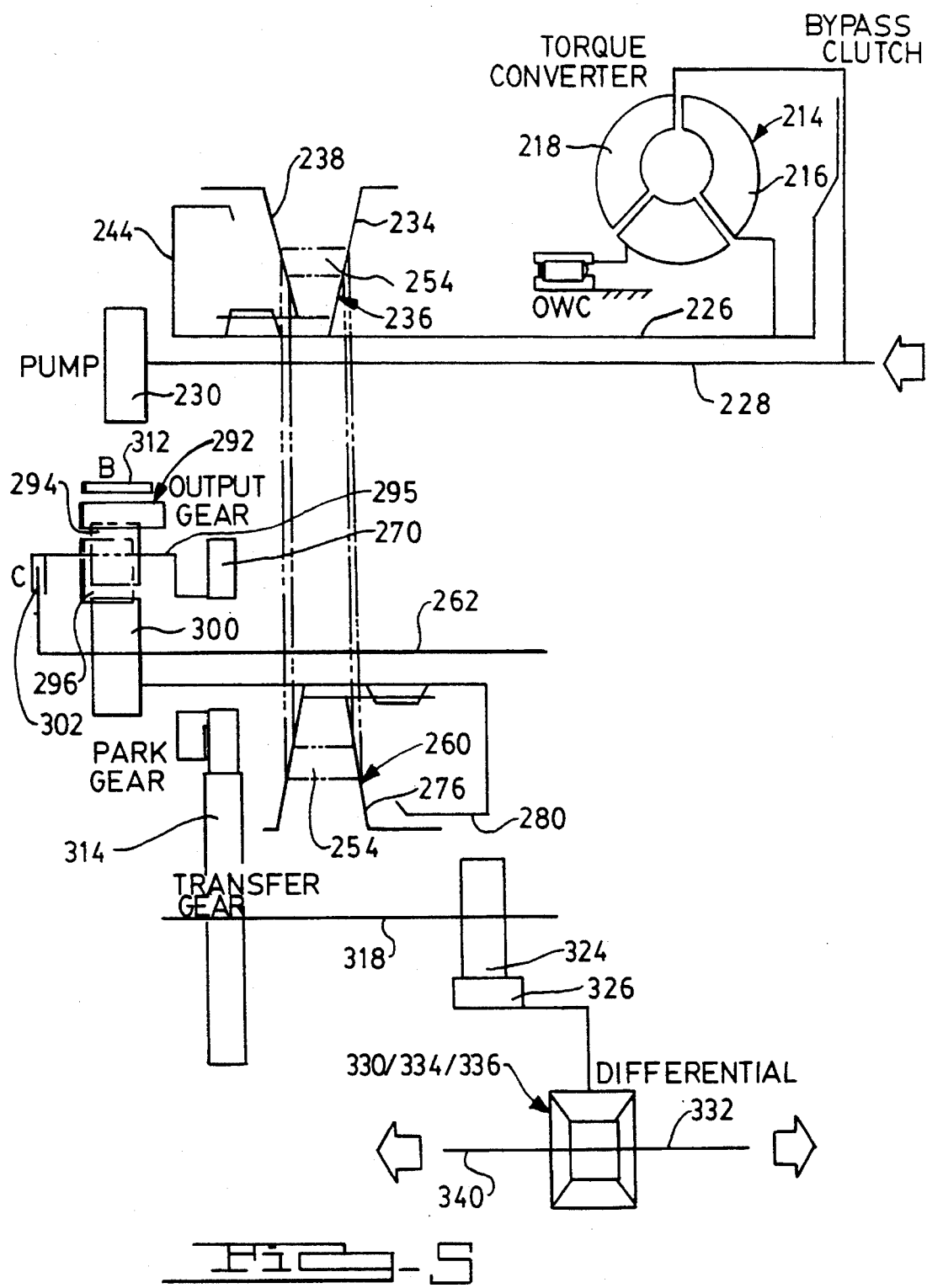
FIG. 5 is a schematic representation of the transmission shown in detail in FIG. 2.

The algorithm of the ratio control is illustrated in flow chart form in FIG. 3F. Following the start of the routine, the first action block 816 calls for a reading and the processing of sensor inputs including throttle angle, the range selector lever position, the primary sheave position, the oil temperature and the brake switch. The routine then proceeds to action block 818 which calls for the control of the oil pumps. At that stage, the hydromechanical torque sensor 374, shown in FIG. 3A, is used to set a minimum system pressure. During coast braking below 20 mph, the pump pressure is increased as previously described.

The routine then proceeds to action block 820. At that stage, the desired turbine speed is determined as a function of throttle position and vehicle speed, as described with reference to FIG. 40. Desired turbine speed is adjusted for torque demand sensitivity as shown in FIG. 45. During kickdown, the desired turbine speed is a function of vehicle speed and usually is higher than the speed that is obtained from the normal or economy turbine speed tables. A transition from one speed to the other is achieved by gradually increasing the desired turbine speed as a function of vehicle speed. Desired turbine speed is clipped to whatever value that the transmission is capable of providing at the current vehicle speed.

At the next action block 822, the duty cycle for the ratio control solenoid valve is determined. This involves a calculation of the normalized error as previously described, which is represented by the difference in desired turbine speed and the actual turbine speed multiplied by a gain constant divided by actual turbine speed. The error is clipped to a maximum value which is a function of the actual turbine speed and the chain ratio.

Next, action block 822 calls for a calculation of the integral term as: $K_I^*$ accumulated error $+K_I^*$ current error, where $K_I$ is the integral gain. Next, the derivative term is calculated as: $K_D^*$ (current error-previous loop error), where $K_D$ is the derivative gain. Total error is the sum of the clipped normalized error, the integral term and the derivative term.

Ratio control solenoid duty cycle is determined by interpolating on a duty cycle versus total error function after first modifying all points for transmission oil temperature and for hardware variability.

The ratio control solenoid duty cycle then is output, together with a pump control solenoid on/off signal. This is shown at action block 824 in FIG. 3F. The routine then returns to the start of the loop and the steps are repeated.

Electro-hydraulic Controls Of FIGS. 3C and 3D

In FIGS. 3C and 3D, we have shown the electro-hydraulic control schematic for the embodiment of the invention illustrated in FIG. 2. These controls have elements that are common to the control system illustrated in FIGS. 3A and 3B. As in the case of the control system of FIGS. 3A and 3B, the control system of FIGS. 3D and 3D have three main parts. The first being the ratio control part, the second being the pump and range control part, and the third being the torque converter control part. The torque converter controls for the embodiment of FIGS. 3A and 3B is substantially the same as the torque converter controls for the embodiment of FIGS. 3C and 3D. A particular description of that part of the controls will not be repeated here. For purposes of clarity, the elements of the embodiment of FIGS. 3C and 3D that are common to the embodiment of FIGS. 3A and 3B have been designated by the same reference numerals, although prime notations are added.

As will be explained subsequently, the embodiment of FIG. 2 requires three speed sensors. One speed sensor is adapted to measure turbine speed. It includes a signal pick-up disc 830 shown in FIG. 2 with a variable reluctance sensor 832 secured to the transmission housing 210. The second speed sensor, a variable reluctance sensor, has a pick-up disc 834 secured to the secondary sheave shaft. The third speed sensor includes a pick-up disc 836 located on the differential axis and carried on the differential carrier 330.

As in the case of the embodiment of FIGS. 3A and 3B, the embodiment of FIGS. 3C and 3D has a variable displacement pump 838. The pump 838 is a sliding ring pump rather than a pivoting ring pump. The pump includes a bore ring 840 situated in a pump cavity 842, a pair of piston discs 844 and 846 is located on either side of the bore ring 840. Spring 848 normally urges the piston disc 844 and the bore ring in a right hand direction, which corresponds to an increasing of pump displacement. A pump rotor 850 is mounted within the bore ring. Multiple pumping vanes 852 are carried in slots formed in the rotor and cooperate with the bore ring to define fluid pumping chambers, which carry fluid from a suction port schematically shown at 854 to a pump outlet port schematically shown at 856, as the rotor rotates in a counterclockwise direction as viewed in FIGS. 3A and 3B.

Piston 844 is fed with pump control pressure from line 858 which communicates with pump control valve 860. Piston 846, which is smaller than piston 844, is fed with line pressure from line pressure passage 862. The displacement of the pump can be detected by a position sensor 864, which senses the position of the bore ring 840.

At start-up, the pump displacement is at a maximum because of the biasing effect of spring 848.

The pressure chamber defined on opposite sides of the bore ring 84 and by the cooperating chamber 842 in the pump housing is hydraulically isolated from the pumping chambers defined by the pumping vanes. The pump has no seals, which reduces friction hysteresis as the bore ring is adjusted by the pistons 844 and 846. A back-up ring for the pumping vanes positions the vanes in close proximity to the inner surface of the bore ring, thereby ensuring adequate pump flow during cold start-ups. Pressure from the high pressure side of the pump is routed to the inner ends of the vanes through side openings 868, thereby forcing the vanes to trace along the bore ring throughout the pump arcs.

In addition to the pulse width modulated solenoid valve 360, the control system of FIGS. 3C and 3D have two pulse width modulated solenoid control valves shown respectively at 870 and 872. It also has an on/off normally closed solenoid 874 for the primary exhaust control and a variable force solenoid, normally open as shown at 876. This solenoid valve controls line pressure on forward clutch engagement. Pressure is distributed to the forward clutch accumulator from the valve 876 through the passage 454' as in the case of the embodiment of FIGS. 3A and 3B.

The primary sheave control valve 878 corresponds to valve 362 in the embodiment of FIGS. 3A and 3B. It includes spaced valve lands 880 and 882 of equal diameter and a smaller land 884 which cooperates with land 882 to define a differential area that is objected to solenoid feed pressure in line 424'.

Valve 878 is urged in a right hand direction by valve spring 886. This is opposed by the differential pressure force created by the solenoid feed pressure. That pressure force is supplemented with the force of ratio control solenoid output pressure in passage 888.

Line pressure developed by the pump is distributed through line 890 to the primary sheave control valve 878. Land 882 controls communication between line pressure line 890 and primary servo feed passage 892. Communication between the servo feed passage 892 and the primary exhaust valve 894 is controlled by land 880. When the valve 878 assumes the position shown in FIG. 3C, pressure is trapped in the primary servo working chamber by reason of the overlap of the valve lands 880 and 878 with respect to the ports communicating with lines 890, passage 896 leading to the primary exhaust regulator valve 894. The valve 878, when positioned as shown, is in the so-called "null" position illustrated in FIG. 14A.

Primary exhaust regulator valve 894 functions in a manner similar to the function of valve 366 in the embodiment of FIGS. 3A and 3B. It includes spaced valve lands 898 and 900, which control communication between passage 896 and exhaust port 902. Land 898 also controls communication between line pressure passage 890 and passage 896. Line pressure in passage 890 acts on the differential area of lands 900 and the smaller land 904. Thus, the valve 894 will establish either a regulated exhaust pressure or a true exhaust pressure, depending upon whether a primary exhaust solenoid pressure signal exists in passage 906.

Valve 860 is a pump control valve that adjusts the pressure in the pump bore ring piston chamber for piston 844 to vary pump displacement. The flow and the pressure in that chamber are adjusted to maintain a 60 psi pressure differential between the line boost pressure in passage 908 and the line pressure in passage 890. It comprises a valve having spaced valve lands that control communication between passage 858 and exhaust port 910. The valve is biased in a left hand direction by pressure in the pump outlet. Line pressure passage 890 is biased in the opposite direction by a valve spring as shown.

The line boost valve functions in cooperation with the pump control valve. It receives pump output pressure through line 890. A valve land 910 controls communication between passage 890 and passage 908. It also controls the degree of communication between passage 890 and exhaust port 912. The regulated pressure in passage 908 acts on the differential area of lands 914 and 916, thus opposing the force of a valve spring acting on the opposite end of the valve. Cooler fluid is delivered through passage 918, which communicates with converter fluid return passage 920. Communication between passages 918 and 920 is controlled by land 922. Cooler flow is cut off if the line boost regulator valve is unable to maintain the scheduled pressure due to inadequate pump flow. Flow from the converter is cut off rather than flow to the converter. Thus, the converter remains filled while the inadequate pump flow continues.

The primary exhaust control valve determines whether the exhaust port on the primary shift control valve communicates with true exhaust or regulated exhaust. The on-off solenoid valve 874 sets the state for the primary exhaust control valve. This puts pressure back on the servo to avoid slipping of the chain when the transmission is going into underdrive. As explained previously with respect to the embodiment of FIGS. 3A and 3B, the exhaust is allowed to go to zero. During an emergency panic stop, slipping of the chain may occur but that is not a serious problem since the slipping will occur only during the duration of the panic stop.

Electronic Control Logic

The electronic control system logic requires close loop feedback control. For this purpose, simple proportional integral differential compensators are used. With a PID compensator, the integral term is multiplied by the software loop time. The differential term is divided by the loop time. The loop time remains constant in order to avoid variations in the gain of the closed loop system. This avoids control system instability.

The duty cycle signals for the three pulse width modulated solenoids and the single VFS solenoid must be updated at a rate equal to an integer multiple of the software loop frequency. The loop time must be long enough to complete all of the required algorithms.

The logic requires a continual monitoring of the input signals and the actions that are commanded. The input signals are checked for valid values. The action of the actuators will be monitored through the sensors. If a certain event is commanded and the command does not result in a change within a certain amount of time, a warning flag will be called out so a corrective action can take place.

The distinct areas of the control strategy that are contained in the software loop are the keep-alive memory strategy, input processing, primary sheave strategy, exhaust pressure control strategy, engagement control strategy, line pressure control strategy, converter slip control strategy and turbine speed control strategy. In the case of the keep-alive memory strategy, certain parameters require extensive driving in order to establish a mean value. Therefore, keeping track of the latest of the values when the vehicle is turned off is needed to prevent a need for relearning these values.

The parameters that are stored include the minimum chain ratio, the maximum chain ratio, minimum and maximum pump displacement, minimum and maximum throttle position and duty cycle for a steady state ratio.

In the case of the input processing strategy, the analog inputs are sampled prior to a fetching of the transmission control algorithm. The signals are converted from analog to digital engineering values. The digital inputs are updated on an interim basis. Each input signal passes through a digital rolling average first order filter, as explained previously with reference to FIG. 26.

When the vehicle is at rest, a certain minimum pressure is required in the primary sheave to prevent slippage. After the vehicle is moving, this pressure interferes with ratio control. The primary exhaust control solenoid thus provides a choice of a set pressure proportional to line pressure or a zero pressure at the exhaust port of the primary sheave control valve.

The minimum pressure applied to the primary sheave occurs when the primary exhaust solenoid is off. After the vehicle is in motion, the primary exhaust control solenoid will be turned on so as to allow total control of the chain ratio. The primary exhaust solenoid remains on while the vehicle is moving and when it is decelerating. Once a vehicle is at rest and the full underdrive state has been achieved, the solenoid can be turned off.

The line pressure control strategy is controlled by the variable force solenoid 876 (shown in FIG. 3C). The output pressure from solenoid valve 876 is amplified by the line pressure boost valve shown at 910 and 914.

Certain special operating conditions require a boosting of line pressure above the base schedule. These special situations include operation when large differences exist between the command turbine speed and the actual turbine speed. Another condition is when the transmission is going into underdrive during a vehicle braking operation. Other conditions are during driveaway and when the manual valve is first moved to range L.

Having described preferred embodiments of our invention, what we claim and desire to secure by U.S. Letters Patent is:

1. In a vehicle drivetrain including an engine and a continuously variable transmission having first and second sheave assemblies with relatively movable sheaves and a chain which transfers power between the assemblies, a flow control valve means for controlling flow of fluid between said sheave assemblies, a control system for controlling said flow control valve means to effect said flow of control fluid, the flow of control fluid being utilized by a drive mechanism of one of the sheave assemblies to provide a pressure on a sheave of said one sheave assembly, the control system comprising:

means for generating a speed signal based on the speed of the vehicle;

means for generating a chain ratio signal based on a variable chain ratio of the chain;

an electric actuator coupled to the flow control valve for driving the flow control valve as a function of a control signal;

control means for generating said control signal as a function of said speed signal and said chain ratio signal to control said actuator to prevent slippage of the chain during drive-away of the vehicle and to allow substantially total control of the chain ratio, said flow control valve having a first position that effects flow of control fluid to said one sheave assembly, a second position that effects flow of control fluid from said one sheave assembly and a third position intermediate said first and second positions whereby transfer of control fluid between said sheave assemblies is blocked, thereby effecting a null condition in which changes in said chain ratio are prevented thereby providing decreased sensitivity of said flow control valve means.

2. The control system of claim 1 wherein the control means includes filter means for filtering the speed signal.

3. The control system of claim 1 further comprising means for generating a range selector signal based on a desired operating condition of the transmission wherein said control means generates said control signal also as a function of said range selector signal.

4. The control system of claim 1 further comprising means for generating a throttle position signal based on a throttle position of the engine wherein said control means generates said control signal also as a function of said throttle position signal.

5. The control system as set forth in claim 4 wherein said control means for generating said control signal includes means for inhibiting a change in said control signal upon a change in said throttle position for any given vehicle speed thereby avoiding a turbine speed change for small throttle angle changes until a limiting throttle angle is reached as said throttle angle is advanced.

6. The control system of claim 1 wherein said electric actuator is an on/off solenoid.

7. The control system of claim 1 further comprising means for generating a range selector signal based on a desired operating condition of the transmission wherein said control means generates said control signal also as a function of said range selector signal, said control means for generating said control signal including means for inhibiting a change in said control signal upon a change in said throttle position for any given vehicle speed thereby avoiding a turbine speed change for small throttle angle changes until a limiting throttle angle is reached as said throttle angle is advanced.

8. In a vehicle drivetrain including an engine and a continuously variable transmission having first and second sheave assemblies with relatively movable sheaves and a chain which transfers power between the assemblies, a flow control valve means for controlling flow of fluid between said sheave assemblies, a control system for controlling said flow control valve means to effect said flow of control fluid, the flow of control fluid being utilized by a drive mechanism of one of the sheave assemblies to provide a pressure on a sheave of said one sheave assembly, the control system comprising:

means for generating a speed signal based on the speed of the vehicle;

means for generating a chain ratio signal based on a variable chain ratio of the chain;

an electric actuator coupled to the flow control valve for driving the flow control valve as a function of a control signal;

control means for generating said control signal as a function of said speed signal and said chain ratio signal to control said actuator to prevent slippage of the chain during drive-away of the vehicle and to allow substantially total control of the chain ratio, said control means for generating said control signal including means for inhibiting a change in said control signal upon a change in said throttle position for any given vehicle speed thereby avoiding a turbine speed change for small throttle angle changes until a limiting throttle angle is reached as said throttle angle is advanced.

* * * * *